US012754414B2

(12) United States Patent
Wang et al.

(10) Patent No.: US 12,754,414 B2
(45) Date of Patent: Oct. 6, 2026

(54) OPTICAL ASSEMBLY FOR SCANNING LIDAR SYSTEM

(71) Applicant: SZ DJI TECHNOLOGY CO., LTD., Shenzhen (CN)

(72) Inventors: Li Wang, Shenzhen (CN); Huai Huang, Shenzhen (CN); Xiao Huang, Shenzhen (CN); Zezheng Zhang, Shenzhen (CN); Yalin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 699 days.

(21) Appl. No.: 18/323,916

(22) Filed: May 25, 2023

(65) Prior Publication Data

US 2023/0341677 A1 Oct. 26, 2023

Related U.S. Application Data

(63) Continuation of application No. PCT/CN2020/132299, filed on Nov. 27, 2020.

(51) Int. Cl.
*G02B 26/08* (2006.01)
*G01S 7/481* (2006.01)
(Continued)

(52) U.S. Cl.
CPC ........ *G02B 26/0891* (2013.01); *G01S 7/4817* (2013.01); *G01S 17/42* (2013.01); (Continued)

(58) Field of Classification Search
None
See application file for complete search history.

(56) References Cited

U.S. PATENT DOCUMENTS 5,634,708 A 6/1997 Koie et al.
2006/0181754 A1 8/2006 Matsuoka
(Continued)

FOREIGN PATENT DOCUMENTS

CN 208654643 U 3/2019
CN 109581328 A 4/2019
(Continued)

OTHER PUBLICATIONS

English translation of CN-110325877-A, Hong, 2019 (Year: 2019).*
(Continued)

*Primary Examiner* — James M Hannett
(74) *Attorney, Agent, or Firm* — ANOVA LAW GROUP, PLLC

(57) ABSTRACT

A LiDAR system includes a light source to emit pulsed laser light beams, a scanning optical assembly to direct the pulsed laser light beams to scan an environment for detecting one or more objects therein, and a receiver to receive, via the scanning optical assembly, return light beams reflected by the one or more objects. The scanning optical assembly includes a first optical element rotatable about a first axis and to receive a light beam at a first surface thereof and refract the light beam by a second surface thereof at which the light beam exits the first optical element, and a second optical element spaced from the first optical element and rotatable about a second axis. The second optical element includes a reflective surface to reflect the light beam to the environment and a refractive surface to refract the light beam to the reflective surface.

20 Claims, 40 Drawing Sheets

(51) Int. Cl.
*G01S 17/42* (2006.01)
*G01S 17/931* (2020.01)
*G02B 26/10* (2006.01)

(52) U.S. Cl.
CPC .......... *G01S 17/931* (2020.01); *G02B 26/101* (2013.01); *G02B 26/108* (2013.01)

(56) References Cited

U.S. PATENT DOCUMENTS

| | | | | |
|---|---|---|---|---|
| 2015/0185313 | A1* | 7/2015 | Zhu | G02B 26/105 359/200.7 |
| 2019/0123508 | A1* | 4/2019 | Hong | G01S 7/4816 |
| 2019/0324122 | A1* | 10/2019 | Buehring | G02B 26/108 |
| 2021/0190919 | A1* | 6/2021 | de Mersseman | G01S 17/931 |

FOREIGN PATENT DOCUMENTS

| | | | | | |
|---|---|---|---|---|---|
| CN | 110325877 | A | * | 10/2019 | G01S 17/89 |
| CN | 110824455 | A | | 2/2020 | |
| DE | 10201746 | A1 | | 8/2002 | |
| WO | WO-2013177650 | A1 | * | 12/2013 | G02B 26/105 |

OTHER PUBLICATIONS

The World Intellectual Property Organization (WIPO) International Search Report for PCT/CN2020/132299 Sep. 1, 2021 5 pages (including English translation).

* cited by examiner (right side view)

(top view)

(front view)

(front view)

(right side view)

(top view)

(front view)

(right side view)

(top view)

(front view)

(top view)

2400

OPTICAL ASSEMBLY FOR SCANNING LIDAR SYSTEM

CROSS-REFERENCE TO RELATED APPLICATION

This application is a continuation of International Application No. PCT/CN2020/132299, filed Nov. 27, 2020, the entire content of which is incorporated herein by reference.

TECHNICAL FIELD

The present disclosure generally relates to optical assemblies for light detection and ranging, or laser imaging, detection, and ranging, (LiDAR) systems and, more particularly, to embodiments of optical assemblies, systems, and methods for using the same.

BACKGROUND

LiDAR technology involves systems and methods for detecting and measuring distances by scanning objects (e.g., targets or obstacles) with laser light and measuring the reflection of the laser light with a sensor. Differences in laser return times and wavelengths can then be used to make 3-D representations of the objects. LiDAR technology has been applied in a wide range of applications. For example, working with various types of sensors including LiDAR technology, self-driving technology is capable of sensing the surrounding environment and generating real-time instructions to safely drive a movable object, such as a self-driving vehicle, with little or no human interaction. The self-driving vehicle can be equipped with one or more sensors to gather information from the environment, such as radar, LiDAR, sonar, camera(s), global positioning system (GPS), inertial measurement units (IMU), and/or odometry, etc. Based on various sensory data obtained from the one or more sensors, the self-driving vehicle needs to determine real-time positions and generate instructions for navigation.

As LiDAR technology develops, there exists a need for a more space-efficient, less complicated, and more cost-effective optical assemblies and effective method of using the same.

SUMMARY

Consistent with embodiments of the present disclosure, optical assemblies are provided for directing light beams to scan an environment for detecting one or more objects in the environment. An optical assembly comprises a first optical element rotatable about a first axis and configured to receive a light beam at a first surface of the first optical element and refract the light beam by a second surface of the first optical element at which the light beam exits the first optical element; and a second optical element spaced from the first optical element, rotatable about a second axis, and positioned to reflect the light beam by a reflective surface of the second optical element to the environment to detect the one or more objects.

There is also provided a rotatable scanner for directing light beams to scan an environment for detecting one or more objects in the environment. The rotatable scanner comprises an optical assembly including: a reflective optical element rotatable about a first axis configured to reflect the light beam by a first side of a reflective surface to the environment; and a balancing element including: a first surface attached to the reflective surface of the reflective optical element at a second side opposing the first side of the reflective surface, and a second surface to be coupled to an object configured to adjust the weight of the balancing element to balance the optical assembly during rotation about the first axis.

There is further provided a method for directing light beams to scan an environment to detect one or more objects in the environment. The method comprises rotating a first optical element about a first axis and a second optical element about a second axis, the first optical element spaced from the second optical element; directing a light beam from the first optical element to a reflective surface of the second optical element; and reflecting the light beam by the reflective surface for transmission to the environment.

There is further provided a LiDAR system, comprising: a light source configured to emit pulsed laser light beams; a scanning optical assembly configured to direct the pulsed laser light beams to scan an environment for detecting one or more objects in the environment, the scanning optical assembly including: a first optical element rotatable about a first axis and configured to receive a light beam at a first surface of the first optical element and refract the light beam by a second surface of the first optical element at which the light beam exits the first optical element; and a second optical element spaced from the first optical element and rotatable about a second axis, the second optical element positioned to reflect the light beam by a reflective surface of the second optical element to the environment; and a receiver configured to receive, via the scanning optical assembly, return light beams reflected by the one or more objects in the environment.

There is further provided a LiDAR system, comprising: a light source configured to emit pulsed laser light beams; a scanning optical assembly configured to direct the pulsed laser light beams to scan an environment for detecting one or more objects in the environment, the scanning optical assembly including: a reflective optical element rotatable about a first axis and configured to reflect the light beam by a first side of a reflective surface to the environment; and a balancing element including: a first surface attached to the reflective surface of the reflective optical element at a second side opposing the first side of the reflective surface, and a second surface to be coupled to an object configured to adjust the weight of the balancing element to balance the scanning optical assembly during rotation about the first axis; and a receiver configured to receive, via the scanning optical assembly, one or more return light beams reflected by the one or more objects in the environment.

There is further provided a movable platform comprising an optical assembly onboard the movable platform and configured to direct light beams to scan an environment to detect one or more objects in the environment, the optical assembly including: a first optical element rotatable about a first axis and configured to receive a light beam at a first surface of the first optical element and refract the light beam by a second surface of the first optical element at which the light beam exits the first optical element; and a second optical element spaced from the first optical element and rotatable about a second axis, the second optical element positioned to reflect the light beam by a reflective surface of the second optical element to the environment to detect the one or more objects; a propulsion system configured to propel the movable platform in the environment.

It is to be understood that both the foregoing general description and the following detailed description are exemplary and explanatory only and are not restrictive of the invention, as claimed. Other features and advantages of the present invention will become apparent by a review of the specification, claims, and appended figures.

DESCRIPTION OF THE EMBODIMENTS

Figure 1A:
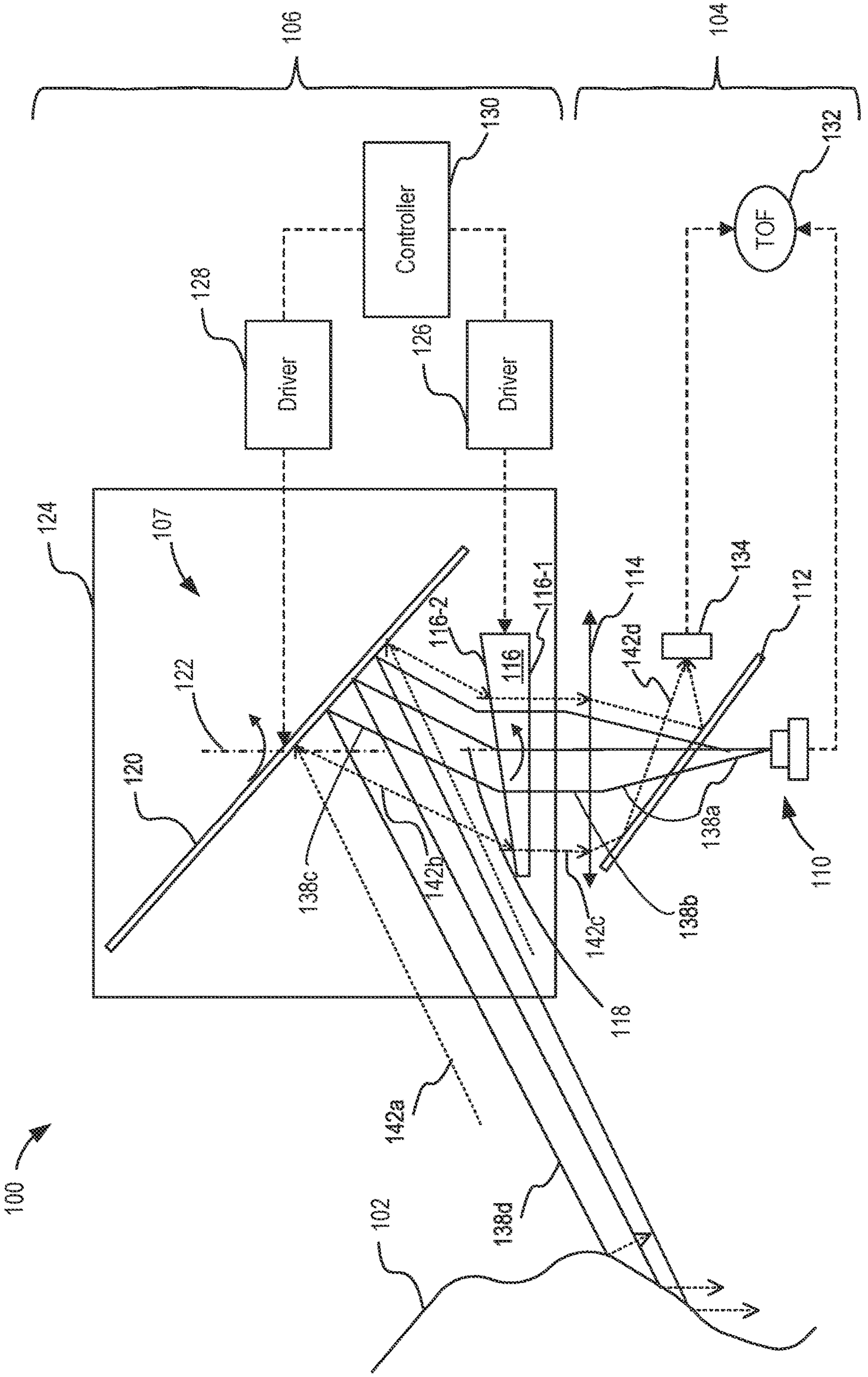
FIG. 1A shows a schematic diagram of an exemplary scanning LiDAR system, in accordance with embodiments of the present disclosure.

The following detailed description refers to the accompanying drawings. Wherever possible, the same reference numbers refer to the same or similar parts. While several illustrative embodiments are described herein, modifications, adaptations, and other implementations are possible. For example, substitutions, additions, or modifications may be made to the components illustrated in the drawings. Accordingly, the following detailed description is not limited to the disclosed embodiments and examples. Instead, the proper scope is defined by the appended claims.

The optical assemblies provided by various embodiments of the present disclosure may be applied to an imaging device, an object detection device, and/or a distance measuring or ranging device. For example, the various embodiments of the optical assemblies may be applied to an electronic device such as a laser radar or a laser distance measuring device. In some embodiments, the distance measuring device can be used to sense external environment information, such as distance information, azimuth information, reflection intensity information, speed information, etc. of one or more objects detected in the environment. In some embodiments, the distance measuring device can detect a distance between the detected object and the distance measuring device by measuring a time of light propagation there between, e.g., based on Time-of-Flight (TOF). In some other embodiments, the distance measuring device can also measure the distance between the detected object and the distance measuring device through other techniques, such as a distance measuring method based on a phase shift measurement, a frequency shift measurement, or any other suitable methods. It is appreciated that the specification, figures, and examples are considered as examples for illustrative purpose only and are not intended to be limiting.

In some embodiments, a scanning LiDAR system may include a distance measuring device using a coaxial optical path, wherein a light beam emitted by a light source of the distance measuring device shares at least part of an optical path in the distance measuring device with the light beam reflected by one or more objects in the environment and returned to the distance measuring device. For example, a sequence of laser pulses may be emitted by a transmitter or a light source and transmitted through a scanning module including an optical assembly to change the propagation direction of the laser pulses. The laser pulses reflected by one or more detected objects can pass through the optical assembly of the scanning module and be received by a receiver.

In some other embodiments, the scanning LiDAR system may include a distance measuring device using an off-axis optical path, wherein a light beam emitted by a light source of the distance measuring device and the light beam reflected by one or more objects and returned to the distance measuring device are respectively transmitted along different optical paths in the distance measuring device.

It is appreciated that the embodiments of the optical assemblies, distance measuring devices, and LiDAR systems of the present disclosure use coaxial optical paths as examples for illustrative purpose, and are intended not to be limiting. The various embodiments of the optical assemblies, distance measuring devices, and LiDAR systems as discussed herein can also use off-axis optical paths.

FIG. 1A shows a schematic diagram of an exemplary scanning LiDAR system 100, in accordance with embodiments of the present disclosure. In some embodiments, scanning LiDAR system 100 is capable of rotating 360°. In some embodiments, 360° mechanical scanning (or rotating) LiDAR system 100 may use multiple lines, such as 16, 24, 128 or more, of light sources for emitting a light beam to achieve a suitable point cloud pattern. The cost of such a multi-line LiDAR system may be high, and the assembly process can be complicated. In some embodiments, scanning LiDAR system 100 may use fewer lines, such as 6 or fewer, or a single line of light source. For example, some embodiments of this disclosure provide mechanical scanning LiDAR systems with fewer or single line(s) of light source(s) including a combination of a first optical element, such as a prism, and a second optical element, such as a reflecting mirror or a prism including a reflective surface. As the first optical element and the second optical element rotate (e.g., together or separately), the reflective surface rotates about a corresponding axis while reflects the light beam. The reflection of the light beam can scan multiple directions, e.g., including a range of 360°, as the reflective surface rotates without having to use a large number of light sources in the system. As such, the 360° stereoscopic scanning effect can be achieved with fewer light sources, lower cost, and less complicated LiDAR systems.

In some embodiments, LiDAR system 100 includes a ranging module 104, e.g., a distance measuring module, and a scanning module 106. In some embodiments, ranging module 104 may be configured to emit a light beam 138*a*, receive a return light beam 142*d*, and convert return light beam 142*d* into electrical signals. In some embodiments, ranging module 104 includes a light source 110 configured to emit light beam 138*a*, an optical element provided as a reflector 112, an optical element provided as a collimating element 114, a receiver 134 configured to receive a reflected light beam, referred to herein as return light beam 142*d*, control circuitry configured to control light emission by light source 110 and light receipt by receiver 134, and a TOF processor 132 configured to calculate the range of the detected objects using a TOF technique based on the time interval between emitted light beam 138*a* and the detected return light beam 142*d* and the speed of light. LiDAR system 100 may be a monostatic scanning LiDAR system, where the light source and the receiver are relatively close to each other, and the outgoing light beams and return light beams may align or share one or more coaxial light paths.

In some embodiments, reflector 112, e.g., comprising a mirror, transmits light beam 138*a* from light source 110, through a central transmissive area of reflector 112, to collimating element 114. In some embodiments, collimating element 114 can be provided as a collimating lens, for collimating light beam 138*a* received from reflector 112, and converging return light beam 142*c* received from scanning module 106 to reflector 112.

In some embodiments, scanning module 106 may be positioned on an exit optical path of ranging module 104 and configured to generate a scanning beam 138*d* e.g., as an outgoing beam, such as a 360° scanning beam, derived from light beam 138*b* received from ranging module 104 and project scanning beam 138*d* to the environment to be scanned. Scanning module 106 may further project a return light beam 142*a* to collimating element 114 of ranging module 104 to be converged to reflector 112.

In some embodiments, scanning module 106 may include an optical assembly 107 including at least one optical element for changing a propagation path of light beam 138*b* received from ranging module 104. For example, the path changing optical element of scanning module 106 may change the propagation path of light beam 138*b* by reflection, refraction, diffraction, and/or combinations thereof. Accordingly, for example, the path changing optical element of scanning module 106 may include a lens, a mirror, a prism, a grating, a liquid crystal, an optical phased array, or any combination of such optical elements. In some embodiments, at least part of at least one path changing optical element is moving, such as driven to move by a driving module, and the moving path changing optical element can reflect, refract, or diffract light beam 138*b* to different directions at different times. In some embodiments, a plurality of path changing optical elements of scanning module 106 may rotate or vibrate about a common axis, and each rotating or vibrating optical element can be used to continuously change the propagation path of light beam 138*b*. In some embodiments, a plurality of path changing optical elements of scanning module 106 may rotate at different rotation speeds, or vibrate at different speeds. In some embodiments, the path changing optical elements of scanning module 106 may rotate at the same rotation speed. In some embodiments, a plurality of path changing optical elements of scanning module 106 may rotate around different axes. In some embodiments, a plurality of path changing optical elements of scanning module 106 may rotate in the same direction, or in different directions. The plurality of path changing optical elements may vibrate in the same direction, or in different directions. It is appreciated that various embodiments described herein are examples for illustration, and are not intended to be limiting.

In some embodiments as shown in FIG. 1A, optical assembly 107 may include a first optical element, provided as a prism 116. Prism 116 may be driven by a driver 126, e.g., a motor, to rotate about an axis 118 to project light beam 138*b* collimated by collimating element 114 to different directions as prism 116 rotates. In some embodiments, prism 116 has thickness that varies along at least one radial direction. In some embodiments, prism 116 comprises a wedge prism that aligns light beam 138*b* collimated by collimating element 114 by a first surface 116-1 and refracts the aligned light beam by a second surface 116-2.

In some embodiments, optical assembly 107 may further include a second optical element, provided as a reflector 120 (also referred to as reflective optical element) in FIG. 1A as another path changing optical element. Reflector 120 may be driven by a driver 128, e.g., including a motor, to rotate about an axis 122 to project light beam 138*c* received from prism 116 to different directions as reflector 120 rotates. In embodiments, the axis 122 and the axis 118 are the same axis or different axes. In some embodiments, reflector 120 comprises a mirror, or an optical element such as a prism, e.g., a wedge prism or a triangular prism, including a reflective surface. In some embodiments, optical assembly 107 can further include optical element(s) in addition to prism 116 and reflector 120. The additional optical element(s) may be a prism, a reflector, or any other suitable optical element, and may be driven by additional drivers to rotate, vibrate, or move in any suitable manner.

In some embodiments, drivers 126 and 128 may be controlled by a controller 130 to drive prism 116 and reflector 120 to rotate about axes 118 and 122, respectively, for projecting light beam 138*b* received from ranging module 104 in different directions to scan the environment around LiDAR system 100. In some embodiments as shown in FIG. 1A, prism 116 and reflector 120 may be driven by different drivers to have different rotation speeds and/or different rotation directions, thereby projecting light beam 138*b* received from ranging module 104 to a larger spatial range in the environment. In some other embodiments, prism 116 and reflector 120 may be driven by the same driver to have the same rotation speed and/or the same rotation direction. In some embodiments, the rotation speeds of prism 116 and reflector 120 can be determined respectively according to the area and pattern expected to be scanned in the environment. Drivers 126 and 128 may include motors or other drives.

In some embodiments, optical assembly 107 is contained within a transparent housing 124. In some embodiments as shown in FIG. 1A, LiDAR system 100 uses the coaxial optical path. In some other embodiments, LiDAR system 100 can also use the off-axis optical path. In some cases, transparent housing 124 may include a transmission area and a modulation area. The modulation area can modulate the exit path of incident light as needed to expand a field of view (FOV) up or down in the vertical direction, and/or expand the FOV to the left or right in the horizontal direction.

In some embodiments, a special optical element is provided, which is used to avoid range attenuation caused by beam divergence. For example, when transparent housing 124 is cylindrical or conical, the special optical element may be a cylindrical lens. In some embodiments, the special optical element may be located at a side close to the light emitting surface of second optical element 120, so that a light beam reflected by second optical element 120 may enter the special optical element. For example, the special optical element may be located between second optical element 120 and transparent housing 124. In some embodiments, the special optical element may be located on a side close to the light incident surface of second optical element 120, so that a light beam propagated through the special optical element may enter second optical element 120. For example, the special optical element may be located between second optical element 120 and first optical element 116. In some embodiments, the special optical element may be configured to rotate with second optical element 120.

In some embodiments, one or more optical elements of LiDAR system 100 on a beam propagation path, e.g., for propagating light beams 138*a*, 138*b*, 138*c*, and 138*d*, may be coated with a filter layer, or a filter may be provided on the beam propagation path of LiDAR system 100 for allowing light of certain wavelength band(s) corresponding to light beam 138*a* emitted by light source 110 to pass through, while reflecting light of other wavelength bands so as to reduce noise caused by ambient light to receiver 134.

In some embodiments, light source 110 may be used to emit a light pulse sequence, such as a sequence of laser pulses. In some embodiments, light source 110 may be a pulsed laser diode configured to emit light beam 138*a* as a pulsed laser beam. For example, the period of laser pulse emission may be on the order of nanoseconds. The laser beam emitted by light source 110 may be a narrow-bandwidth beam with a wavelength outside the visible light range. Light source 110 may be other types of sources configured to emit other forms of radiation, such as an infrared beam.

As shown in FIG. 1A, light beam 138*a* emitted by light source 110 is transmitted through an area on reflector 112. In some embodiments, the area for transmitting through light beam 138*a* is provided in the central area of reflector 112 and includes two opposite surfaces that are both coated with antireflection coatings such that light beam 138*a* emitted by the light source 110 is transmitted through this central area. In some embodiments, one or more optical elements of LiDAR system 100 may be coated with antireflection coatings. In some embodiments, reflector 112 may also include a through hole in the central area for transmitting light beam 138*a*. In some embodiments, when LiDAR system 100 uses the coaxial optical path, reflector 112 may be used to provide for the transmitting (or outgoing) optical path, e.g., for light beams 138*b*, 138*c*, or 138*d*, and the receiving (or return) optical path, e.g., for return light beam 142*a*, 142*b*, or 142*c*, before collimating element 114, so that the transmitting optical path and the receiving optical path can share the same collimating element 114, and the optical path can be more compact to save space that LiDAR system 100 may occupy. In some embodiments, light source 110 and receiver 134 may use respective collimating elements, and reflector 112 may be arranged on the optical path behind the collimating element associated with receiver 134.

In some embodiments, light beam 138*a* is emitted by a laser tube of light source 110 and collimated into a near-parallel light beam 138*b* by collimating element 114 to enter scanning module 106. Collimating element 114 may also be used to converge at least part of return light beam 142*a* reflected by an object 102 in the environment. Collimating element 114 may include a collimating lens, or other suitable element capable of collimating a light beam.

In some embodiments, near-parallel light beam 138*b* can pass through rotating prism 116, driven by driver 126 to rotate, to form a dynamic scanning beam 138*c*. For example, as shown in FIG. 1A, a first surface 116-1 of prism 116 may be substantially parallel to collimating element 114, and near-parallel beam 138*b* may be incident on first surface 116-1 and pass through first surface 116-1. Near-parallel beam 138*b* may then be redirected, e.g., due to refraction, by a second surface 116-2 of prism 116 to form dynamic scanning beam 138*c* as prism 116 rotates about axis 118. Dynamic scanning beam 138*c* may be redirected to reflector 120.

In some embodiments, dynamic scanning beam 138*c* incident on reflector 120, driven to rotate by driver 128, can be reflected by rotating reflector 120 rotatable about axis 122 to form a 360° scanning beam, provided as an outgoing light beam 138*d*. Outgoing light beam 138*d* may be transmitted by LiDAR system 100 for scanning the environment. In some embodiments, rotation of prism 116 and rotation of reflector 120 may be respectively driven by driver 128 and 126 that are controlled by controller 130.

In some embodiments, outgoing light beam 138*d* may be incident on, i.e., strike, an object 102 in the environment. At least part of outgoing light beam 138*d* may be reflected by object 102 and form a reflected beam as return light beam 142*a* that returns to the original light path to be received by LiDAR system 100. As shown in FIG. 1A, return light beam 142*a* can be incident on and reflected by reflector 120 to a return light beam 142*b* transmitted to second surface 116-2 of prism 116. Return light beam 142*b* may be redirected by second surface 116-2 to first surface 116-1. Light beam 142*b* may be incident on first surface 116-1 at a substantially perpendicular angle. Return light beam 142*b* may pass through first surface 116-1 of prism 116 as return light beam 142*c* to be incident on collimating element 114. Collimating element 114 may further redirect, e.g., by converging, return light beam 142*c* to reflector 112. For example, as shown in FIG. 1A, return light beam 142*c* may be received by a non-central area of reflector 112. In some embodiments, the non-central areas of a receiving surface, e.g., facing toward collimating lens 114, of reflector 112 may be coated with a highly reflective film. Accordingly, return light beam 142*c* can be reflected to return light beam 142*d* to be received by receiver 134. In some embodiments, the laser light receiving time may be determined, for example, by detecting a rising edge time and/or a falling edge time of the electrical signal pulse converted from return light beam 142*d*. As such, TOF processor 132 can use the signal receiving time information and the signal sending time information to calculate the TOF, thereby determining the distance between object 102 and LiDAR system 100. It should be noted that TOF processor 132 may be one possible approach for determining distance between object 102 and LiDAR system 100. Alternatively, LiDAR system 100 may utilize other approaches for measuring the distance, for example, modulating the amplitude of the laser emission pulse, modulating the phase of the laser pulse, and modulating the laser emission frequency (or wavelength). For such cases, an appropriately programmed processor may be used for determining the distance based on reflected light (e.g., reflected light beam 142*d*).

In some embodiments, light source 110 of LiDAR system 100 may be a single line or a multi-line light source, and the corresponding receiver 134 for receiving return light beam 142*d* has a line number consistent with that of light source 110.

In some embodiments, a tilt angle of rotating prism 116 relative to collimating element 114, a wedge angle between first surface 116-1 and second surface 116-2 of prism 116, and/or a tilt angle of reflector 120 relative to collimating element 114 can be determined respectively according to a range of a field of view, e.g., including a range of a pitch angle as described with reference to FIG. 1C subset (b). For example, such range corresponds to a 3D view measured by angles between the outgoing beam (e.g., outgoing beam 138*d*) and a horizontal direction of the body of LiDAR system 100 (e.g., illustrated in subset (b) of FIG. 1C), when reflector 120 rotates about axis 122 of LiDAR system 100. For example, when the pitch angle is in a range between −60° and 30°, the tilt angle of reflector 120 and the wedge angle of prism 116 can be determined.

Figure 1B:
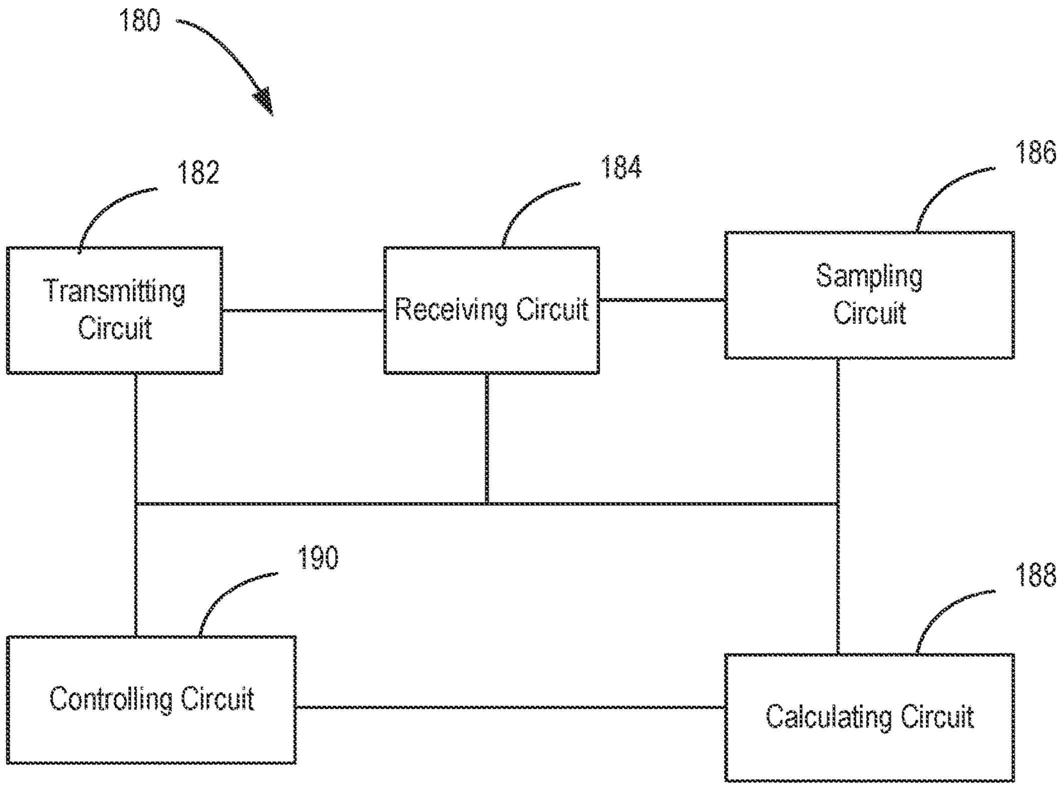
FIG. 1B shows a block diagram of a system of circuitry for the scanning LiDAR system of FIG. 1A, in accordance with embodiments of the present disclosure.
Figure 1C:
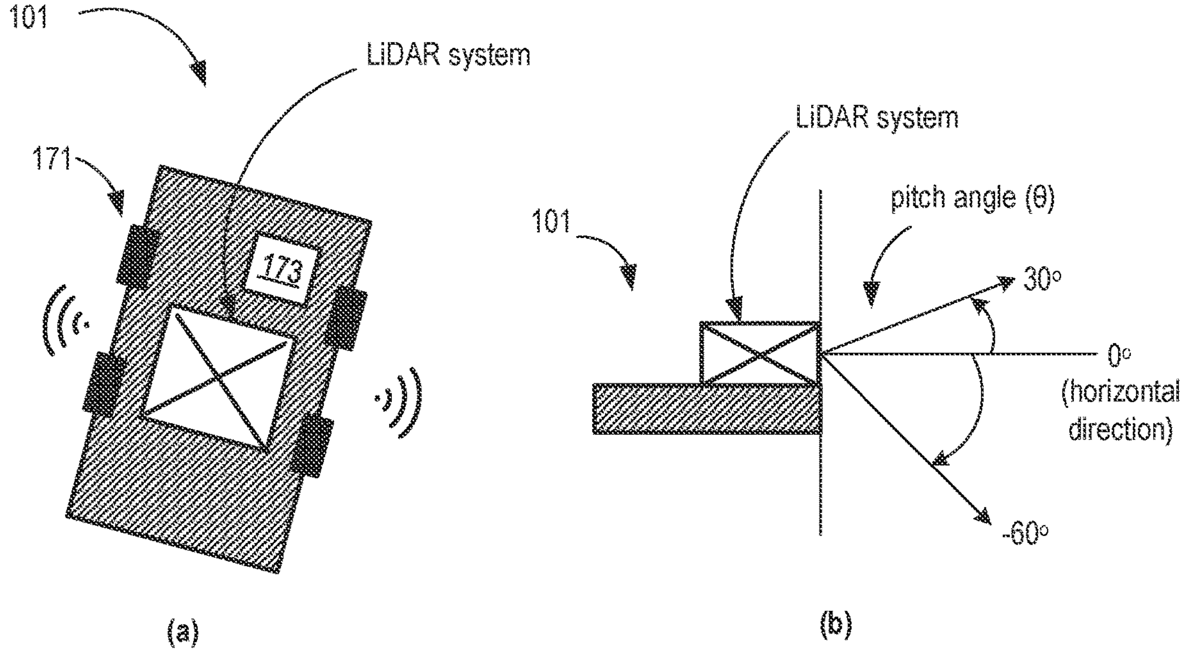
FIG. 1C shows a schematic diagram of a scanning LiDAR system onboard a movable object, in accordance with some embodiments of the present disclosure.

In some other embodiments, when the pitch angle of the field of view is determined (e.g., the outgoing beam forms an angle of 5° relative to the horizontal direction shown in FIG. 1C subset (b)), the material and wedge angle of rotating prism 116 can be determined accordingly. In some embodiments, when the wedge angle of prism 116 is relatively small, the refractive index of prism 116 can be relatively high. In some other embodiments, when the wedge angle of prism 116 is relatively large, the refractive index of prism 116 can be relatively small. In some embodiments, material (s) with higher refractive indexes may be used to minimize the wedge angle of prism 116, thereby reducing the space LiDAR system 100 displaces. For example, prism 116 may be made of an optical material with a refractive index in a range of 1.7-2.1, such as any value of 1.7, 1.75, 1.8, 1.85, 1.9, 1.95, 2, and 2.1, and the wedge angle may be in a range of 10°-25°, such as any angle of 10°, 11°, 12°, 13°, 14°, 15°, 16°, 17°, 18°, 19°, 20°, 21°, 22°, 23°, 24°, and 25°. For example, prism 116 may be composed of the material H-ZF72A with a refractive index of 1.9229, and the wedge angle of prism 116 may be 21°.

In some other embodiments, when the pitch angle (e.g., as shown in FIG. 1C) is −15°, the tilt angle of reflector 120 relative to the vertical direction substantially perpendicular to collimating element 114 is 52.5°.

In some embodiments, the line number of light source 110 and the focal length of collimating element 114 can be determined according to an angular accuracy of a point cloud pattern generated by LiDAR system 100. For example, when the difference between adjacent angles of the point cloud pattern is less than 1.35°, the focal length of collimating element 114 and the spacing between multiple lines of light source 110 can be determined accordingly. When light source 110 is a 6-line light source, the spacing between the lines of light source 110 is 470 μm, and the focal length of collimating element 114 can be determined to be about 20 mm. In another example, when the difference between adjacent angles of the point cloud pattern is even smaller, the spacing between multiple lines of light source 110 may further be reduced, the focal length of collimating element 114 may be increased, and/or the number of lines of light source 110 may be increased.

FIG. 1B shows a block diagram of an exemplary system 180 of circuitry for LiDAR system 100 of FIG. 1A, in accordance with embodiments of the present disclosure. In some embodiments, as shown in FIG. 1B, system 180 includes a transmitting circuit 182, e.g., coupled to light source 110; a receiving circuit 184, e.g., coupled to receiver 134; a sampling circuit 186, e.g., coupled to TOF processor 132; and a calculating circuit 188, e.g., coupled to TOF processor 132. Circuits 182-188 are coupled to each other to operate LiDAR system 100.

In some embodiments, transmission circuit 182 is configured to control light source 110 to transmit a sequence of light pulses (for example, a sequence of laser pulses). Receiving circuit 184 is configured to control receiver 134 to receive the optical pulse sequence reflected by detected object 102. Receiving circuit 184 may also be configured to convert the optical pulse sequence to obtain electrical signals. The electrical signals may be processed by receiving circuit 184 and outputted to sampling circuit 186. Sampling circuit 186 samples the electrical signal to obtain a sampling result. Calculating circuit 188 is configured to determine a distance between LiDAR system 100 and detected object 102 based on the sampling result of sampling circuit 186.

In some embodiments, system 180 further includes a controlling circuit 190 configured to control circuits 182-188. For example, controlling circuit 190 may be configured to control the working time of the various circuits and/or set parameters for the circuits, etc. It is appreciated that the circuits shown in FIG. 1B are embodiments for illustrative purpose and are not intended to be limiting. The number of one or more of the circuits shown in FIG. 1B may be more than one for emitting at least two light beams in the same direction or in different directions respectively, as described herein. For example, light-emitting chips in at least two emission circuits for emitting the at least two light beams may be packaged in the same module. In another example, each emission circuit may include a laser emitting chip, a die in the laser emitting chips in the at least two emitting circuits being packaged together and housed in the same packaging space.

In some embodiments, in addition to the circuits shown in FIG. 1B, system 180 may further include a scanning module (not shown) configured to control the propagation direction of at least one laser pulse sequence emitted by transmitting circuit 182.

FIG. 1C shows a schematic diagram of a scanning LiDAR system, representative of any of the LiDAR systems described herein, onboard a movable platform 101, in accordance with some embodiments of the present disclosure. In some embodiments, the LiDAR system is placed on top of movable platform 101 and scans an environment surrounding movable platform 101. In some embodiments, the scanning field of the LiDAR system onboard movable platform 101 includes a range surrounding movable platform 101 with an azimuth angle in a range from 0° to 360°, and a pitch angle θ (shown in FIG. 1C subset (b)) in a range from −60°(60° below a horizontal direction for the LiDAR system) to 30° (30° above the horizontal direction). For example, a LiDAR system may be placed on top of movable platform 101, such as an autonomous vehicle, about 1 meter to 2 meters from the ground, and designed to scan an environment with a pitch angle in arrange from −40° to 5°. The LiDAR system can be placed at any height from the ground suitable for the autonomous vehicle. It is appreciated that the LiDAR system, movable platform 101, and scanning range provided in FIG. 1C are examples for illustrative purpose and not intended to be limiting. LiDAR systems can be mounted on any type of movable platform or movable objects in any suitable arrangement (such as on the top, at the bottom, or on the side of the movable platform or movable object) to provide appropriate scanning range in the environment in view of the various embodiments described herein and are within the scope of the present disclosure. For example, the LiDAR system can be mounted on any position of an unmanned aerial vehicle (UAV), an autonomous vehicle, a remote control vehicle, a handheld gimbal, and/or a wearable device to provide appropriate scanning ranges of the corresponding environment.

In some embodiments, the distance and orientation of object(s) in the environment that are detected by the LiDAR system can be used for remote sensing, obstacle avoidance, mapping, modeling, navigation, and/or the like. In some embodiments, the LiDAR system as described in various embodiments of the present disclosure can be applied to movable platform 101, such as an unmanned aerial vehicle. For example, the LiDAR system can be installed on a platform body of movable platform 101. Movable platform 101 with the LiDAR system can measure the external environment, for example, measuring the distance between movable platform 101 and obstacles, for obstacle avoidance and other purposes, such as performing two-dimensional (2D) or three-dimensional (3D) mapping of the external environment.

In some embodiments, movable platform 101 may include any suitable movable object, device, mechanism, system, or machine configured to travel on or within a suitable medium, such as a surface, air, water, rails, space, underground, etc. For example, movable platform 101 includes at least one of an UAV, a car, a remote control car, a robot, and a camera. In some embodiments, when the LiDAR system is applied to an UAV, the platform body can be a fuselage of the UAV. In some embodiments, when the LiDAR system is applied to an automobile, the platform body can be the body of the automobile. For example, the automobile may be a self-driving car or a semi-automatic car. The LiDAR system may be mounted on top of the self-driving car as shown in the figure subset (a) of FIG. 1C. The LiDAR system can also be coupled, connected, mounted, or in any other suitable manner to be onboard movable platform 101. The LiDAR system may also be a built-in module of movable platform 101. In some embodiments, when the LiDAR system is applied to a remote control car, the platform body can be the body of the remote control car. In some embodiments, when the LiDAR system is applied to a robot, the platform body can be a robot. In some embodiments, when the LiDAR system is applied to a camera, the platform body can be the camera itself The types of system as discussed in the present disclosure can be equally applied to other types of movable platforms, movable objects, or any suitable object, device, mechanism, system, or machine configured to travel on or within a suitable medium, such as a surface, air, water, rails, space, underground, etc.

With reference also to FIG. 1A, in some embodiments, the TOF information may be processed and calculated by the LiDAR system onboard movable platform 101 during movement. The LiDAR system may generate 2D or 3D mapping of the external environment. In some embodiments, the light beams and electrical signals may be collected by the LiDAR system onboard movable platform 101 and transmitted, wirelessly or via a wired connection, to another computing device or computing system for processing and calculating distances and positions of objects, and generating 2D or 3D mapping of the external environment.

Figure 1D:
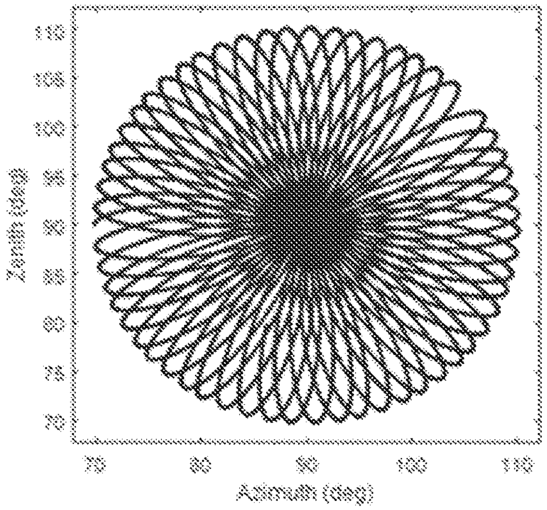
FIG. 1D illustrates an exemplary scanning pattern of the scanning LiDAR system of FIG. 1A, in accordance with embodiments of the present disclosure.

FIG. 1D illustrates an exemplary scanning pattern of scanning LiDAR system 100 of FIG. 1A, in accordance with embodiments of the present disclosure. It can be understood that when the speed(s) of the optical element(s) in scanning module 106 change, the scanning pattern may change accordingly.

Figure 1E:
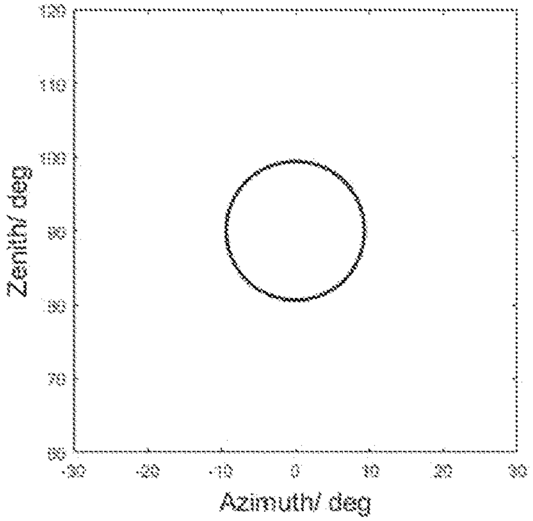
FIGS. 1E and 1F illustrate exemplary scanning patterns of the scanning LiDAR system of FIG. 1A, in accordance with embodiments of the present disclosure.
Figure 1F:
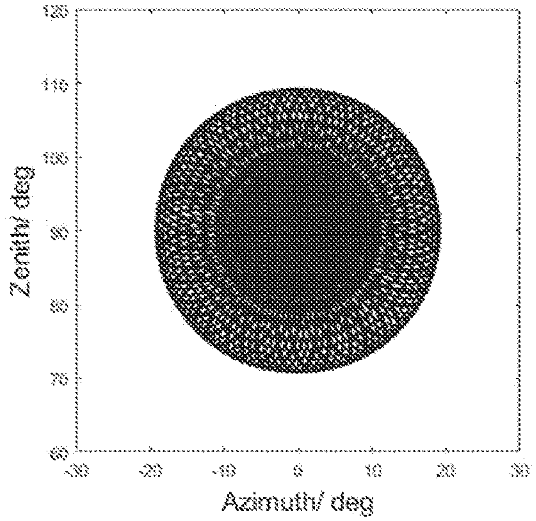

FIGS. 1E and 1F illustrate exemplary scanning patterns of scanning LiDAR system 100 of FIG. 1A, in accordance with embodiments of the present disclosure. In some embodiments as described herein, prism 116 may comprise a plurality of rotating prisms. Each prism may be separately driven by an individual motor. In some embodiments, without considering reflector 120, when prism 116 comprises a single prism, the scanning pattern is a circle as shown in FIG. 1E. In some embodiments, when prism 116 comprises a plurality of prisms, the scanning pattern may include a 2D pattern, such as the scanning pattern in FIG. 1F for prism 116 comprising two prisms.

In some embodiments, in order to make a LiDAR system more compact, the sizes of one or more devices included therein, such as one or more optical elements, may be reduced. On the other hand, the size of some devices of the LiDAR system cannot readily be reduced due to certain requirements and limitations on the optical path for proper function of the LiDAR system. For example, as shown in FIG. 1A, the size of reflector 120 and the size of a housing (e.g., a housing 223 in FIG. 2 below) for containing the optical elements therein (such as reflector 120 and prism 116 in FIG. 1A) cannot be reduced freely. Accordingly, a LiDAR system with a more compact structure than LiDAR system 100 is needed. For example, as discussed herein, by adjusting arrangement of one or more optical elements of the optical assembly in the LiDAR system, the light beam can be received and reflected by a reflective surface at a location closer to a central area of the reflective surface, prior to being directed outward to scan the environment. As such, the optical assembly of the LiDAR system may be more compact than LiDAR system 100. It is appreciated that two or more of the embodiments of the optical assemblies as described herein can be combined in any suitable arrangement in any LiDAR systems and are within the scope of the present disclosure.

Figure 2:
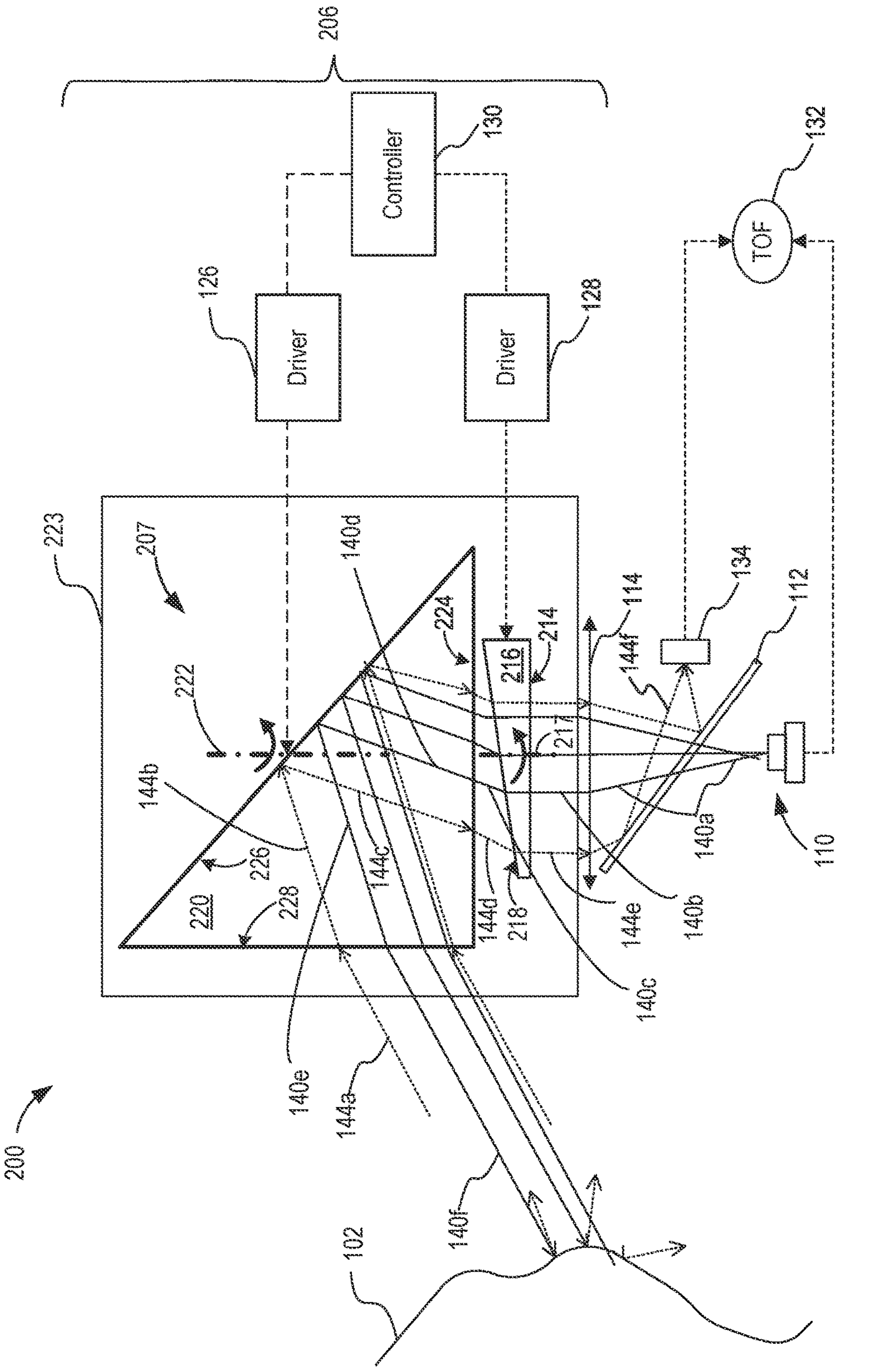
FIG. 2 shows a schematic diagram of an exemplary scanning LiDAR system, in accordance with embodiments of the present disclosure.

FIG. 2 shows a schematic diagram of an exemplary scanning LiDAR system 200, in accordance with embodiments of the present disclosure. Elements of LiDAR system 200 that are the same as elements of LiDAR system 100 are identified by the same reference numbers. In some embodiments, LiDAR system 200 may be a monostatic scanning LiDAR system. In some embodiments, optical assembly 207 includes a first optical element, provided as a wedge prism 216 (also referred to as a transmission optical element, or a transmission prism) rotatable about a first axis 217. Wedge prism 216 may be driven by driver 128 to rotate. In some embodiments, wedge prism 216 may comprise a transparent material with a refractive index in a range from 1.7 to 2.1, such as any value of 1.7, 1.75, 1.8, 1.85, 1.9, 1.95, 2, and 2.1. Wedge prism 216 may have a wedge angle (i.e., an angle between a first surface 214 and a second surface 218) in a range from 16° to 25°, such as any angle of 16°, 17°, 18°, 19°, 20°, 21°, 22°, 23°, 24°, and 25°. For example, wedge prism 216 may be composed of glass type H-ZF72A with a refractive index of 1.9229, and a wedge angle of 21°.

In some embodiments, wedge prism 216 is configured to receive a near-parallel light beam 140*b*, from collimating element 114 by collimating light beam 140*a* emitted by light source 110 on first surface 214. In some embodiments, wedge prism 216 may be positioned to be substantially parallel to collimating element 114 such that near-parallel light beam 140*b* may enter first surface 214 perpendicularly without refraction. In some other embodiments, wedge prism 216 may not be parallel to collimating element 114 and near-parallel light beam 140*b* may be redirected, e.g., refracted, by first surface 214 to a second surface 218. In some embodiments, near-parallel light beam 140*b* may be incident on and refracted by second surface 218 at which a light beam 140*c* exits wedge prism 216 of optical assembly 207. In some embodiments, optical assembly 207 may comprise a plurality of rotating prisms including wedge prism 216. Each prism may be separately driven by an individual motor.

In some embodiments, optical assembly 207 includes a second optical element 220 (also referred to as reflective optical element) spaced from wedge prism 216 and positioned to receive light beam 140*c* that exits wedge prism 216. In some embodiments, second optical element 220 as shown in FIG. 2 may be implemented in optical assembly 207 to replace reflector 120 of optical assembly 107 in FIG. 1A. In some embodiments, second optical element 220 is rotatable about a second axis 222. In some embodiments, second optical element 220 may be configured to redirect (e.g., reflect and/or refract) light beam 140*c*, e.g., as an outgoing light beam, received from wedge prism 216 by a first surface 224 (also referred to as a first refractive surface 224) to a surface 226 (also referred to as a reflective surface 226) of second optical element 220. For example, compared to FIG. 1A, light beam 140*c* may be incident on and refracted by first surface 224 into a light beam 140*d* to be transmitted to a central area of reflective surface 226 of second optical element 220, as shown in FIG. 2.

In some embodiments, reflective surface 226 is configured to reflect light beam 140*d* to form a light beam 140*e* to be transmitted to a second surface 228 (also referred to as a second refractive surface 228) of second optical element 220. In some embodiments, reflective surface 226 may be coated with a high reflection coating, or may include a material with high reflection. In some embodiments, light beam 140*e* reflected by reflective surface 226 may be refracted by second surface 228 after which an outgoing light beam 140*f* exits second optical element 220. First surface 224 and/or second surface 228 may be coated with anti-reflection coating to reduce reflection on the corresponding surface. As shown in FIG. 2, second optical element 220 may be driven by driver 126 to rotate about second axis 222 to scan the environment. In some embodiments, first axis 217 may be aligned with second axis 222 as shown in FIG. 2. In some other embodiments, first axis 217 may tilt at a predetermined angle, e.g., in a range from 5° to 10°, such as any angle of 5°, 6, 7°, 8°, 9°, and 10°, relative to second axis 222. In another example, first axis 217 may be parallel to second axis 222.

In some embodiments, second optical element 220 may comprise a triangular prism, such as a right-angle prism (viewed from a front of the right-angle prism as shown in FIG. 2). In some examples, second optical element 220 may comprise a transparent material with a refractive index larger than 1.7 to provide a high refractive index on first surface 224 and second surface 228. For example, second optical element 220 may comprise a glass material (e.g., Chengdu Guangming H-ZF52) with a refractive index about 1.8467. By providing second optical element 220, a prism as shown in FIG. 2, outgoing light beam 140*f*, after being refracted by first surface 224 and reflected by reflective surface 226, may be refracted upward on the side wall of the prism (e.g., second surface 228) and housing 223 (e.g., compared to FIG. 1A). This may be due to light beam 140*d* is received at a central area of reflective surface 226 such that light beam 140*e* is received on surface 228 at a higher location. As such, optical assembly 207 and corresponding LiDAR system 200 may be made smaller and more compact to cover more desired scanning ranges of the environment, so as to reduce resistance from air flow and decrease system noise during rotation of scanning module 206. The refraction degree of outgoing light beam 140*f* may be related to the thickness and material (e.g., refractive index) of second optical element 220. As such, the degree of deflection of the light beam can be adjusted by selecting an angle between first surface 224 and reflective surface 226 and/or material of second optical element 220 as needed.

Figure 3A:
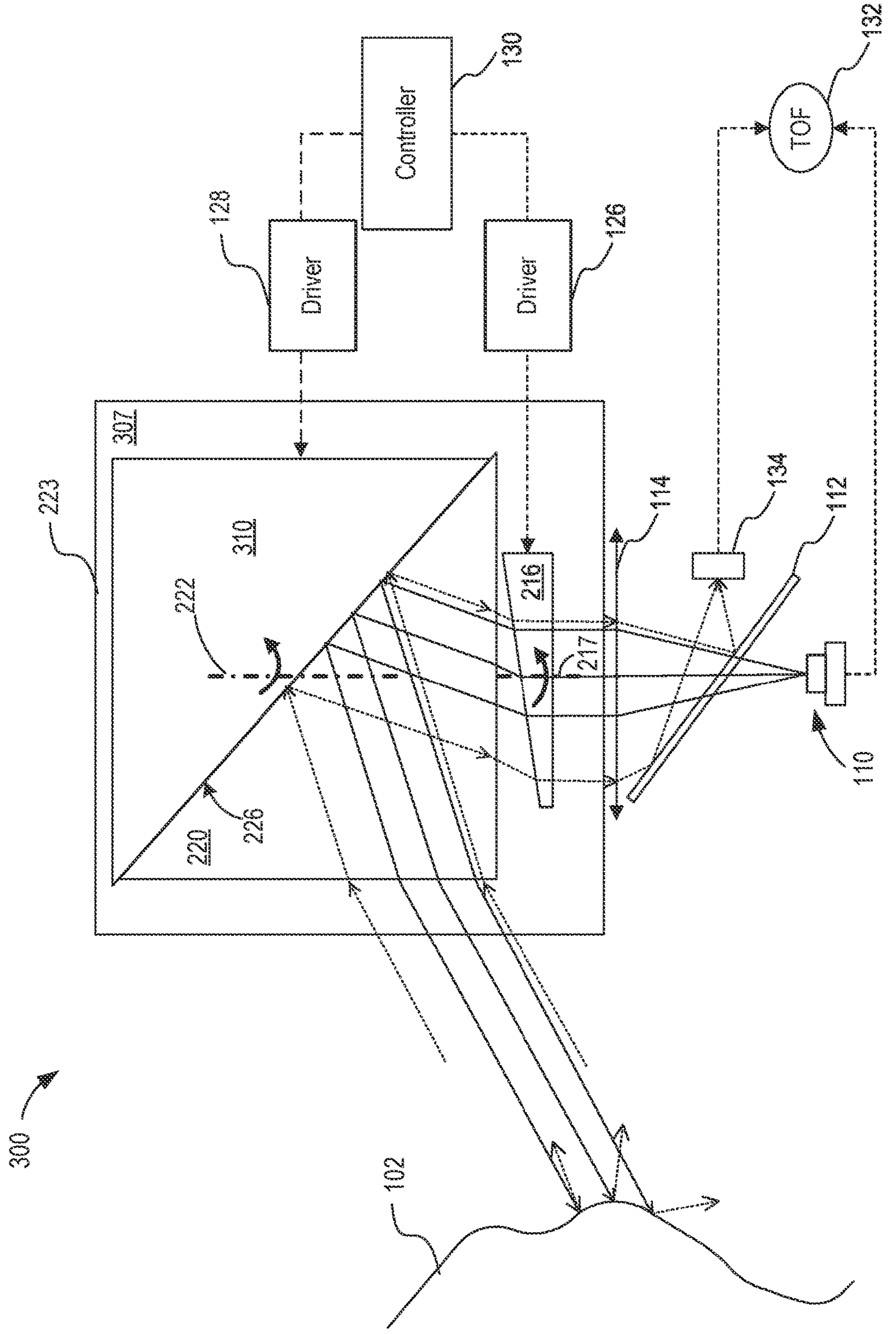
FIGS. 3A and 3B show schematic diagrams of an exemplary scanning LiDAR system, in accordance with embodiments of the present disclosure.
Figure 3B:
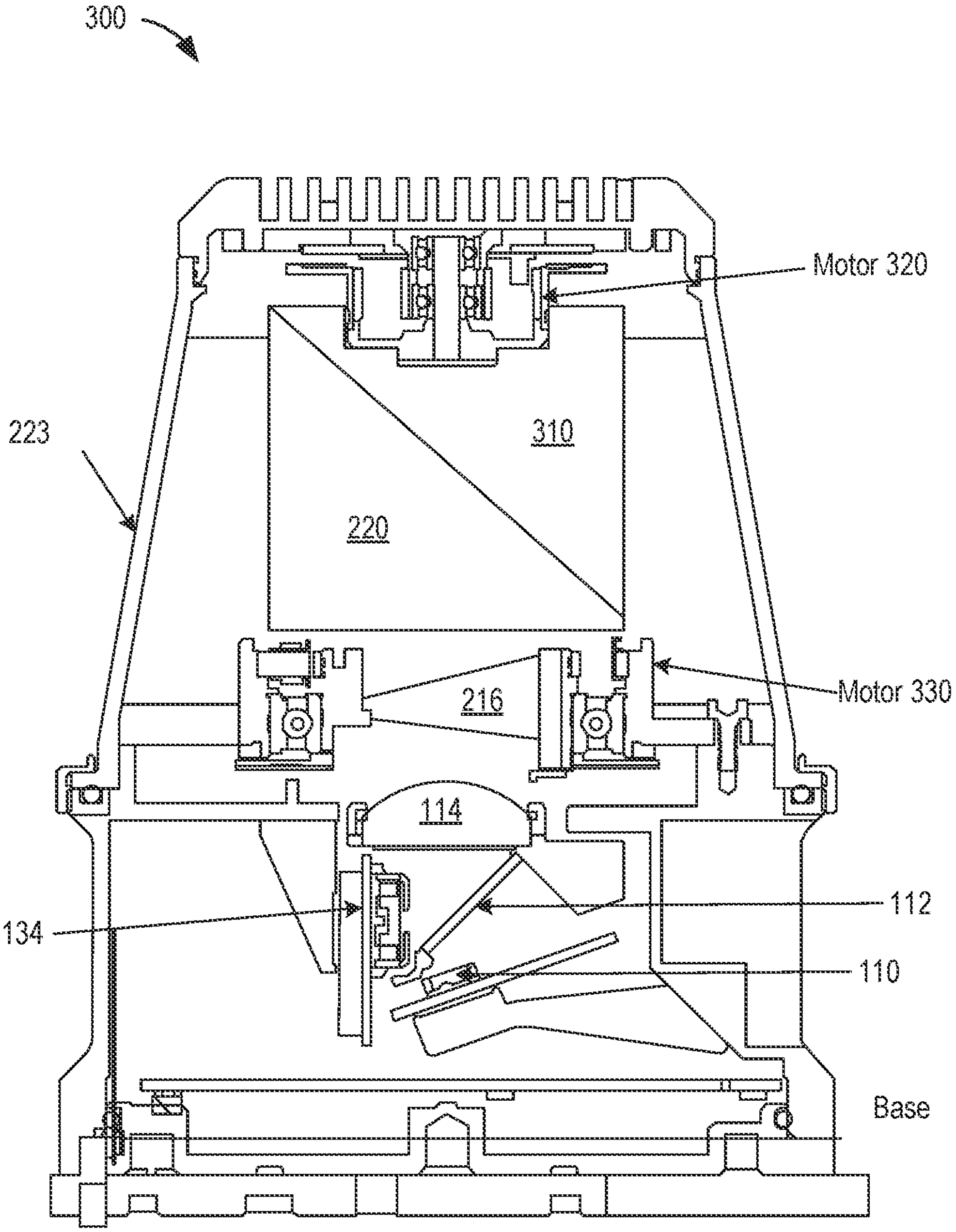

In some embodiments, in addition to or as an alternative of having a more compact system, a balancing element may be included in the LiDAR system for balancing second optical element 220 during rotation. FIGS. 3A and 3B shows schematic diagrams of an exemplary scanning LiDAR system 300, in accordance with embodiments of the present disclosure. Elements of LiDAR system 200 that are the same as elements of LiDAR system 100 and 200 are identified by the same reference numbers. LiDAR system 300 may be a monostatic scanning LiDAR system. In some embodiments, an optical assembly 307 comprises a balancing element 310 attached to second optical element 220 and configured to balance second optical element 220 during rotation about second axis 222. As shown in FIG. 3B, balancing element 310 may be attached to a motor 320 included in driver 128 that drives second optical element 220 to rotate about second axis 222 from a top portion of balancing element 310. Balancing element 310 may further be attached to second optical element 220 on a side surface. Balancing element 310 is configured to be positioned such that the gravitational center of the combination of second optical element 220 and balancing element 310 is located on rotation axis 222, and thereby reducing vibration of motor 320 during rotation. In some embodiments, balancing element 310 may include a metal piece attached to second optical element 220, or a triangular prism with a reflective surface attached to reflective surface 226 of second optical element 220 as shown in FIG. 3A. Further details and various embodiments of balancing element 310 are described below with reference to FIGS. 20-24.

Figure 4:
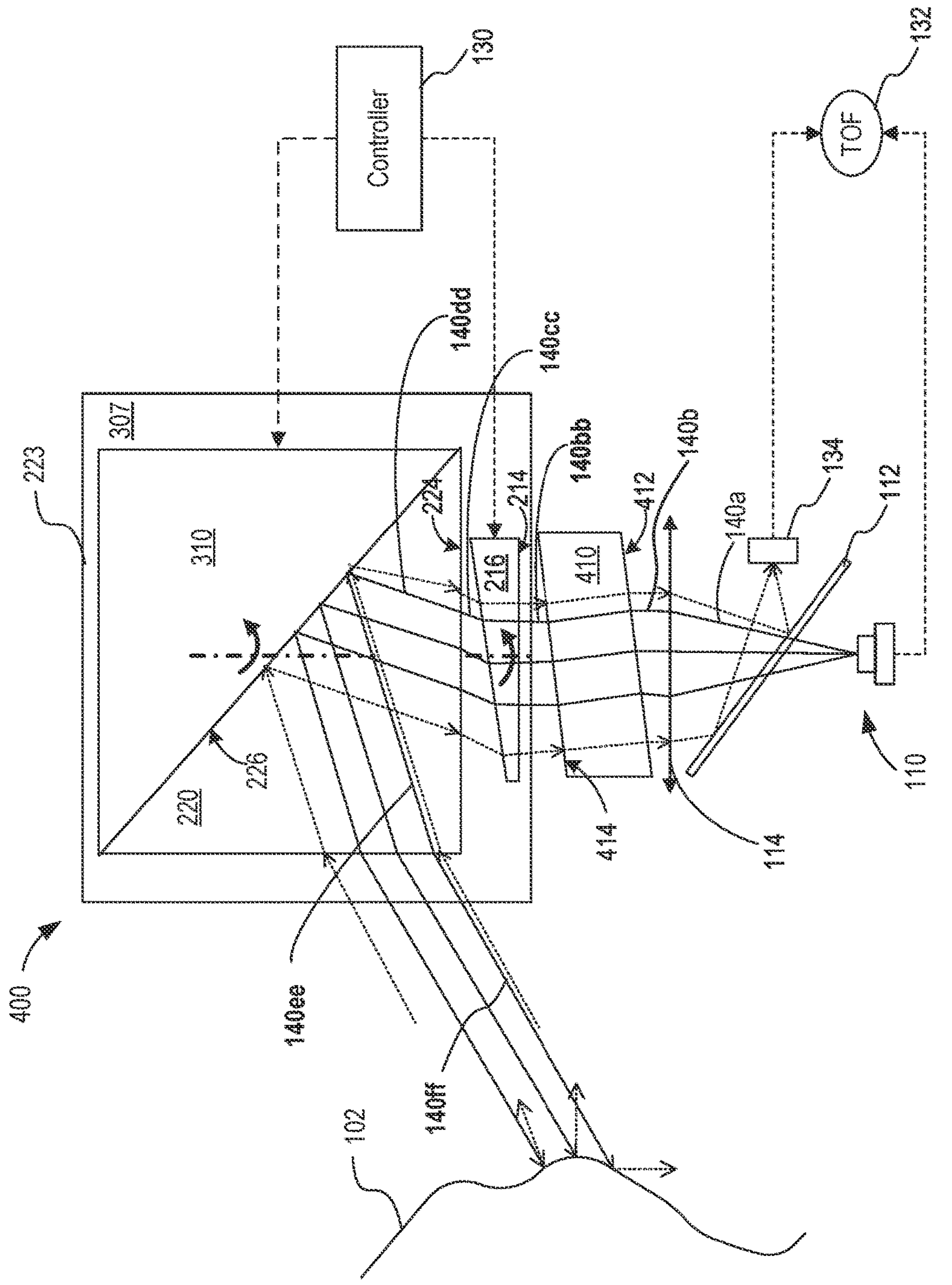
FIG. 4 shows a schematic diagram of an exemplary scanning LiDAR system, in accordance with embodiments of the present disclosure.

FIG. 4 shows a schematic diagram of an exemplary scanning LiDAR system 400, in accordance with embodiments of the present disclosure. Elements of LiDAR system 400 that are the same as elements of LiDAR system 100, 200, and 300 are identified by the same reference numbers. LiDAR system 400 may be a monostatic scanning LiDAR system. In some embodiments, in order to further translate light beam 140*d* toward a central area of reflective surface 226 of second optical element 220 to make the system more compact, LiDAR system 400 further comprises a third optical element 410 spaced from and including at least one surface that is tilted (or inclined) relative to first surface 214 of wedge prism 216. For example, third optical element 410 may be placed between wedge prism 216 and collimating element 114 to shift light beam 140*b* exiting collimating element 114 to light beam 140*bb* for entering wedge prism 216. After refraction by wedge prism 216 and surface 224 of second optical element 220 respectively, light beam 140*dd* is shifted closer to the central area of reflective surface 226 of second optical element 220. In some embodiments, light beam 140*b* may be refracted by a surface 412 of third optical element 410 when light beam 140*b* enters third optical elements 410, and further refracted by a surface 414 of third optical element 410 when exiting third optical element 410 as light beam 140*bb*.

In some embodiments as shown in FIG. 4, third optical element 410 may include one or more pairs of parallel surfaces. For example, surface 412 may be parallel to surface 414. Accordingly, the travel direction of light beam 140*bb* may be parallel to the travel direction of light beam 140*b*. In some embodiments, at least one surface, such as surface 414 or surface 412 may be tilted relative to surface 214 of wedge prism 216. In some embodiments, third optical element 410 may comprise a parallel glass plate. In some embodiments, the degree of refraction of light beam 140*b*, and the corresponding shifting distance of light beam 140*b* to light beam 140*bb* caused by third optical element 410 may be related to the thickness of third optical element 410, the material comprising third optical element 410, and/or an angle by which surface 412 or 414 of third optical element 410 is tilted relative to wedge prism 216. For example, the thicker the parallel glass plate, or the higher the refractive index of the material used in third optical element 410, the higher degree the light beam 140*b* may be refracted at surface 412, and thus the light beam (e.g., light beam 140*dd*) can be more translated or shifted toward the central area of reflective surface 226. In some embodiments, third optical element 410 may have a high refractive index, such as a refractive index above 1.8.

FIGS. 5A-5D show schematic diagrams of various optical assemblies for any of the exemplary scanning LiDAR systems disclosed herein, in accordance with embodiments of the present disclosure. In some embodiments, an optical assembly 510 of FIG. 5A may correspond to optical assembly 107 and collimating element 114 of LiDAR system 100 of FIG. 1A, or optical assembly 207 and collimating element 114 of LiDAR system 200 of FIG. 2. In some embodiments, an optical assembly 520 of FIG. 5B may correspond to optical assembly 400, third optical element 410, and collimating element 114 of LiDAR system 400 of FIG. 4, wherein light beam can be shifted (e.g., a translation) toward the center of reflective surface 226 of second optical element 220.

Figure 5A:
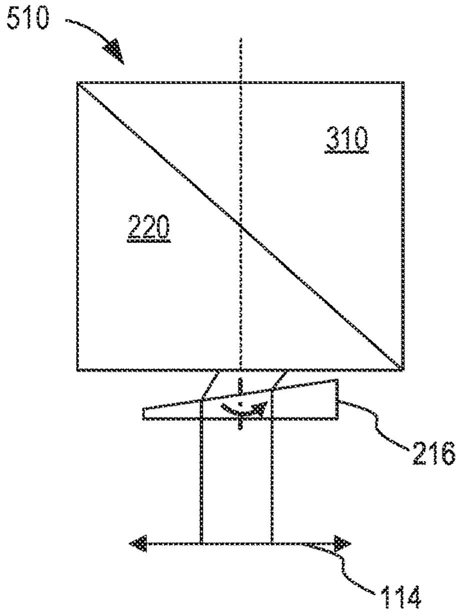
FIGS. 5A-5D show schematic diagrams of various optical assemblies for an exemplary scanning LiDAR system, in accordance with embodiments of the present disclosure.
Figure 5B:
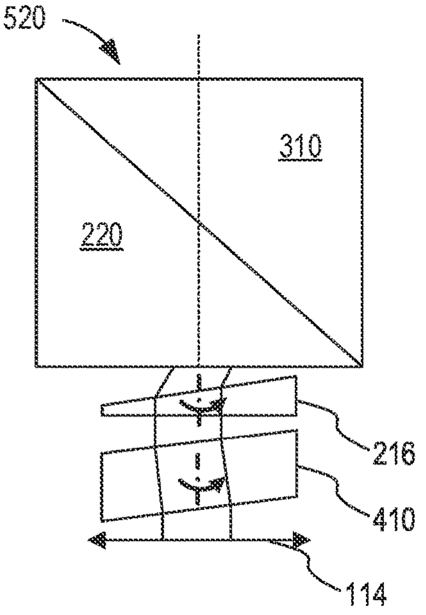
Figure 5C:
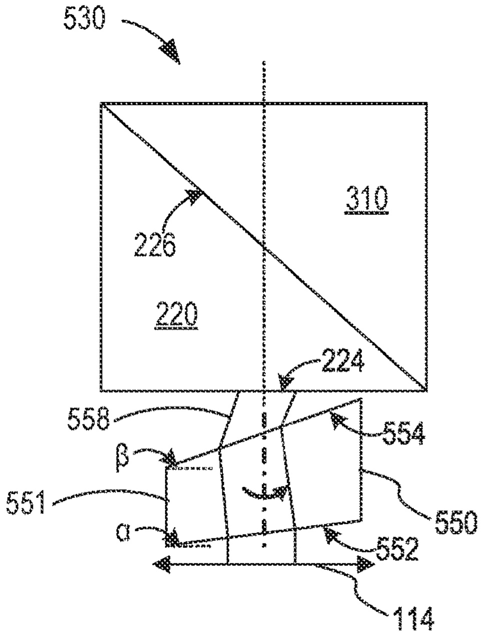

In some embodiments, as shown in an optical assembly 530 of FIG. 5C, third optical element 410 and wedge prism 216 in FIG. 5B may be replaced by an optical element 550 to obtain a similar effect of shifting a light beam 558 toward the central area of reflective surface 226 of second optical element 220. Optical element 550 may be a special-shaped or irregular prism. In comparison to optical assembly 520, fewer optical elements are included to construct optical assembly 530, thus the LiDAR system can be more compact and less complicated. Further, compared to optical assembly 510, the light beam may be received at the central area of reflective surface 226 in optical assembly 530, which is also beneficial for more compact LiDAR systems.

In some embodiments, a pitch angle (e.g., pitch angle $\theta$ in FIG. 1C) related to a vertical range of a scanning field of view of the outgoing light beam (e.g., light beam 225 in FIG. 2) may be determined based on multiple factors, such as refractive indexes of materials used in one or more optical elements, sizes of the one or more optical elements, and/or arrangements between the one or more optical elements, etc. of the LiDAR system. For example, with respect to a certain range of the pitch angle, in order to reduce the size of optical assembly 530, a material with suitable refractive index and/or suitable shape may be selected for optical element 550. In one example, for the pitch angle (e.g., pitch angle $\theta$ in FIG. 1C) in a range between −60° to 30°, optical element 550 in optical assembly 530 may be made of a transparent material having a refractive index in a range from 1.9-2.1, such as any value of 1.9, 1.95, 2.0, 2.05 and 2.1. In various embodiments, the range for pitch angle $\theta$ may be variable. For instance, it may be in a range of −50° to 20°, or −20° to 50° or any other suitable range. In some cases, when the range for the pitch angle is large, optical element 550 has a relatively high refractive index (e.g., close to a value of 2). For example, optical element 550 may be composed of glass type H-ZLAF90 with a refractive index of 2.00. As shown in FIG. 5C, optical element 500 may have four sides including a pair of parallel sides. A shortest side may have a length from 5 mm to 20 mm, such as any number of 5 mm, 7 mm, 10 mm, 12 mm, 15 mm, 18 mm, and 20 mm. For example, a side 551 of optical element 500 may have a length of 10 mm.

With reference to FIG. 5C, in some embodiments, first surface 552 of optical element 550 provided as irregular prism may have a first tilt angle $\alpha$ in a range from 10° to 30°, such as any angle of 10°, 12°, 15°, 18°, 20°, 22°, 25°, 28°, and 30°, where first surface 552 is closer to collimating element 114 and first tilt angle α is measured between first surface 552 and a direction parallel to collimating element 114. For example, first tilt angle α may be 26°. In some embodiments, second surface 554 may have a second tilt angle β in a range from 30° to 50°, such as any angle of 30°, 32°, 35°, 38°, 40°, 42°, 45°, 48°, and 50°, where second surface 554 is farther from collimating element 114 (or closer to first surface 224 of second optical element 220) and second tilt angle β is measured between second surface 554 and the direction parallel to collimating element 114. For example, second tilt angle β may be 40°. In some embodiments, to make optical assembly 530 more compact, first tilt angle α is selected to be larger than 10°, and a difference between second tilt angle β and first tilt angle α is larger than 10° (correspondingly, a distance between first surface 552 and second surface 554 may be increased) to further bend the outgoing light beam toward the central area of reflective surface 226. In some embodiments, optical assembly 530 of FIG. 5C may help to refract the outgoing light beam (e.g., light beam 558) toward the central area of reflective surface 226 of optical element 220 to make optical assembly 530 more compact. For example, compared to optical assembly 510 of FIG. 5A using wedge prism 216 (e.g., made from glass type H-ZF72A with a refractive index of 1.9229 and a wedge angle of 21°), optical assembly 530 of FIG. 5C may reduce the width of second optical element 220 by about 20% by using optical element 550. By making the optical assembly smaller, the motor power consumption and the noise can also be reduced.

Figure 5D:
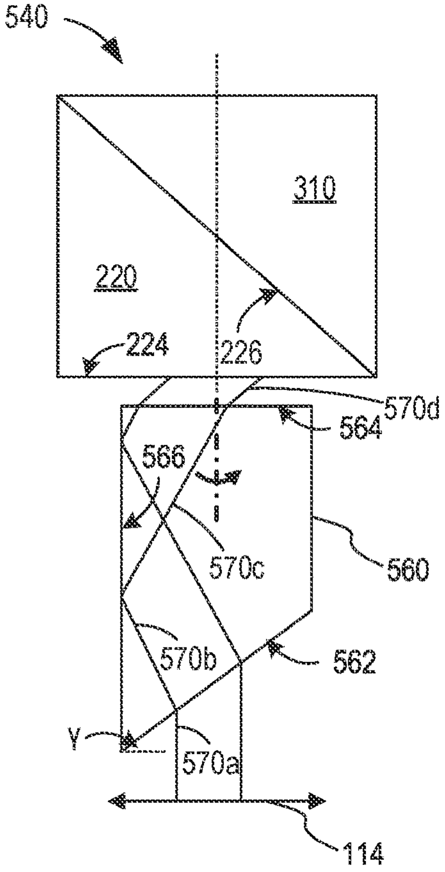

In some embodiments, as shown in FIG. 5D, an optical element 560 for an optical assembly 540 may be used to obtain a similar effect of shifting a light beam 570*d* toward the central area of reflective surface 226 of second optical element 220. In some embodiments, optical element 560 may comprise a prism. In some embodiments, optical element 560 includes a first surface 562 and a second surface 564 that are connected by a side wall with an inner surface 566 as shown in FIG. 5D. In some embodiments, light beam 570*a* collimated by collimating element 114 may be refracted by first surface 562 to form a light beam 570*b* to be transmitted to inner surface 566 of the side wall. In some embodiments, light beam 570*b* may be reflected by inner surface 566 of the side wall to form a light beam 570*c*. In some embodiments, after refracted by surface 562, the angle of light beam 570*b* incident on surface 566 may allow light beam 570*b* to be totally internally reflected by surface 566. In some embodiments, light beam 570*c* may be incident on and refracted by second surface 564 to form light beam 570*d* when exiting optical element 560 toward first surface 224 of second optical element 220, such that light beam 570*d* may be further refracted by first surface 224 toward the central area of reflective surface 226 of second optical element 220.

In some embodiments, inner surface 566 of the side wall of optical element 560 may be coated with a highly reflective film. In some embodiments, first surface 562 of optical element 560 is closer to collimating element 114 and may have a tilt angle γ measured between first surface 562 of optical element 560 and the direction parallel to collimating element 114. Tilt angle γ may be adjusted to redirect light beam 570*a* by first surface 562 such that refracted light beam 570*b* can be totally reflected at inner surface 566 of the side wall, e.g., such that the incident angle of light beam 570*b* is greater a total internal reflection (TIR) angle. In some embodiments, the degree of refraction can be controlled by controlling the material of optical element 560. In some embodiments, second surface 564 may be substantially parallel to collimating element 114. In some other embodiments, second surface 564 may be tilted relative to collimating element 114.

Figure 6A:
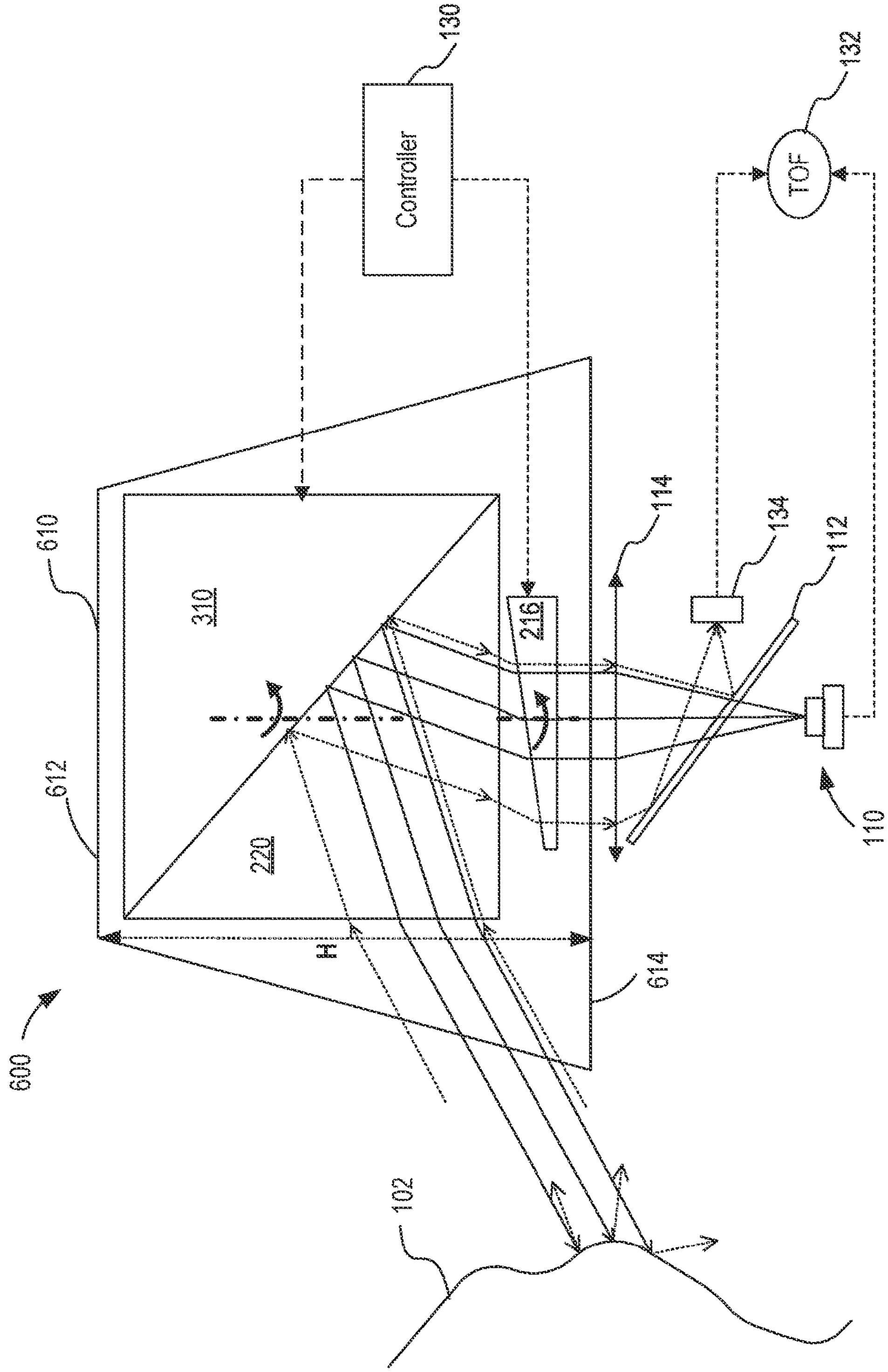
FIGS. 6A and 6B show schematic diagrams of exemplary scanning LiDAR systems, in accordance with embodiments of the present disclosure.
Figure 6B:
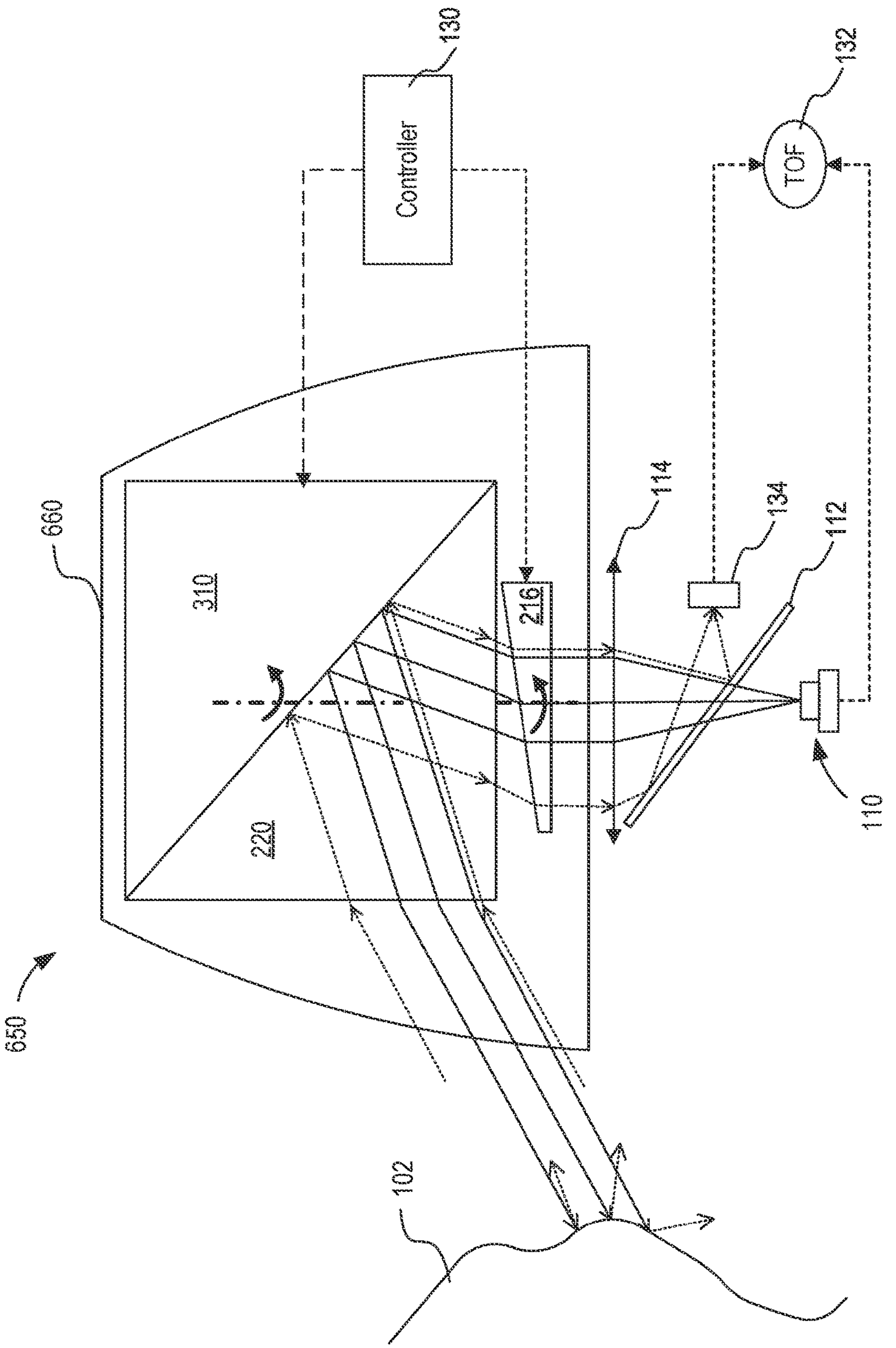

FIGS. 6A and 6B show schematic diagrams of exemplary scanning LiDAR systems 600 and 650, respectively, in accordance with embodiments of the present disclosure. Elements of LiDAR systems 600 and 650 that are the same as elements of LiDAR system 100, 200, 300, and 400 are identified by the same reference numbers. LiDAR system 600 or 650 may be a monostatic scanning LiDAR system. In some embodiments, the light path in a LiDAR system using a coaxial path may be affected by various noise, such as stray light. In some embodiments, stray light may include light emitted by light source 110 and scattered and/or reflected by one or more optical elements and/or other components of the LiDAR system, e.g., balancing element 310, light source 110, receiver 134, or inner surface(s) of housing 223 of FIG. 2. The stray light may be detected by receiver 134 and negatively affect the analysis of effective signals, thus reducing the accuracy of the TOF calculation and efficiency of the LiDAR system. For example, when the LiDAR system is applied to scan an environment closer to the movable object, the noise signal caused by stray light may have a greater impact on accuracy. Some embodiments as described herein may reduce the interference of the stray light to receiver 134 by causing the stray light to deviate from a receiving range of receiver 134. Further, two or more embodiments as described herein may be combined to reduce or eliminate the negative impact of the stray light to the LiDAR system and are within the scope of the present disclosure.

In some embodiments, in order to reduce the negative effect of the stray light in LiDAR system 600, a housing 610 for containing wedge prism 216, second optical element 220, and balancing element 310 may be made into a cone shape as shown in FIG. 6A. Housing 610 may be transparent or composed of material(s) that can pass light to the scanned environment. In some embodiments, a housing 660 with an arc shape may be used in a LiDAR system 650 as shown in FIG. 6B to reduce noise from stray light. Housing 610 may be transparent or composed of material(s) that can pass light to the scanned environment. In some embodiments, cone-shaped housing 610 or arc-shaped housing 660 can cause the light incident on and reflected or scattered by surfaces of housing 610 or housing 660 to deviate from a receiving range of receiver 134. In some embodiments, the degree of reduction of the stray light may be related to the inclination of cone-shaped housing 610 or the curvature of curved surface of housing 660.

In some embodiments, housing 610 with a cone shape may have a taper in a range from 1.3 to 1.7, such as any value of 1.3, 1.4, 1.5, 1.6 and 1.7, where the taper is measured as a ratio of a difference in diameters of a top cross-sectional circle 612 and a bottom cross-sectional circle 614 to a height (H) of the cone. For example, when the taper of the cone-shaped housing 610 is about 1.5, the noise from the stray light may be effectively reduced.

Figure 6C:
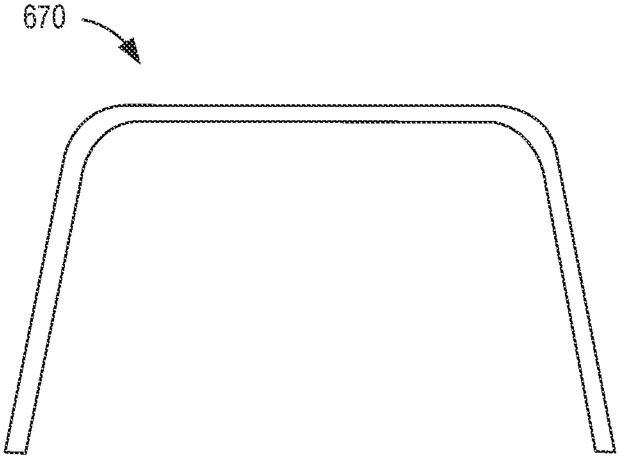
FIGS. 6C and 6D show schematic diagrams of exemplary housings for containing one or more optical elements of a scanning LiDAR system, in accordance with embodiments of the present disclosure.

FIG. 6C shows a schematic diagram of an exemplary housing 670 for containing one or more optical elements, such as wedge prism 216 and second optical element 220 or any other suitable optical elements as described herein, of a scanning LiDAR system (e.g., any LiDAR system as described herein), in accordance with embodiments of the present disclosure. Housing 670 can be housing 610 of FIG. 6A, housing 660 of FIG. 6B, or housing 1300 of FIG. 13A. Housing 670 may be composed of a material with uniform thickness. Housing 670 may also be composed of multiple materials with different thicknesses.

Figure 6D:
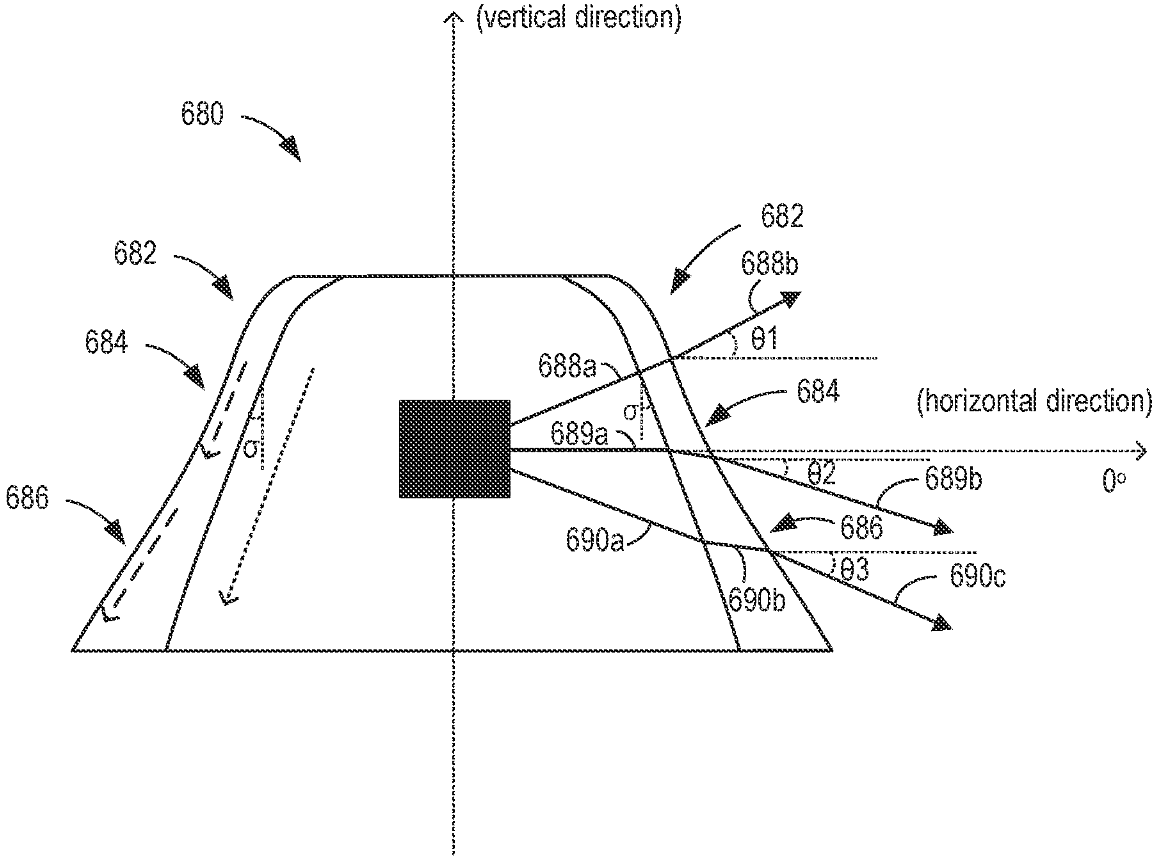

FIG. 6D shows a schematic diagram of an exemplary housing 680 for containing one or more optical elements of a scanning LiDAR system, in accordance with embodiments of the present disclosure. Housing 680 may be composed of material(s) similar to housing 610, 660, 670, or 1300. For example, housing 680 may be composed of a material with low refractive index, such as below 1.65. Housing 680 may be composed of a transparent plastic material, a transparent glass, a transparent polymer, etc. Housing 680 may include a light emitting section with a uniform wall thickness from a top view or a front view. Housing 680 may include multiple light emitting sections each with a uniform or non-uniform wall thickness from a top view or a front view. In an example embodiment, at least two light emitting sections may extend at an angle, and the junction of adjacent light emitting sections may be coated with ink or paint to avoid the risk of false measuring points when the light beam penetrates two different light emitting sections. The light emitting sections of the housing 680 may form a closed or unclosed circumference from a top view. For example, as shown in FIG. 6D, housing 680 is formed by three sections including a first section 680 having a uniform wall thickness, a second section 684 having a uniform wall thickness, and a third section 686 having a non-uniform wall thickness. In other embodiments, the housing 680 may include a different number of sections, such as one, two, four, five, six sections etc., where each section has a uniform or non-uniform wall thickness respectively.

In some embodiments, housing 680 includes a first section 682 having a uniform wall thickness. In some embodiments, the inner surface of first section 682 may be an inclined surface or a curved surface. For example, first section 682 may include curved or inclined corners as shown in FIG. 6D. The inclination angle of the inclined surface or the curvature of the curved surface may be determined according to an angle of the light incident on the inner surface of housing 680 on first section 682, such as a light beam 688*a* exiting the optical assembly, from e.g., reflective surface 120 or second surface 228 of second optical element 220. In some embodiments, the inclination angle of the inclined surface or the curvature of the curved surface may be designed to avoid light beam 688*a* to be directly incident on the inner wall of housing 680 to reduce or avoid stray light.

In some embodiments, first section 682 may have a non-uniform wall thickness, light beam 688*a* may be incident on first section 682, and refracted by first section 682 of housing 680 to form a light beam 688*b* exiting the LiDAR system. In some embodiments, first section 682 may have a uniform wall thickness, light beam 688*b* may be shifted vertically or/and laterally relative to a position at which light beam 688*a* would have exited the optical assembly without presence of first section 682 of housing 680. In some embodiments, when one or more optical elements of the optical assembly rotate, light beam 688*b* of the LiDAR system may scan a field with an azimuth angle from 0° to 360°, and a pitch angle θ1 (e.g., an angle between light beam 688*b* and the horizontal direction at 0°) above 0°, such as 0° to 5°. For example, pitch angle θ1 may be configured to be above a target angle value, wherein the target angle value may range between 0° and a few tens of degrees.

In some embodiments, housing 680 includes a second section 684 having a uniform wall thickness. An inclination angle σ (e.g., a half-taper angle of the cone-shaped portion) of second section 684 is in a range from 3° to 10°. The inclination angle of second section 684 may also be selected to avoid a light beam 689*a* to be directly incident on the inner wall of housing 680 to reduce or avoid stray light.

In some embodiments, second section 684 may have a non-uniform wall thickness, light beam 689*a* may be incident on second section 684, and refracted by second section 684 of housing 680 to form a light beam 689*b* exiting the LiDAR system. In some embodiments, when one or more optical elements of the optical assembly rotate, light beam 689*b* of the LiDAR system may scan a field with an azimuth angle from 0° to 360°, and a pitch angle θ2 (e.g., an angle between light beam 689*b* and the horizontal direction at 0°) in a range from −20° to 0°. In some embodiments, second section 684 may have a uniform wall thickness, light beam 689*a* may be shifted vertically or/and laterally relative to a position at which light beam 689*a* would have exited the optical assembly without presence of second section 684 of housing 680.

In some embodiments, housing 680 further includes a third section 686 with the thickness that increases towards the bottom of the housing 680. For example, as shown in FIG. 6D, an inner wall of housing 680 may have a uniform inclination (e.g., along a substantially straight as illustrated in dotted line arrow) in both second section 684 and third section 686, whereas the inclination of an outer wall of housing 680 may change in different sections. For example, as shown in the dashed lines with arrows, the outer wall in second section 684 may have a smaller inclination angle (relative to the horizontal direction) than the outer wall of third section 686. As such, the thickness of third section 686 increases towards the bottom of housing 680. For example, a light beam 690*a* may be incident on third section 686, and refracted by the inner surface of third section 686 of housing 680, to form a light beam 690*b*, which is further refracted by the outer surface of third section 686 when exiting the LiDAR system, to form a light 690*c*. In an example embodiment, third section 686 may have a uniform wall thickness, light beam 690*c* may be substantially shifted relative to a position at which light beam 690*a* would have exited the optical assembly without a presence of the transparent housing.

In some embodiments, when one or more optical elements of the optical assembly rotate, light beam 690*c* of the LiDAR system may scan a field with an azimuth angle from 0° to 360°, and a pitch angle θ3 (e.g., an angle between light beam 690*c* and the horizontal direction at 0°) below −20°, such as in a range from −60° to −20°. In general, the thicker the wall of housing 680 is, the more it bends the light beam, thereby refracting the light beam (e.g., light beam 690*c*) toward a lower direction to provide a wider scannable field of view along the vertical direction, e.g., toward lower range in FIG. 6D. In some embodiments, a difference or a ratio between a thickness of third section 686 and a thickness of second section 684 can be adjusted to obtain a desired field of view. For example, the thicker third section 686 than second section 684 is, the wider the field of view can be obtained (e.g., a bigger range of pitch angle θ3 can have).

Accordingly, by selecting suitable inclination angle(s) or surface curvature(s) of first section 682 and/or second section 684 of housing 680, stray light can be effectively reduced or avoided. Further, by selecting suitable thickness and the degree of change of the thickness of third section 686, the field of view scannable by the LiDAR system, e.g., along the vertical direction, can be increased. For example, by using the design of housing 680 with a thicker section in third section 686, compared to housing 670 in FIG. 6C, the field of view scannable by the LiDAR system can be increased from a range of −20° to 5°, to a range of −60° to 5°.

It is appreciated that first section 682, second section 684, and third section 686 are examples of housing 680 that can be used for reducing stray light and/or widening the scannable field of view of the LiDAR system, and are not intended to be limiting. Any number of section(s) similar to any of first section 682, second section 684, and third section 686 can be arranged in any suitable sequence, inclination angle, and/or thickness for the housing of the LiDAR system to provide a desired scannable field of view.

Figure 7A:
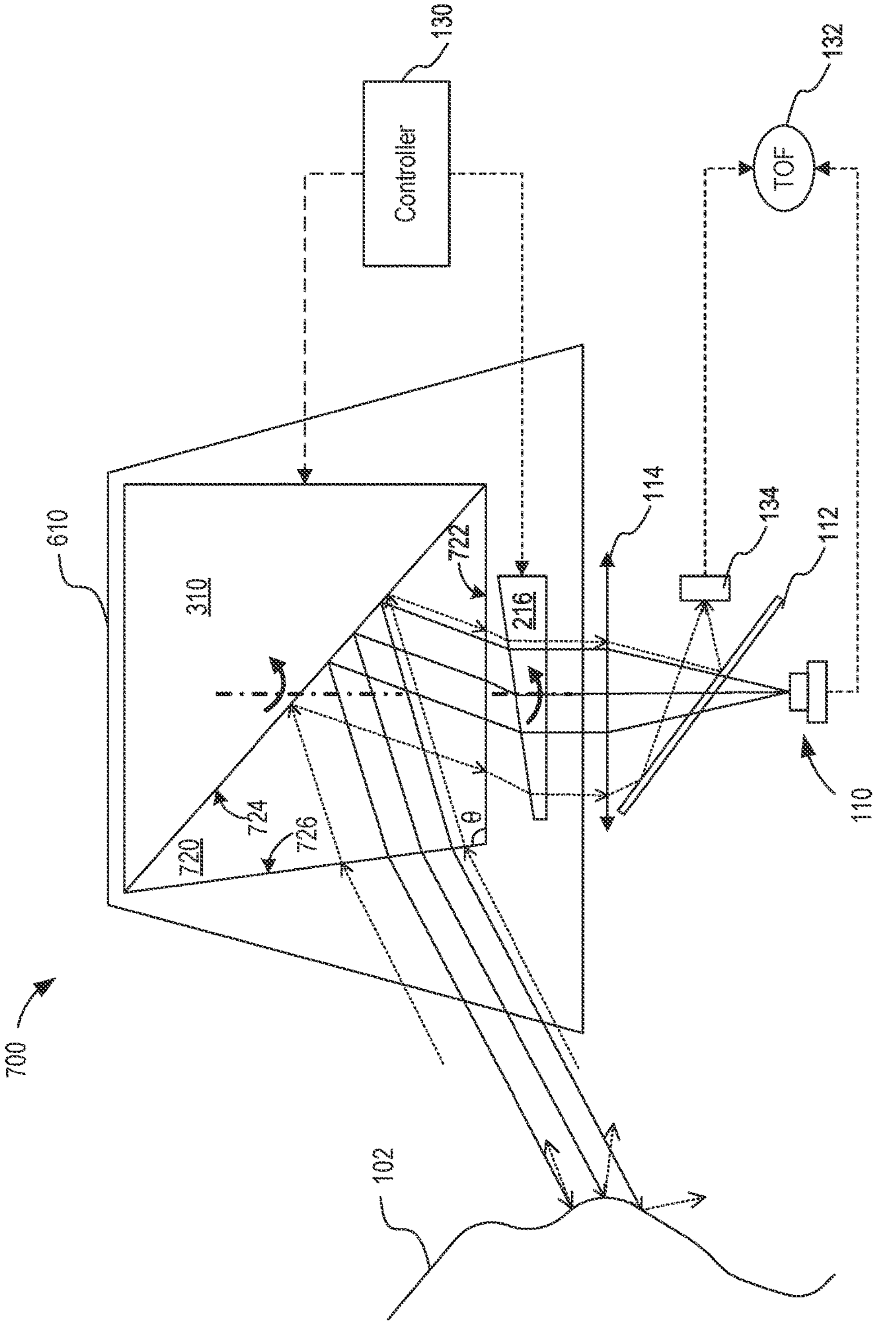
FIG. 7A shows a schematic diagram of an exemplary scanning LiDAR system, in accordance with embodiments of the present disclosure.

FIG. 7A shows a schematic diagram of an exemplary scanning LiDAR system 700, in accordance with embodiments of the present disclosure. Elements of LiDAR system 700 that are the same as elements of LiDAR system 100, 200, 300, 400, 600, and 650 are identified by the same reference numbers. LiDAR system 700 may be a monostatic scanning LiDAR system. In some embodiments, to further reduce the negative effect on LiDAR system 700 from the stray light, a light exit surface, such as a surface 726, of a second optical element 720 may be provided as an inclined surface. In some embodiments as shown in FIG. 7A, LiDAR system 700 may use cone-shaped housing 610 shown in FIG. 6A. Further, a light entrance surface 722, and a reflective surface 724 of second optical element 720 may be substantially similar to first surface 224 and reflective surface 226, respectively, of second optical element 220 as described herein. In some embodiments, second optical element 720 may comprise a similar material as second optical element 220. In some embodiments, light exit surface 726 of second optical element 720 and light entrance surface 722 of second optical element 720 may form an obtuse angle θ in a range from 91° to 120°. Obtuse angle θ, as shown in FIG. 7A, may be used to direct light such that the size of the optical assembly can be reduced. A value for angle θ (or possible range of values) may be determined according to multiple factors, such as a refractive index of the material of second optical element 720, refraction angle of light beam refracted by light entrance surface 722, etc. For example, when second optical element 720 is composed of a material having a refractive index of 1.818, the obtuse angle may be about 100°.

In some embodiments, by making light exit surface 726 an inclined surface, the space occupied by the optical assembly of LiDAR system 700 can be reduced. Thus, the inclined surface for light exit surface 726 may be used to make the optical assembly more compact. The inclined surface for light exit surface 726 may also reduce the negative impact by the stray light. For example, the inclined light exit surface may be used in conjunction with other methods described in the present disclosure, such as cone-shaped housing 610 or arc-shaped housing 660, to reduce the system space while decreasing the system noise from the stray light.

Figure 7B:
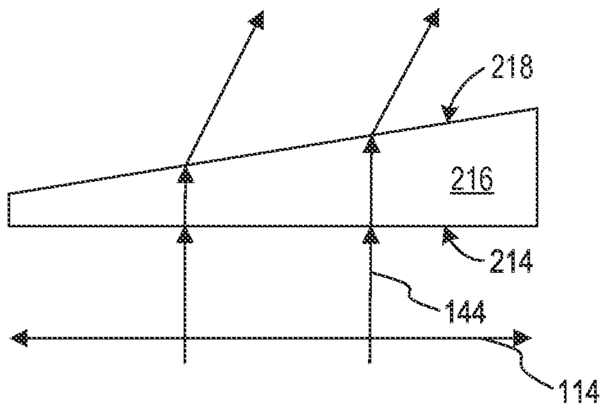
FIGS. 7B and 7C show schematic diagrams of exemplary optical elements of a scanning LiDAR, in accordance with embodiments of the present disclosure.

FIG. 7B show a schematic diagram of wedge prism 216 of a scanning LiDAR system, in accordance with embodiments of the present disclosure. As described above, wedge prism 216 may include a wedge angle between first surface 214 and second surface 218 in a range from 18° to 23°, such as any angle of 18°, 19°, 20°, 21°, 22°, and 23°. For example, wedge prism 216 may have a wedge angle of about 21°. In some embodiments, wedge prism 216 may be positioned such that first surface 214 may be substantially parallel to collimating element 114.

Figure 7C:
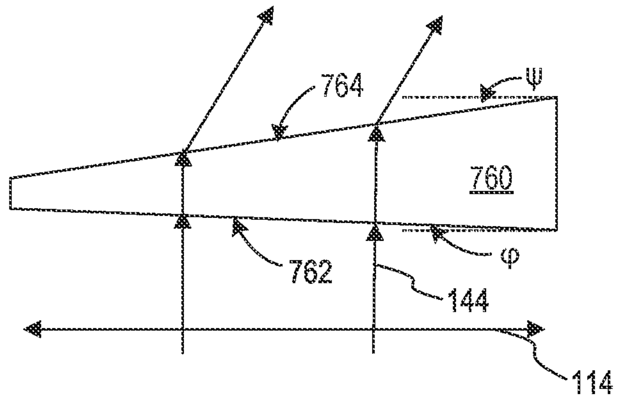

FIG. 7C show a schematic diagram of an exemplary optical element 760 (e.g., a transmission prism) as an alternative to wedge prism 216 for various scanning LiDAR systems, in accordance with embodiments of the present disclosure. In some embodiments, optical element 760 may be a wedge prism with a wedge angle between a first surface 762 and a second surface 764 in a range from 16° to 25°. For example, optical element 760 may have a wedge angle of about 21°.

In some embodiments as shown in FIGS. 2 and 7B, stray light may be detected from reflection of light beam 144 received from collimating element 114 by first surface 214 of wedge prism 216. In order to reduce the stray light, at least one surface of optical element 760 may be tilted as shown in FIG. 7C. In some embodiments, first surface 762 closer to collimating element 114 may be tilted, so that the stray light of a predetermined path can deviate from the receiving range of receiver 134. For example, as shown in FIG. 7C, first surface 762 may be tilted clockwise. In some embodiments, first surface 762 of optical element 760 may have an inclination angle φ, measured between first surface 762 and a direction parallel to the collimating element 114, in a range from 5° to 9°, such as any angle of 5°, 6°, 7°, 8°, and 9°. In some embodiments, a second surface 764 of optical element 760, farther from collimating element 114, may have an inclination angle ψ, measured between second surface 764 and the direction parallel to the collimating element 114 shown in FIG. 7C, in a range from 12° to 16°, such as any angle of 12°, 13, 14°, 15°, and 16°. For example, as shown in FIG. 7C, first inclination angle φ may be about 7° and second inclination angle ψ may be about 14°. Accordingly, stray light may be effectively reduced by using optical element 760. It is appreciated that the parameters of optical element 760 as described herein are discussed for illustrative purpose and are not intended to be limiting. Optical element 760 may have any other appropriate and optimized tilt angle(s) and/or wedge angle for effectively reducing stray light of the LiDAR system.

Figure 8:
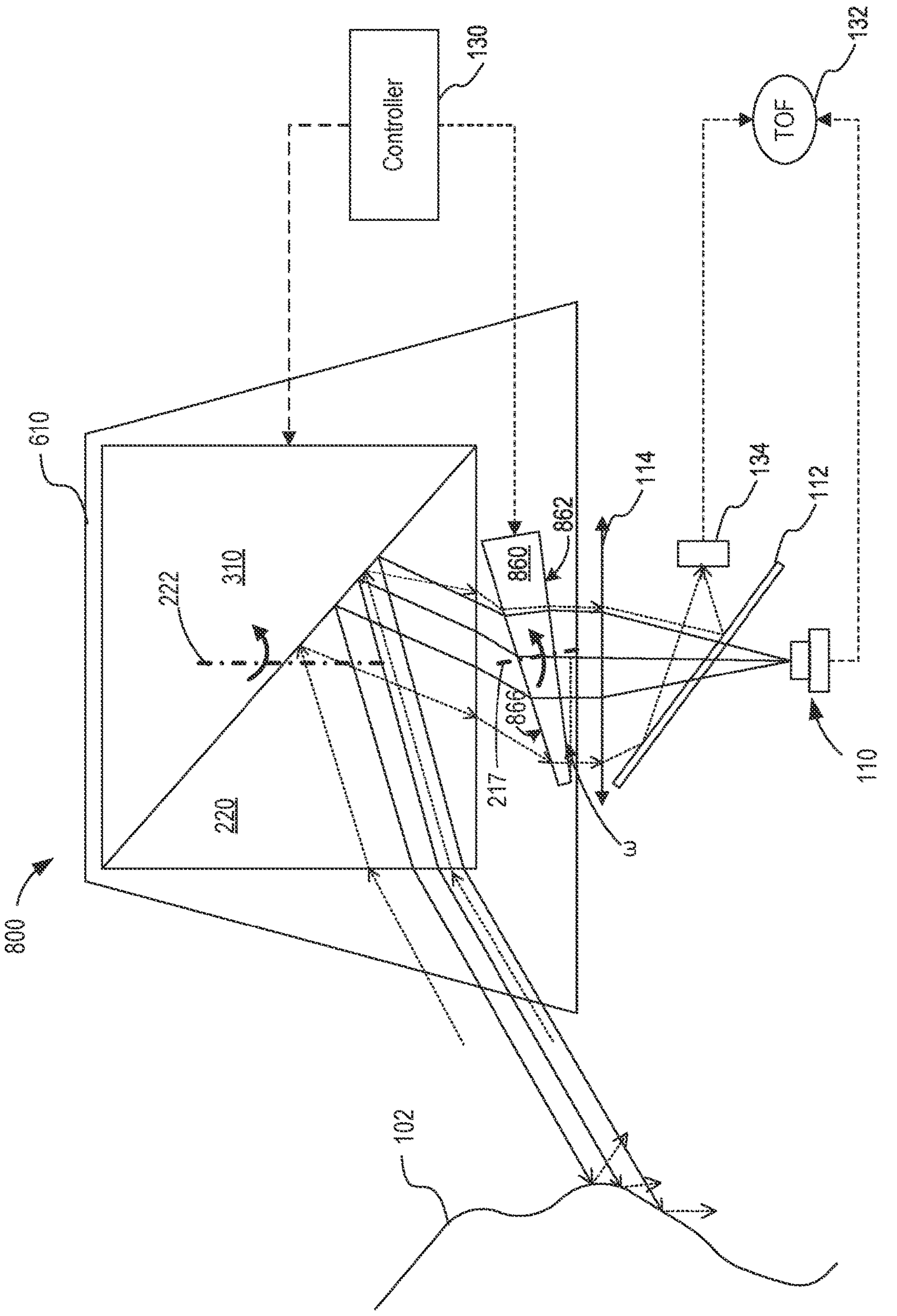
FIG. 8 shows a schematic diagram of an exemplary scanning LiDAR system, in accordance with embodiments of the present disclosure.

FIG. 8 shows a schematic diagram of an exemplary scanning LiDAR system 800, in accordance with embodiments of the present disclosure. Elements of LiDAR system 800 that are the same as elements of LiDAR system 100, 200, 300, 400, 600, 650, and 700 are identified by the same reference numbers. LiDAR system 800 may be a monostatic scanning LiDAR system. LiDAR system 800 may include a first optical element 860, such as a wedge prism, or a transmission prism. In some embodiments, first optical element 860 may be composed from similar material as first optical element 116 or 216. The wedge prism of first optical element 860 may have similar wedge angle as the wedge prism of first optical element 116 or 216. In some embodiments, first optical element 860 may be tilted relative to collimating element 114. As a result, a first surface 862 closer to collimating element 114 is tilted, so that the stray light of a predetermined path can deviate from the receiving range of receiver 134. For example, first optical element 860 may be tilted in a counter-clockwise direction, as shown in FIG. 8. First optical element 860 may also be tilted in a clockwise direction to reduce the stray light. A tilt angle ω, measured between first surface 862 of the optical element 860 and a direction parallel to collimating element 114, may be in a range from 5° to 10°, such as any angle of 5°, 6°, 7°, 8°, 9°, and 10°. As a result, as shown in FIG. 8, first axis 217 about which first optical element 860 rotates may be tilted relative to second axis 222 for second optical element 220 to reduce the reflected light being received by element 134. In some embodiments, first optical element 860 may instead be tilted in a clockwise direction as shown in FIG. 7C. It is appreciated that the parameters discussed in FIG. 8 are for illustrative purpose and are not intended to be limiting. The tilt angle(s) and/or direction of optical element 860 may be determined based on various embodiments of LiDAR system 800 during a system simulation process. In some embodiments, first optical element 860 may be inclined to have tilt angle ω of about 7° relative to collimating element 114 for effectively reducing or eliminating stray light for system 800.

Figure 9B:
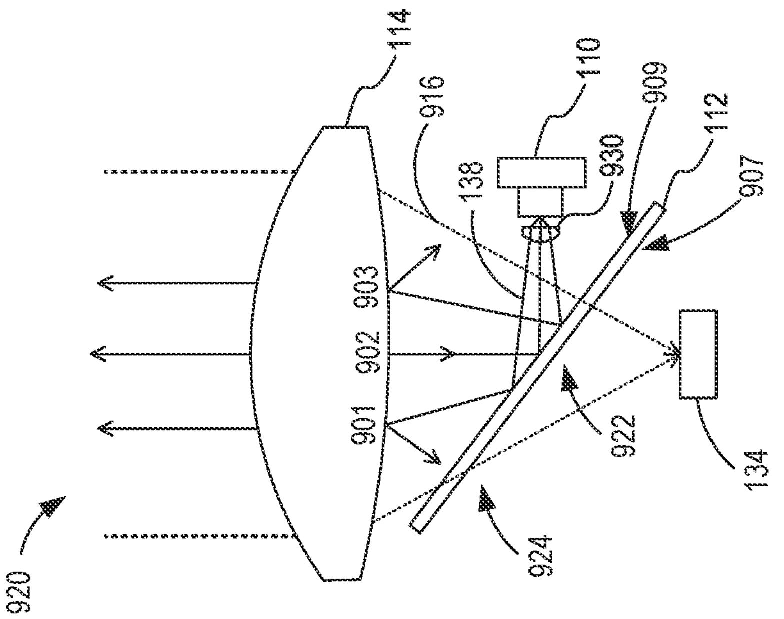
FIGS. 9A-9E show schematic diagrams of ranging modules for various embodiments of scanning LiDAR systems, in accordance with embodiments of the present disclosure.
Figure 9A:
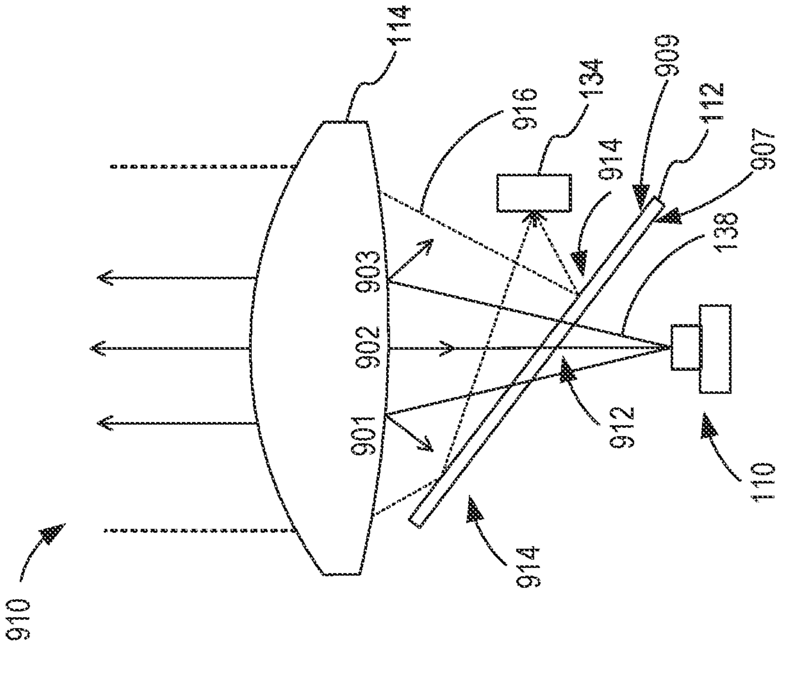

FIGS. 9A and 9B show schematic diagrams of ranging modules 910 and 920, respectively, for various embodiments of scanning LiDAR systems, in accordance with embodiments of the present disclosure. In some embodiments as shown in FIGS. 9A and 9B, each ranging module 910 and 920 comprises reflector 112, collimating element 114, light source 110, and receiver 134 at respectively different positions. In some embodiments as shown in FIG. 9A, ranging module 910 includes reflector 112 including a first area 912 to transmit light beam 138 generated by light source 110. First area 912 of reflector 112 may be in the central thereof. Light source 110 may be spaced from reflector 112 and placed on a first side 907 of reflector 112, opposite a second side 909. Both surfaces of first side 907 and second side 909 of the central area may be coated with anti-reflective coating for transmitting light beam 138. Reflector 112 may further include a second area 914, e.g., located on peripheral areas, and coated with a highly reflective coating on second side 909 for reflecting return beam 916 towards receiver 134. Receiver 134 may be spaced from reflector 112 and placed adjacent second side 909, of optical element 112. In some embodiments, collimating element 114 is located between reflector 112 and wedge prism 216 (not shown in FIG. 9A).

In some embodiments, a portion of light beam 138 emitted by light source 110 is transmitted through the central area of reflector 112. In some embodiments, the laser diode of light source 110 may have a large light emitting angle, e.g., covering a wide range. In some embodiments, the emitting angle of light beam 138 may be controlled by the area and/or the position of the anti-reflective coating applied on the central area of reflector 112. In some embodiments of ranging module 910, stray light caused by a light beam reflected in the central area of outgoing beam 138 (e.g., light beam 902 in FIG. 9A) may significantly affect performance of the LiDAR system.

In some embodiments, positions of light source 110 and receiver 134 may be switched, as shown in FIG. 9B to reduce the stray light. For example, light source 110 may be placed adjacent second side 909 of reflector 112, and receiver 134 may be placed adjacent first side 907 of reflector 112. In some embodiments, as shown in FIG. 9B, ranging module 920 includes reflector 112 comprising a first area 922 to reflect light beam 138 generated by light source 110. First area 922 of reflector 112 may be in the central area. A surface of first area 922 facing light source 110 may be coated with a highly reflective coating for reflecting light beam 138. Reflector 112 may further include a second area 924 located on a periphery area, and both surfaces on first side 907 and second side 909 of second area 924 may be coated with an anti-reflective coating for transmitting return beam 916 for receipt by receiver 134 positioned below reflector 112. In some embodiments, collimating element 114 may be located between reflector 112 and wedge prism 216 (not shown in FIG. 9B).

As shown in FIG. 9B, in some embodiments, a beam shaper 930 may be positioned in front of light source 110 to reduce the light emitting angle of light beam 138 emitted from the laser diode of light source 110, and light beam 138 may be concentrated to the central area of reflector 112. In some embodiments, beam shaper 930 may be a single lens, a cylindrical lens, or a group of lenses, designed in accordance with the laser diode and light beam 138 emitted therefrom.

In some embodiments, after switching the positions of light source 110 and receiver 134 as shown in FIG. 9B, the reflected light beam, e.g., light beam 902 in FIG. 9B, in the central area can be blocked by reflector 112, thus reducing stray light detected by receiver 134.

Figure 9D:
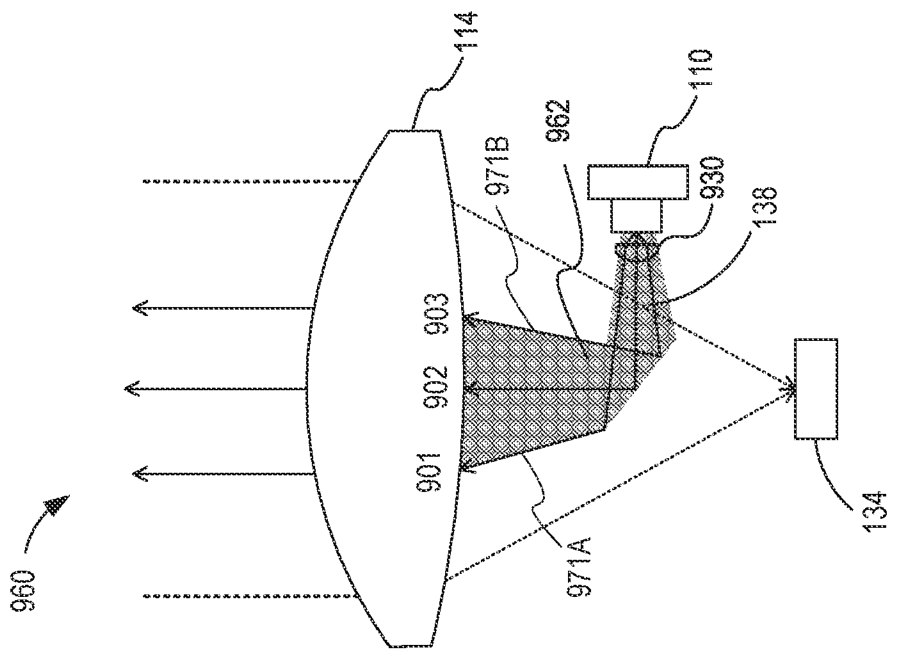
Figure 9C:
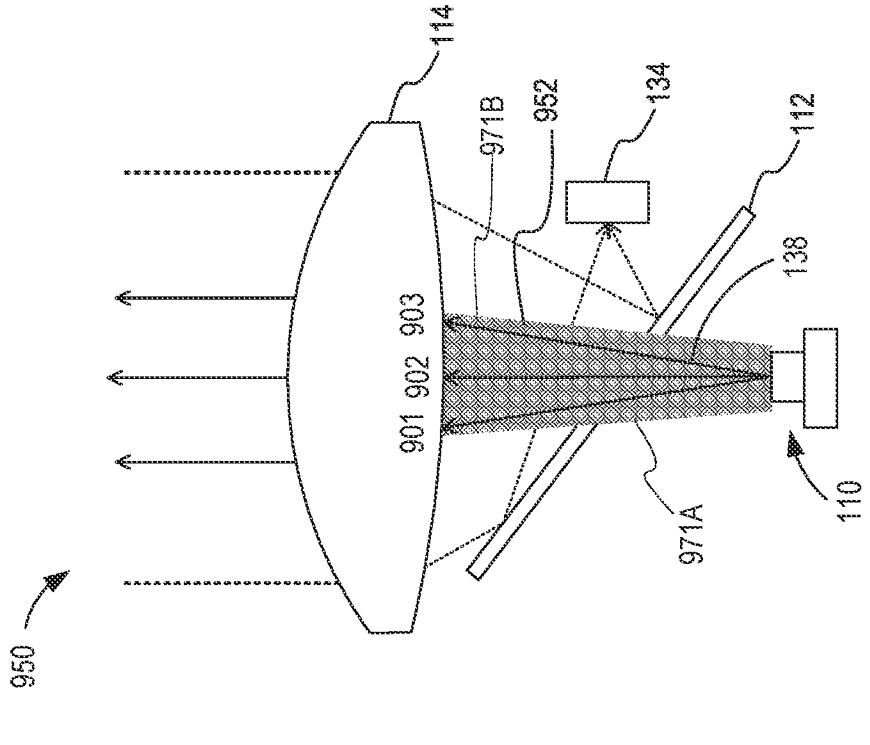

FIGS. 9C and 9D show schematic diagrams of ranging modules 950 and 960, respectively, for various embodiments of scanning LiDAR systems, in accordance with embodiments of the present disclosure. In some embodiments, ranging module 950 of FIG. 9C may be similar to ranging module 910 shown in FIG. 9A, except that ranging module 950 further includes a waveguide 952 positioned between light source 110 and collimating element 114 for guiding light propagation of light beam 138 emitted by light source 110 to collimating element 114 in waveguide 952 for reducing stray light detected by receiver 134.

In some embodiments, ranging module 960 of FIG. 9D may be similar to ranging module 920 as shown in FIG. 9B, except that ranging module 960 further includes a waveguide 962 positioned between light source 110 and collimating element 114 for guiding light propagation of light beam 138 emitted by light source 110 to collimating element 114 in waveguide 962 for reducing stray light detected by receiver 134. In addition, ranging module 960 in FIG. 9D may not include a reflector (such as reflector 112 in FIG. 9C), as the side wall of waveguide 962 can reflect light beam 138 to collimating element 114, thus making the structure of ranging module 960 more compact. In some embodiments, light source 110 and receiver 134 may be disposed at the same level to make the optical assembly more compact. In such system, one or more optical elements (e.g., inclined, including reflective and/or transmissive areas, and/or a waveguide) may be disposed between light source 110 and collimating element 114 to direct the outgoing light beam emitted from light source 110 to collimating element 114, and direct the return light beam from collimating element 114 to be received by receiver 134. In an example embodiment, due to presence of waveguide 962, light can be reflected multiple times in waveguide 962, allowing for reduction of the overall size of module 960, and also allowing for the source 110 and receiver 134 to be on the same plane.

As shown in FIGS. 9C and 9D, by using optical waveguide 952 or 962, stray light generated by the reflection on the surface of collimating element 114 can be effectively avoided. In some embodiments, optical waveguide 952 is integrated with collimating element 114 in ranging module 950 to form a connected optical element. In some embodiments, optical waveguide 962 is integrated with collimating element 114 in ranging module 960 to form a connected optical element. The effective field angle of a light beam received by receiver 134 in FIG. 9C may be slightly larger than that in FIG. 9D. It is appreciated that the various embodiments described herein can be used individually or in combination in various LiDAR systems.

Figure 9E:
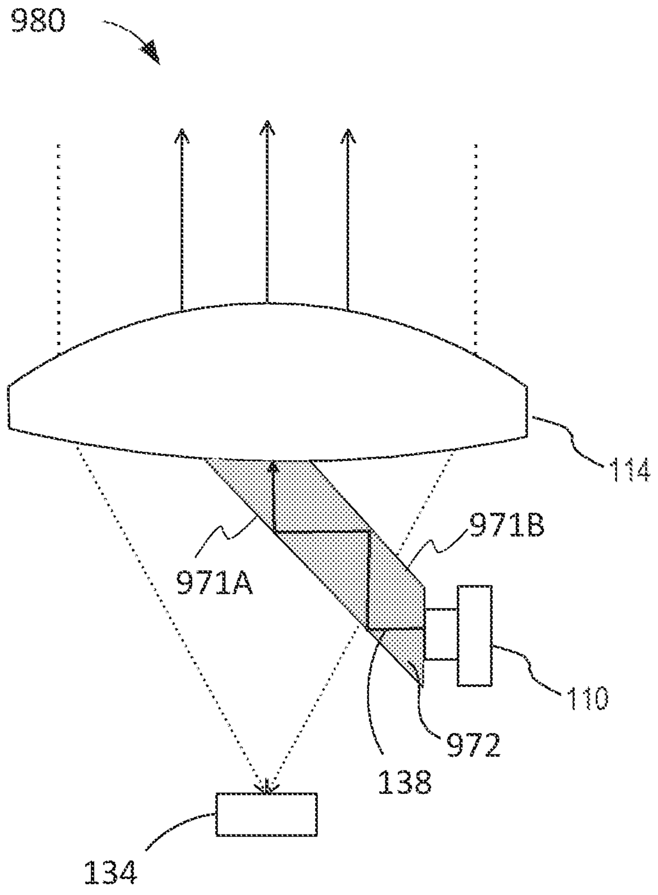

As shown in FIGS. 9C-9E, waveguides 952, 962, and 972 are used to guide light beams (e.g., a light beam 138 is shown in FIGS. 9C-9E) from light source 110 to collimating element 114. In various embodiments, waveguides 952-972 can be made from a light transparent material (e.g., glass, transparent plastic, light transparent crystal, and the like). In one embodiment, light beam 138 may be reflected from sides of waveguides 952-972 (e.g., sides 971A-971B, as shown in FIGS. 9C-9E) due to waveguides 952-972 having a reflective coating over sides 971A-971B. For example, sides 971A-971B may be coated with a metallic material having high reflectivity (e.g., 80%, 85%, 90%, 95%, 98%, 99% reflectivity, and the like). In an example embodiment, the metallic material may be aluminum, silver, titanium, cooper, or the like). Alternatively, light beam 138 may be reflected from sides 971A-971B due to total internal reflection. In such a case, the refractive index of waveguides 952-972 may be significantly higher than the ambient refractive index. For example, if the ambient refractive index is about 1 (e.g., if the ambient is air) the refractive index of waveguide 952, 962, or 972 may be 1.4, 1.5, 1.6, 1.7, 1.8, 1.9, 2.0, and the like). In some cases, the refractive index of waveguide 952, 962, or 972 may be higher than 2.0. To achieve total internal reflection, sides 971A-971B may be polished to have a roughness size that is comparable or smaller than a wavelength of light emitted by source 110. For example, if source 110 emits a red light at wavelength of 700 nanometers, the roughness size of sides 971A-971B may be smaller than 700 nanometers. In various embodiments light beams from source 110 are emitted at angles to sides 971A-971B to result in total internal reflection from these sides. In some cases, to ensure reflection from sides 971A-971B, these sides may include multilayer dielectric coating. For example, such a coating may be selected to act as a Bragg reflector. In some cases, waveguides 952, 962, or 972 may include photonic crystal structures (e.g., pores adjacent to sides 971A-971B) that may further improve a reflection of the light beams emitted by source 110 from sides 971A-971B.

Some embodiments as described herein may be used for reducing system aberration. For example, because the housing for containing optical elements of scanning module, such as housing 223, 610, or 660, includes a circular shape and the wall has a certain thickness, the housing may cause aberrations to the corresponding LiDAR system. The materials for making the housing may have certain hardness, stiffness, and optical characteristics. To reduce aberrations caused by the housing, materials with low refractive index with a thin housing wall design may be used. In some embodiments, cone-shaped housing 610 may have a taper in a range from 1.3 to 1.7, such as any value of 1.3, 1.4, 1.5, 1.6, and 1.7. Housing 610 or housing 660 may be composed from a material having a thickness in a range from 0.8 mm to 1.2 mm. Housing 610 or housing 660 may be composed from a material having a low refractive index, e.g., in a range from 1.4 to 1.7, such as any value of 1.4, 1.5, 1.6, and 1.7. For example, housing 610 may have a taper of 1.5, and the material comprising housing 610 may have a thickness of about 1 mm, and a refractive index of about 1.53. It is appreciated that two or more embodiments as described herein may be combined to reduce or eliminate the negative impact of aberrations to the LiDAR system and are within the scope of the present disclosure.

In addition to cone-shaped housing 610 of FIG. 6A, one or more surfaces of second optical element 220 may be curved to compensate for aberrations as described below with reference to FIGS. 10A-10C, 11A-11C, and 12A-12C for application in the various LiDAR systems. In some embodiments, second optical element 220 may be a prism, such as a triangular prism, a right-angle prism, or any other suitable prism (such as the irregular-shaped prism) as described herein. In some embodiments, surfaces 224, 226, or 228 for refracting or reflecting the light beams as described with reference to FIG. 2 may be curved to compensate for aberrations.

Figure 10B:
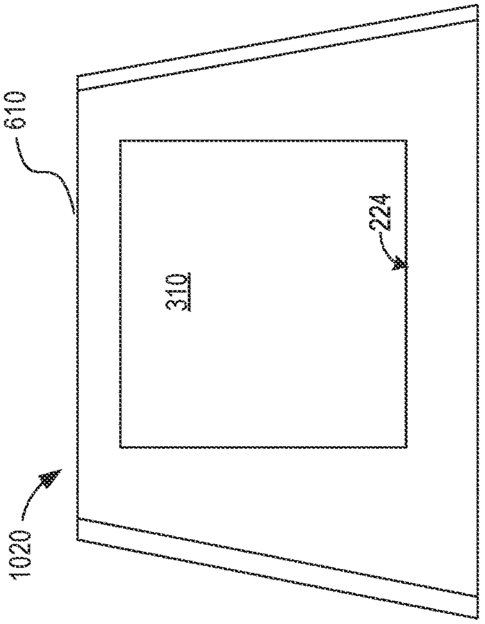
FIGS. 10A-10C show schematic diagrams of a housing containing an optical element attached to a balancing element in a front view (FIG. 10A), a right side view (FIG. 10B), and a top view (FIG. 10C), in accordance with embodiments of the present disclosure.
Figure 10C:
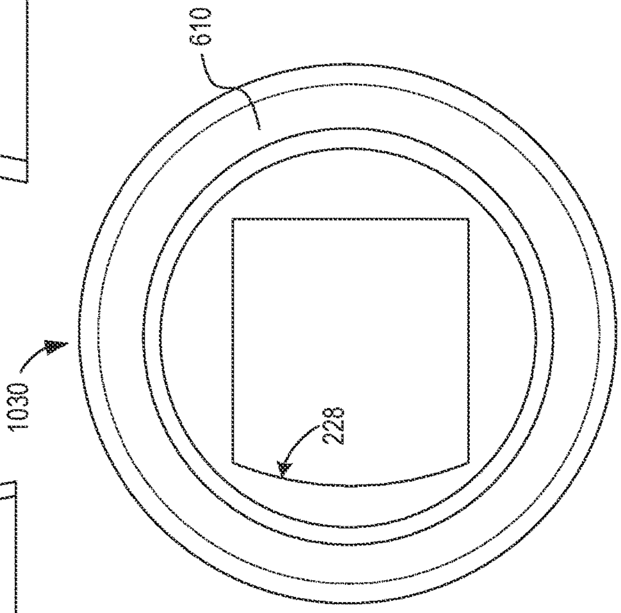
Figure 10A:
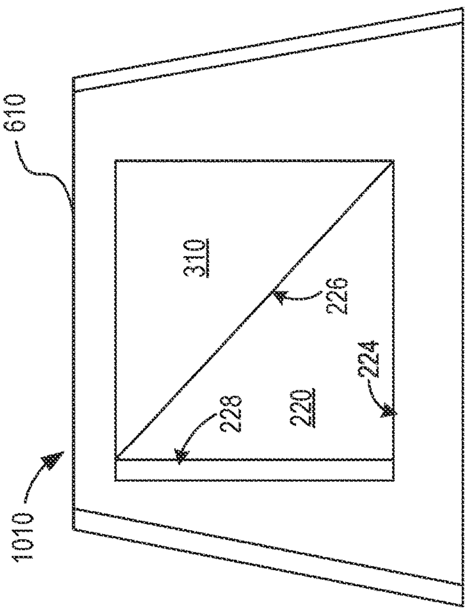

FIGS. 10A-10C show schematic diagrams of housing 610 containing second optical element 220 attached to balancing element 310 from a front view 1010 (FIG. 10A), a right side view 1020 (FIG. 10B), and a top view 1030 (FIG. 10C), in accordance with embodiments of the present disclosure. In some embodiments, second surface 228 of second optical element 220, which refracts light beam 223 (FIG. 2) exiting second optical element 220, and receives return light beam 142 (FIG. 2) entering second optical element 220, may be made to be a curved surface. For example, as shown in FIG. 10C, second surface 228 may be curved outward toward the exiting direction of light beam 223 (FIG. 2) exiting second optical element 220. The curvature of curved second surface 228 may be optimized to compensate for aberrations caused by housing 610.

Figure 11A:
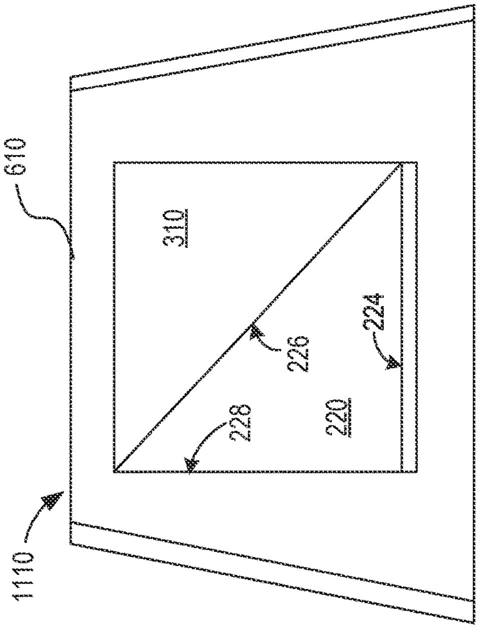
FIGS. 11A-11C show schematic diagrams of a housing containing an optical element attached to a balancing element in a front view (FIG. 11A), a right side view (FIG. 11B), and a top view (FIG. 11C), in accordance with embodiments of the present disclosure.
Figure 11B:
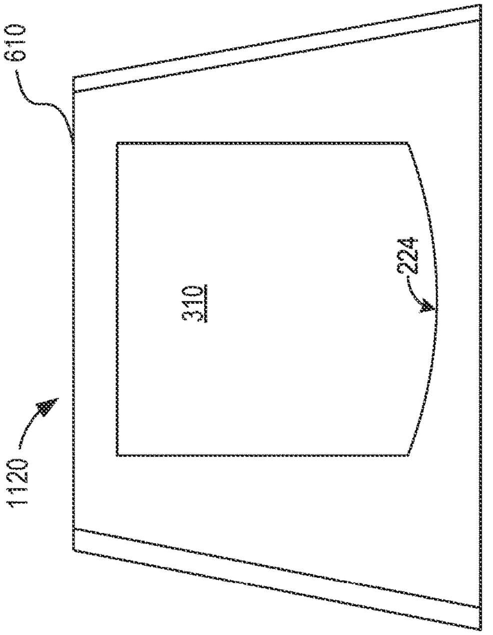
Figure 11C:
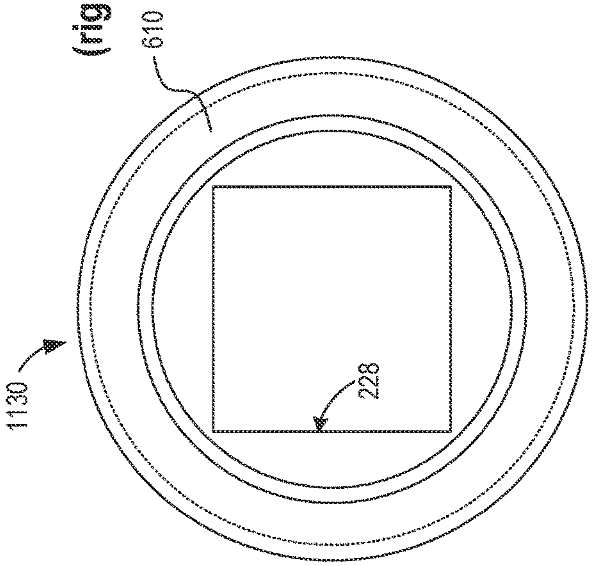

FIGS. 11A-11C show schematic diagrams of housing 610 containing second optical element 220 attached to balancing element 310 from a front view 1110 (FIG. 11A), a right side view 1120 (FIG. 11B), and a top view 1130 (FIG. 11C), in accordance with embodiments of the present disclosure. In some embodiments, surface 224 of second optical element 220, which refracts light beam 140*c* (FIG. 2) received from wedge prism 216 to the central area of reflective surface 226, may be a curved surface. For example, as shown in FIG. 11B, surface 224 may be curved outward opposite the direction of light beam 219 (FIG. 2) entering second optical element 220. The curvature of curved surface 224 may be optimized to compensate for aberrations caused by housing 610.

Figure 12A:
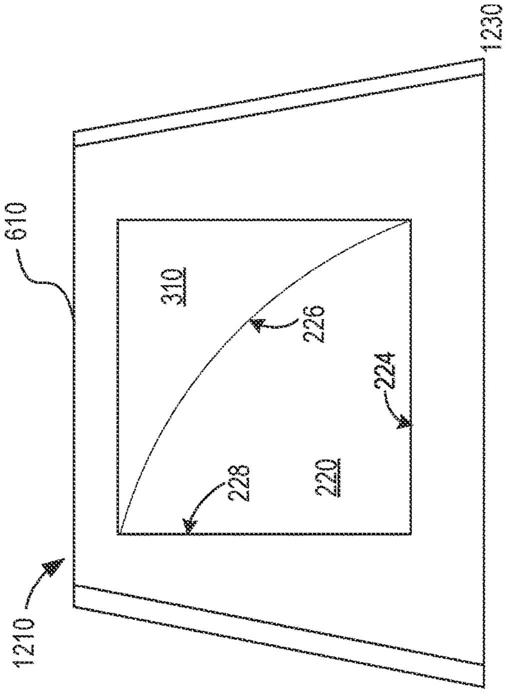
FIGS. 12A-12C show schematic diagrams of a housing containing an optical element attached to a balancing element in a front view (FIG. 12A), a right side view (FIG. 12B), and a top view (FIG. 11C), in accordance with embodiments of the present disclosure.
Figure 12B:
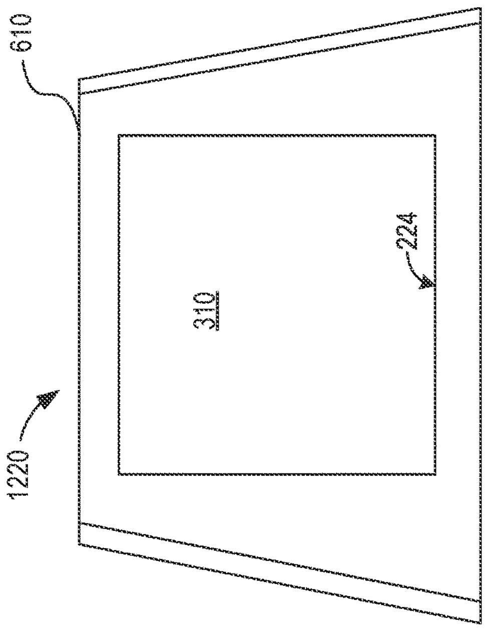
Figure 12C:
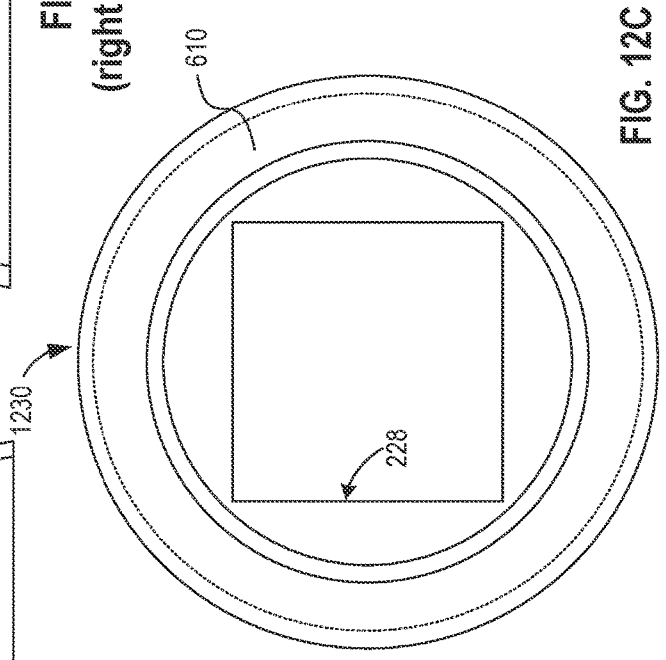

FIGS. 12A-12C show schematic diagrams of housing 610 containing second optical element 220 attached to balancing element 310 from a front view 1210 (FIG. 12A), a right side view 1220 (FIG. 12B), and a top view 1130 (FIG. 11C), in accordance with embodiments of the present disclosure. In some embodiments, reflective surface 226 of second optical element 220, which reflects light beam 221 (FIG. 2) received from first surface 224 to second surface 228, may be a curved surface. For example, as shown in FIG. 12A, reflective surface 226 may be curved outward toward balancing element 310. The curvature of curved reflective surface 226 may be optimized to compensate for aberrations caused by housing 610.

In some embodiments, two or more surfaces of surface 224, 226, and 228 may be optimized in shapes, such as curved surfaces, to compensate for aberrations.

Figure 13A:
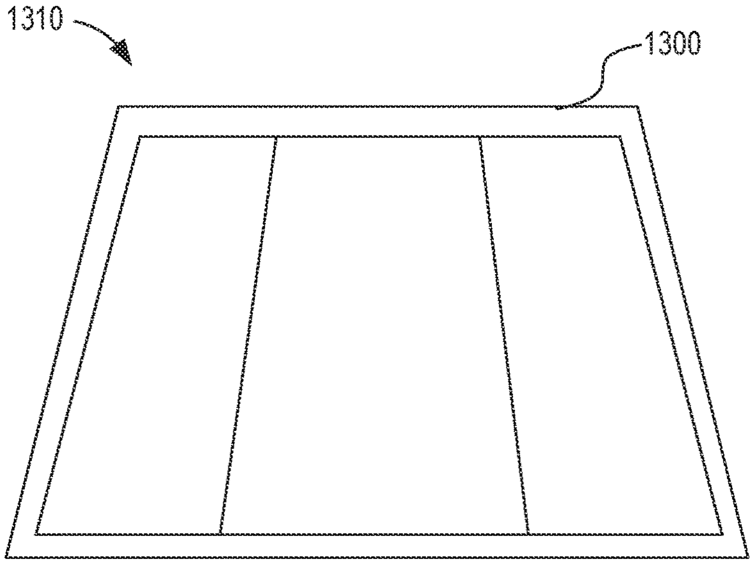
FIGS. 13A and 13B show schematic diagrams of a polyhedral housing in a front view (FIG. 13A) and a top view (FIG. 13B), in accordance with embodiments of the present disclosure.
Figure 13B:
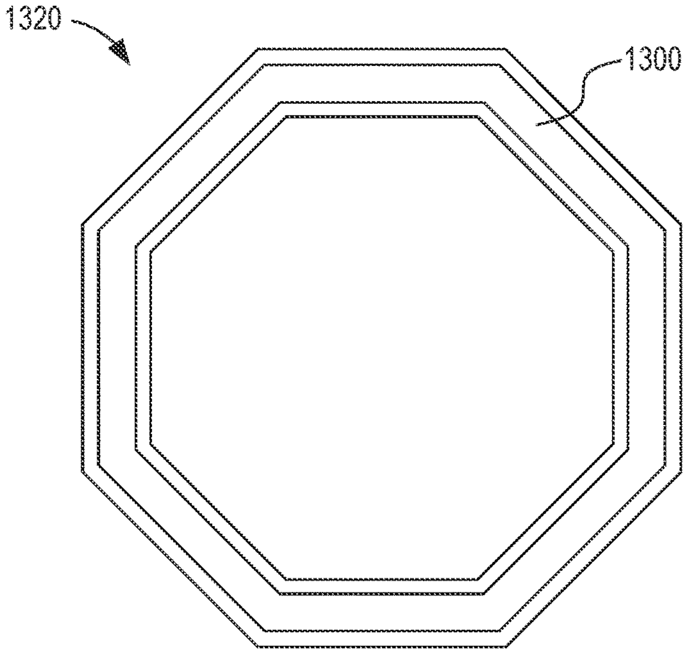

FIGS. 13A and 13B show schematic diagrams of a polyhedral housing 1300 from a front view 1310 (FIG. 13A) and a top view 1320 (FIG. 13B), in accordance with embodiments of the present disclosure. In some embodiments, to reduce or prevent astigmatism introduced by the circular housing, such as housing 610 or 650, housing 1300 may have a polyhedral shape, such as an octahedral shape, as shown in FIGS. 13A and 13B. In some embodiments, housing 1300 may have other types of polyhedral shape, such as a tetrahedron, a hexahedron, or other suitable structures. It is appreciated that the various embodiments described herein can be used individually or in combination for the shapes of the housing and/or optical element 220.

FIGS. 14A, 14B, 15A, 15B, 16A, 16B, 17A, 17B, 18A, 18B, 19A, and 19B show exemplary scanning patterns produced by various LiDAR systems, (e.g., LiDAR system 100, 200, 300, 400, 600, 650, 700, and/or 800), as described in accordance with embodiments of the present disclosure. In some embodiments, the LiDAR systems may include a first rotating optical element, e.g., wedge prism 116, 216, 760, or 860, and a second rotating optical element including a reflective surface, e.g., reflector 120, second optical element 220, or second optical element 720, as described herein when scanning the environment. Although scanning patterns in FIGS. 14A, 14B, 15A, 15B, 16A, 16B, 17A, 17B, 18A, 18B, 19A, and 19B may correspond to fields characterized by an azimuth angle from 0° to 360° and a zenith angle in a range from 60° to 120°, it is appreciated that similar scanning patterns can be obtained from various embodiments of the LiDAR systems described herein, and the scanning patterns can be characterized by other parameters, such as using azimuth angle—pitch angle (e.g., subtset (b) of FIG. 1C), etc., that are suitable for different ranges or scanning fields.

FIGS. 14A, 14B, 15A, 15B, 16A, and 16B are exemplary scanning patterns obtained by LiDAR systems with a single-line laser diode. It is assumed that the rotating speed of a first rotating optical element is v1 and a rotating speed of the second rotating optical element is v2, the number of light source lines is 1, the focal length of a collimating element, e.g., collimating element 114, is 20 mm, and the wedge angle of wedge prism 216, 760, or 860 is 21°.

Figure 14A:
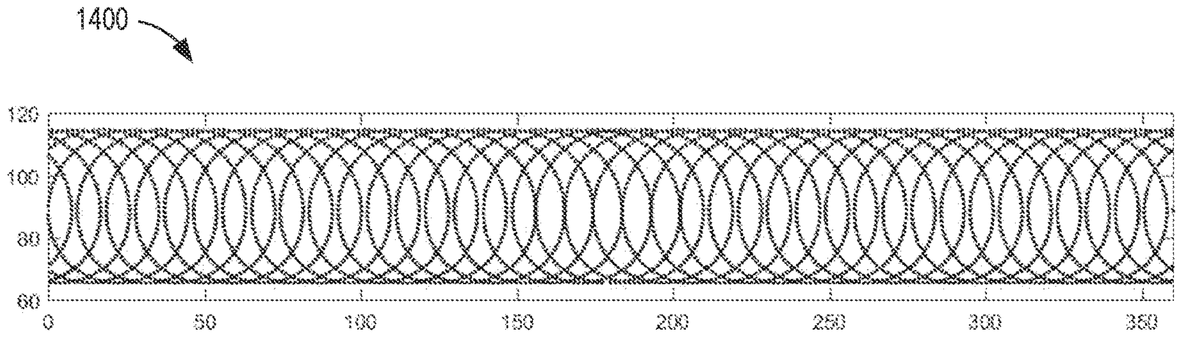
FIGS. 14A, 14B, 15A, 15B, 16A, 16B, 17A, 17B, 18A, 18B, 19A, and 19B show exemplary scanning patterns produced by various LiDAR systems in accordance with embodiments of the present disclosure.
Figure 14B:
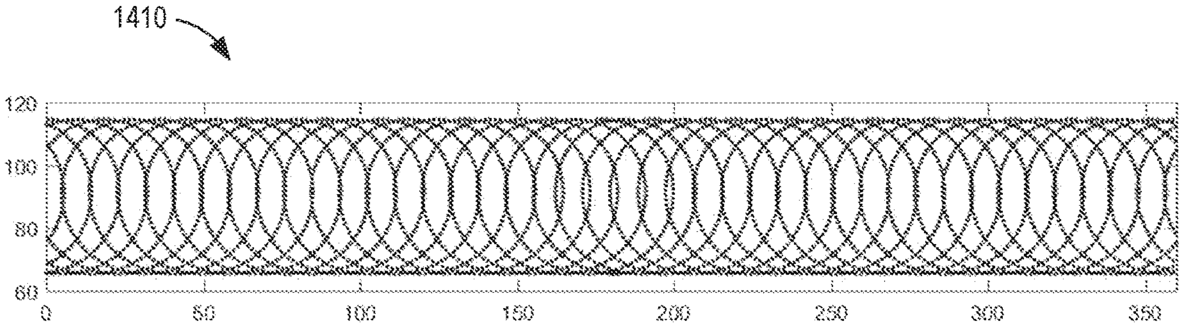

In some embodiments, FIGS. 14A and 14B show exemplary scanning patterns 1400 and 1410, respectively, by LiDAR systems having a single-line laser diode with a light source luminous frequency of 40 kHz, and a ratio of v1/v2 greater than 10 with the first optical element, e.g., wedge prism 216 rotating at a higher speed than second optical element 220, as a reflector or a prism including a reflective surface. For example, the rotating speed v1 of the first rotating optical element is 24000 rpm, and the rotating speed v2 of the second rotating optical element is 603 rpm. An integration time of a point cloud in the scanning patterns is 0.1 s. The first optical element and the second optical element may rotate in the same direction to generate scanning pattern 1400 shown in FIG. 14A. The first optical element and the second optical element may rotate in opposite directions to generate scanning pattern 1410 shown in FIG. 14B.

Figure 15A:
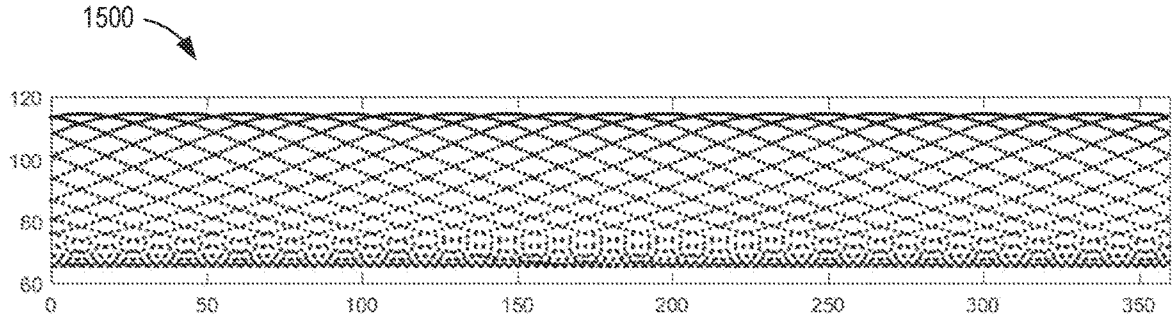
Figure 15B:
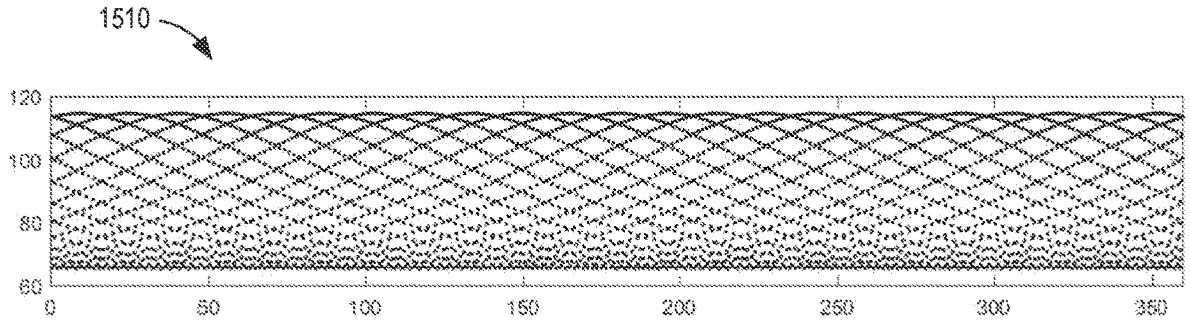

In some embodiments, FIGS. 15A and 15B show exemplary scanning patterns 1500 and 1510, respectively, by LiDAR systems having a single-line laser diode with a light source luminous frequency of 40 kHz, and a ratio of v2/v1 greater than 10 with the first optical element, e.g., wedge prism 216, rotating at a lower speed than second optical element 220, e.g., as a reflector or a prism including a reflective surface. For example, the rotating speed v1 of the first rotating optical element is 600 rpm, and the rotating speed v2 of the second rotating optical element is 13250 rpm. An integration time of the point cloud in the scanning patterns is 0.1 s. The first optical element and the second optical element may rotate in the same direction to generate scanning pattern 1500 shown in FIG. 15A. The first optical element and the second optical element may rotate in opposite directions to generate scanning pattern 1510 shown in FIG. 15B.

Figure 16A:
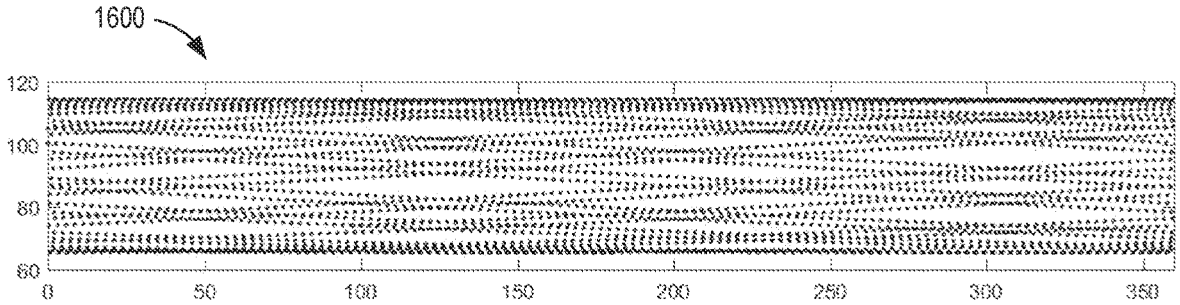
Figure 16B:
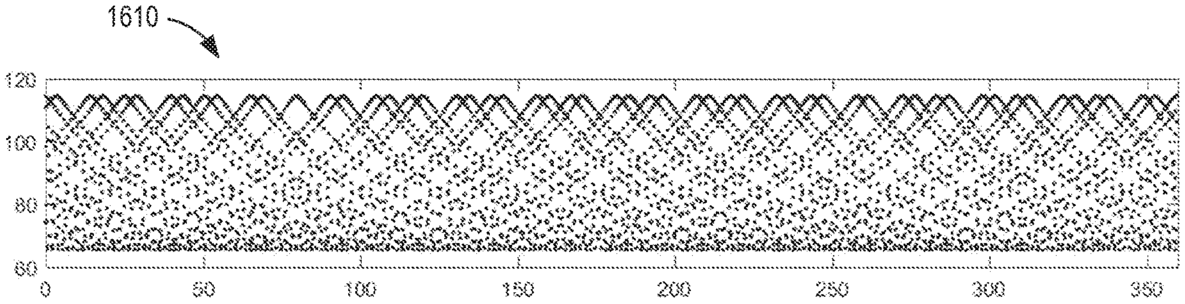

In some embodiments, FIGS. 16A and 16B show exemplary scanning patterns 1600 and 1610, respectively, by LiDAR systems having a single-line laser diode with a light source luminous frequency of 40 kHz, and both the first optical element, e.g., wedge prism 216, and second optical element 220, e.g., as a reflector or a prism including a reflective surface, rotate at high speeds, such as v1>6000 rpm, and v2>6000 rpm. For example, the rotating speed v1 of the first rotating optical element is 15250 rpm, and the rotating speed v2 of the second rotating optical element is 17569 rpm. An integration time of the point cloud in the scanning patterns is 0.1 s. The first optical element and the second optical element may rotate in the same direction to generate scanning pattern 1600 shown in FIG. 16A. The first optical element and the second optical element may rotate in opposite directions to generate scanning pattern 1610 shown in FIG. 16B.

FIGS. 17A, 17B, 18A, 18B, 19A, and 19B are exemplary scanning patterns obtained by LiDAR systems with a multi-line laser diode. In some embodiments, when the emission light source uses a multi-line laser diode, the point cloud density of the scanning patterns can be effectively improved, as shown in FIGS. 17A, 17B, 18A, 18B, 19A, and 19B, compared to the point cloud density of the scanning patterns using a single-line laser diode as shown in FIGS. 14A, 14B, 15A, 15B, 16A, and 16B. In addition, the motor speed for a LiDAR system using a multi-line laser diode may be lower to achieve a similar point cloud effect compared to the motor speed for a LiDAR system using a single-line laser diode. It is assumed that the rotating speed of the first rotating optical element is v1 and the rotating speed of the second rotating optical element is v2, the number of light source lines is 6, the light source spacing is 470 μm, the focal length of a collimating element (e.g., collimating element 114) is 20 mm, and the wedge angle of wedge prism 216, 760, or 860 for the first optical element is 21°.

Figure 17A:
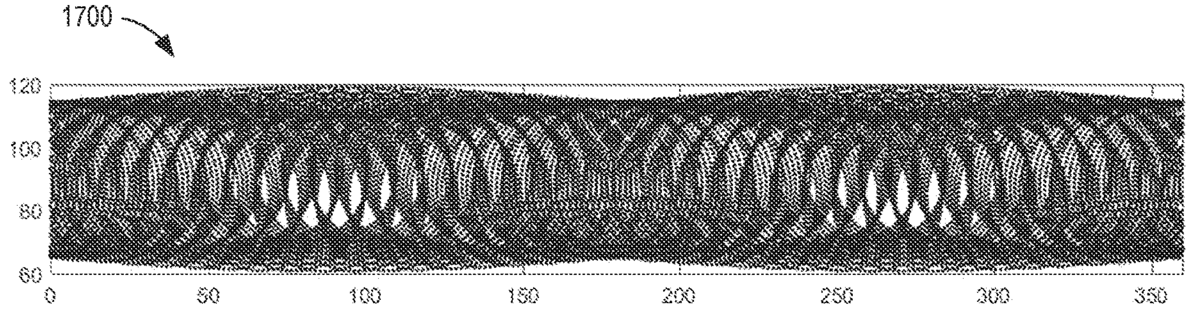
Figure 17B:
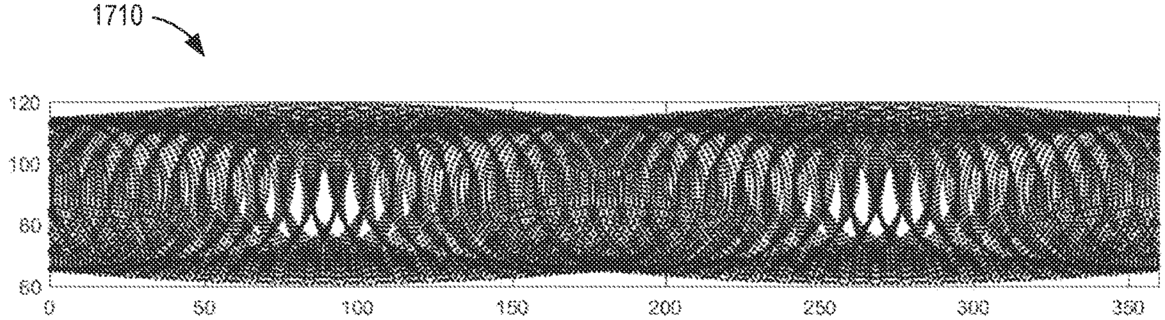

In some embodiments, FIGS. 17A and 17B show exemplary scanning patterns 1700 and 1710, respectively, by LiDAR systems having a multi-line laser diode, e.g., six-line, with a light source luminous frequency of 240 kHz, and an integration time of the point cloud of 0.1 s. The first optical element, e.g., wedge prism 216 rotates at a higher speed than second optical element 220, e.g., as a reflector or a prism including a reflective surface. For example, the rotating speed v1 of the first rotating optical element is 24000 rpm, and the rotating speed v2 of the second rotating optical element is 603 rpm. The first optical element and the second optical element may rotate in the same direction to generate scanning pattern 1700 shown in FIG. 17A. The first optical element and the second optical element may rotate in opposite directions to generate scanning pattern 1710 shown in FIG. 17B.

Figure 18A:
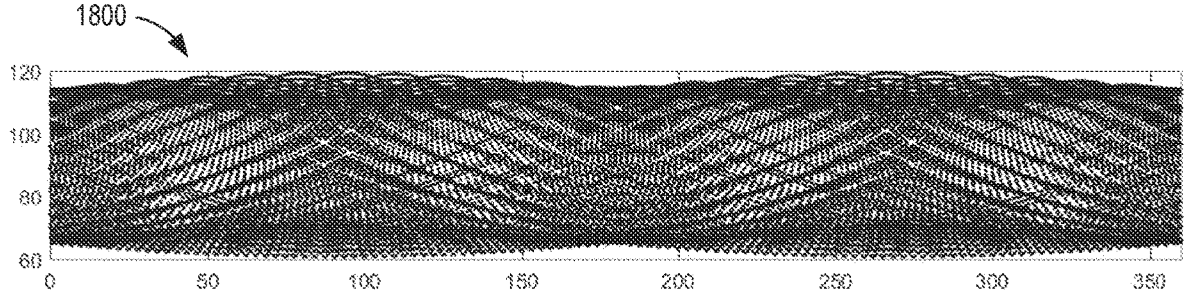
Figure 18B:
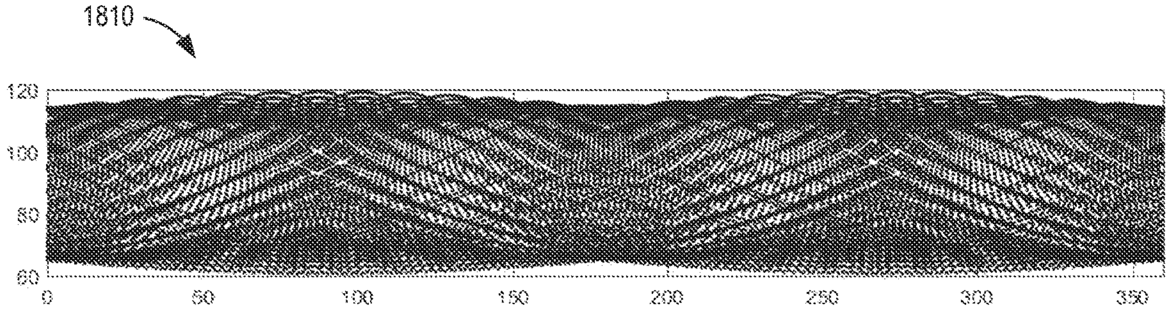

In some embodiments, FIGS. 18A and 18B show exemplary scanning patterns 1800 and 1810, respectively, by LiDAR systems having a multi-line laser diode, e.g., six-line, with a light source luminous frequency of 240 kHz, and an integration time of the point cloud of 0.1 s. The first optical element, e.g., the wedge prism 216, rotates at a lower speed than second optical element 220, e.g., as a reflector or a prism including a reflective surface. For example, the rotating speed v1 of the first rotating optical element is 600 rpm, and the rotating speed v2 of the second rotating optical element is 13250 rpm. The first optical element and the second optical element may rotate in the same direction to generate scanning pattern 1800 shown in FIG. 18A. The first optical element and the second optical element may rotate in opposite directions to generate scanning pattern 1810 shown in FIG. 18B.

Figure 19A:
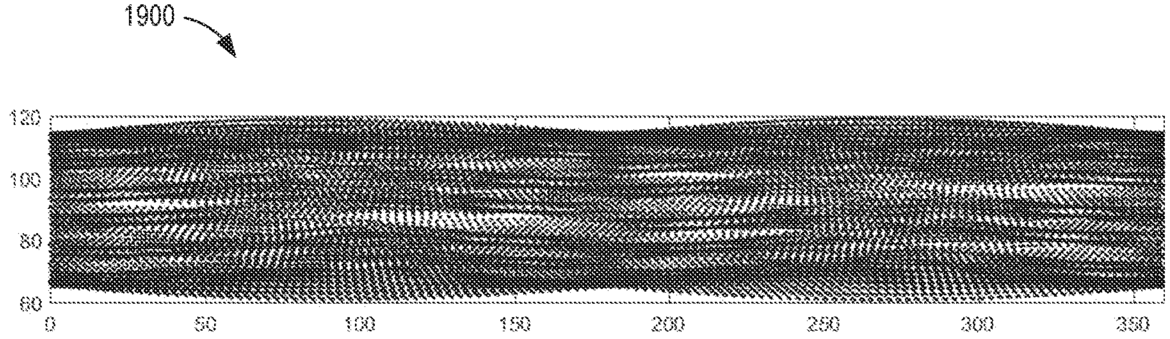
Figure 19B:
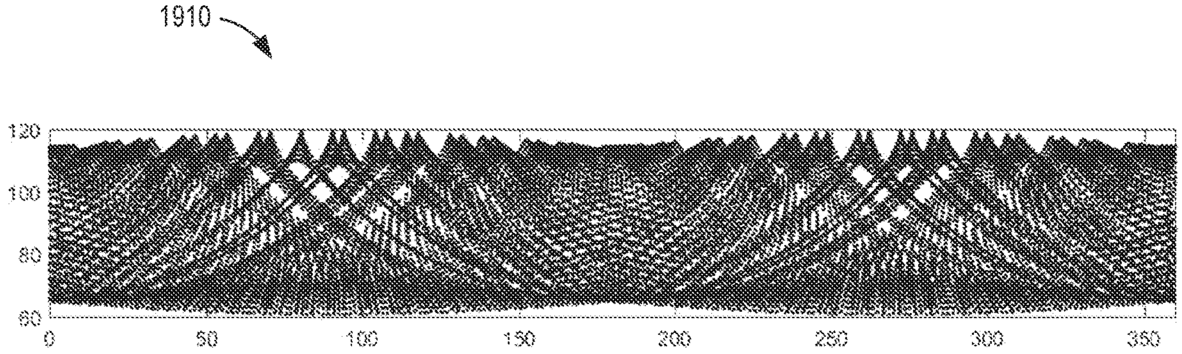

In some embodiments, FIGS. 19A and 19B show exemplary scanning patterns 1900 and 1910, respectively, by LiDAR systems having a multi-line laser diode, e.g., six-line, with a light source luminous frequency of 240 kHz, and an integration time of the point cloud of 0.1 s. The first optical element, e.g., wedge prism 216, and second optical element 220, e.g., as a reflector or a prism including a reflective surface, may both rotate at high speeds. For example, the rotating speed v1 of the first rotating optical element is 15250 rpm, and the rotating speed v2 of the second rotating optical element is 17569 rpm. The first optical element and the second optical element may rotate in the same direction to generate scanning pattern 1900 shown in FIG. 19A. The first optical element and the second optical element may rotate in opposite directions to generate scanning pattern 1910 shown in FIG. 19B.

In some embodiments, the rotation speed and/or direction of the first optical element, e.g., wedge prism 216 and second optical element 220, e.g., as a reflector or a prism including a reflective surface, may be determined according to the different system structures and/or the actual application scenarios.

In some embodiments, the LiDAR system as discussed herein can be used in various application scenarios. In some embodiments, if the LiDAR system is used for obstacle avoidance and a more compact size and low cost are preferred, a LiDAR system using a single-line light source and parameters described with reference to FIGS. 15A, 15B, and 16A may be applied to obtain the point cloud patterns as shown in FIGS. 15A, 15B, and 16A.

In some embodiments, if the LiDAR system is used for identifying objects or obstacles in the environment, and is used in low-speed application scenarios, a LiDAR system using a single-line light source and parameters described with reference to FIGS. 15A, 15B, and 16A may be used to obtain the point cloud patterns shown in FIGS. 15A, 15B, and 16A. The integration time may be increased to increase a density of the point cloud to have better coverage of the scanned environment.

In some embodiments, if the LiDAR system requires high resolution and accuracy in identifying obstacles, and is used in medium and high-speed application scenarios, a LiDAR system using a multi-line light source and parameters described with reference to FIGS. 18A-18B and FIG. 19A may be used to obtain the point cloud patterns as shown in FIGS. 18A and 18B and FIG. 19A. In some embodiments, the LiDAR system may change one or more operation parameters as described herein or switch between different operation modes, either automatically or manually, for various application scenarios within one trip or for multiple trips. It is appreciated that the LiDAR system can also be configured to change one or more parameters, e.g., rotation speed, rotation direction, and/or using single-line or multi-line laser diode, to switch between multiple application scenarios.

FIGS. 20-23 show schematic diagrams of various embodiments of a scanning module 2000 including an optical element, e.g., second optical element 220 described herein, and a balancing element, e.g., balancing element 310 described herein, in accordance with embodiments of the present disclosure. In some embodiments, scanning module 2000 as described in FIGS. 20-23 may be used in a LiDAR system, such as LiDAR system 100, 200, 300, 400, 600, 650, 700, 800, and/or any other suitable LiDAR system. It is appreciated that the optical element discussed in FIGS. 20-23 may use second optical element 220, described in various embodiments in the present disclosure, as examples for illustrative purpose and is not intended to be limiting. Any suitable optical element, such as optical element 720 of FIG. 7A, or other optical elements may also be used in the scanning module as described herein.

In some embodiments, as one of the functional modules of the LiDAR system, the scanning module may include a driver, such as a motor, to drive the optical element, such as second optical element 220 or another optical element including a reflective surface, to rotate about an axis (e.g., axis 222). During rotation, the optical element may reflect and/or refract the laser beam into space for scanning the environment to identify one or more objects, and ranging (e.g., measuring distance, mapping, etc.) of the one or more objects in the space to form a 2D or 3D point cloud image, e.g., such as the point cloud in the scanning patterns in FIGS. 14A, 14B, 15A, 15B, 16A, 16B, 17A, 17B, 18A, 18B, 19A, or 19B. In some embodiments, depending on the optical design, the rotation speed of the motor in the scanning module may range from a few hundred RPM (revolutions per minute) to tens of thousands of RPM.

In some embodiments, for a high-speed rotating motor, if the rotor and/or the object(s) driven by the motor for rotation have unbalanced mass, such as the distribution of mass is unbalanced, or are unbalanced as mounted, such as if the center of the mass deviates from the rotational center, the rotor of the motor may vibrate, deform, and/or generate internal stress. Such impact on the rotor may further cause the motor to vibrate and generate noise, thus reducing the working efficiency and operating life of the motor. Accordingly, it is desirable to improve the mass distribution and the balance of the rotor during the manufacturing and assembly process to improve the dynamic balance of the motor during rotation.

In some embodiments, the balanced mass distribution and dynamic balance can be improved by adding weight or reducing weight for balancing. For example, adding weight for balancing is obtained by adding weight, such as attaching adhesives, like glue, to an area of the rotor that is lighter than other areas. While reducing weight for balancing is achieved by removing materials, e.g., via machining, from an area of the rotor that is heavier than other areas.

In some embodiments, the rotor of a scanning module of a LiDAR system may include both the optical element(s) and the rotor of the motor. Accordingly, the mass of the optical element(s) may be balanced in order to improve the dynamic balance of the rotor of the scanning module. In some embodiments, the balance of the mass of the optical element(s) of the scanning module may be improved by adding weight to the optical element(s). For example, one or more pieces of balancing adhesive materials may be added to one or more areas, such as surfaces, of the optical element(s) to compensate areas of the optical element(s) that are lighter than other areas. In some embodiments, balancing adhesive materials may have darker color or may not transmit light. As such, the balancing adhesive materials may block the light path, reduce the light transmission, thus negatively impact the performance of the LiDAR system. Further, from the perspectives of manufacturing and assembling the LiDAR system, it is desired to have predictable location(s) for adding the balancing adhesive materials to the optical element(s) without blocking the light path or affecting the system efficiency.

In some embodiments, the weight balancing structures and methods described below with reference to FIGS. 20-23 for the optical element(s) of the scanning module of the LiDAR system may reduce or prevent the adhesive materials from blocking the light path of the optical element(s), thus avoiding reduction or loss of the light transmission area for the scanning module, and maintaining high performance of the LiDAR system. In some embodiments, the position(s) for adding the adhesive material(s) to the rotor may be more predictable, thus ensuring a consistent light path and sufficient transmission area for the optical element(s) to provide consistent performance for the LiDAR system. The predicable position(s) for adding the adhesive material(s) may also be beneficial for a streamlined manufacturing and assembly process.

Figure 20:
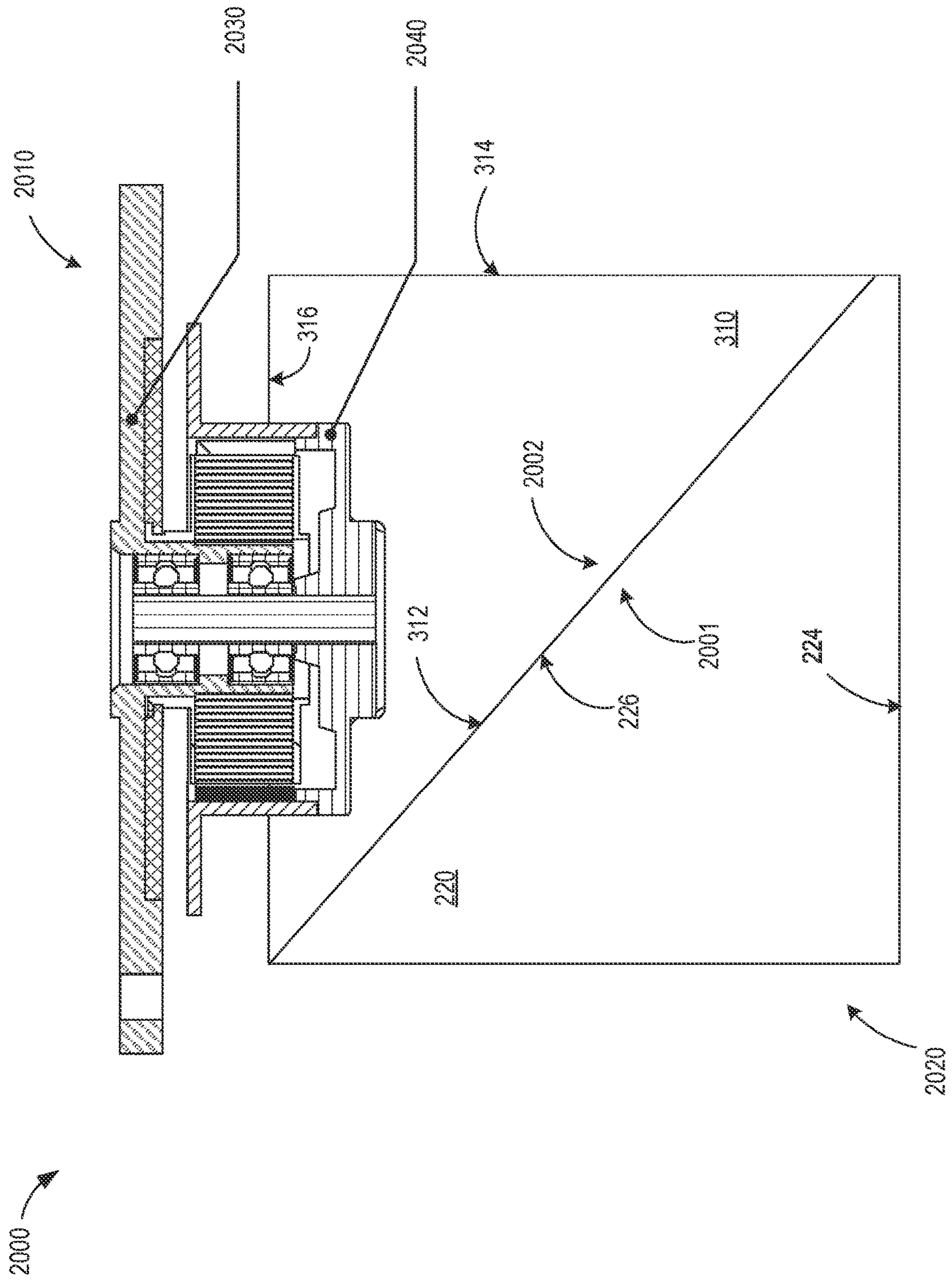
FIGS. 20, 21, 22, and 23 show schematic diagrams of various embodiments of a scanning module including an optical element and a balancing element, in accordance with embodiments of the present disclosure.
Figure 21:
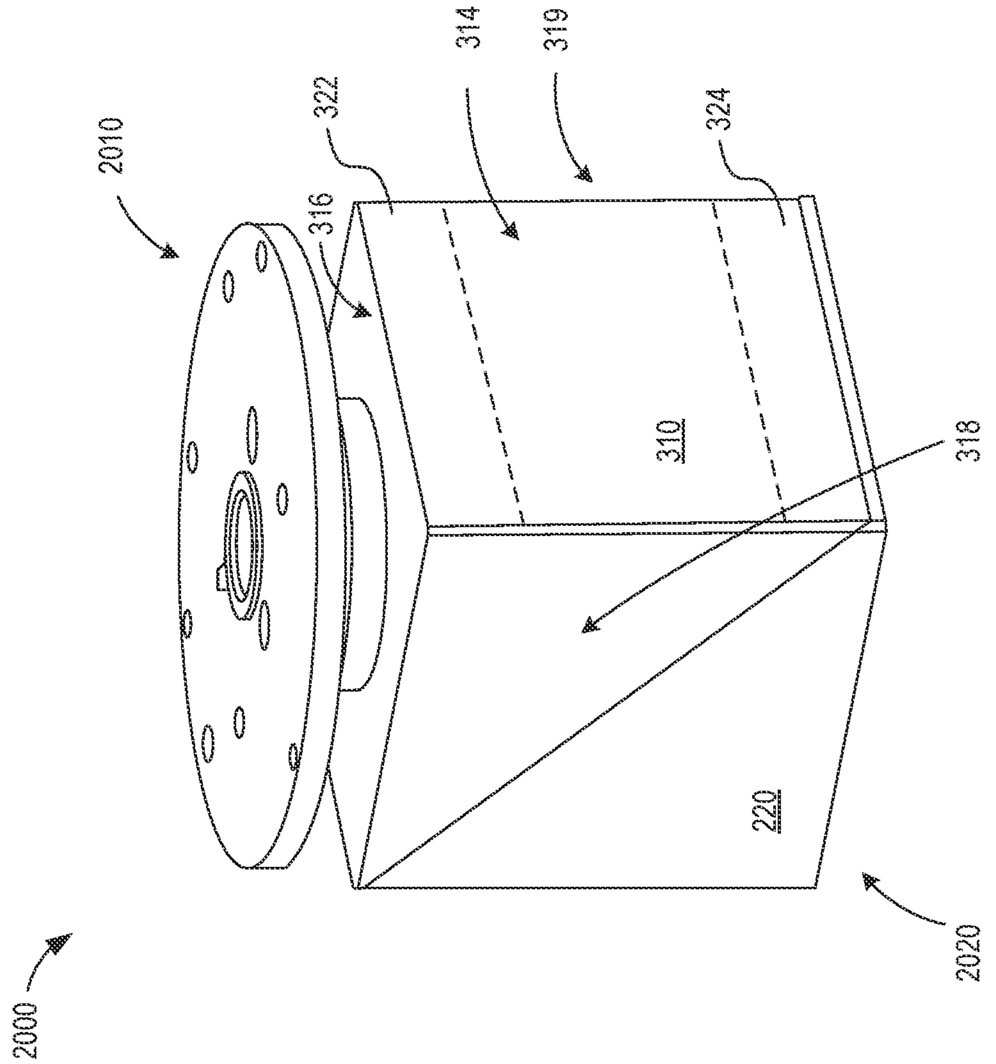

FIG. 20 shows a schematic diagram of a scanning module 2000 for a LiDAR system from a front view, in accordance with embodiments of the present disclosure. FIG. 21 shows a schematic diagram of scanning module 2000 from a perspective view, in accordance with embodiments of the present disclosure. In some embodiments, scanning module 2000 comprises a motor module 2010 and an optical module 2020 (or optical assembly 2020) as shown in FIGS. 20 and 21. In some embodiments, motor module 2010 is configured to drive optical module 2020 to rotate about an axis for scanning the environment by the LiDAR system.

In some embodiments as shown in FIGS. 20 and 21, motor module 2010 comprises a stator 2030 of the motor fixedly connected to the LiDAR system structure. Motor module 2010 also comprises a rotor 2040 configured to rotate about the axis. In some embodiments, rotor 2040 is coupled to and rotates together with optical module 2020 when driven by the motor.

In some embodiments, optical module 2020 comprises an optical element including a refractive surface and/or a reflective surface for refracting and/or reflecting light beams during rotation of optical module 2020 to scan the environment. The optical element of optical module 2020 may include optical element 220, optical element 720, or another suitable optical element. For example, optical element 220 may be a wedge prism, a triangular prism, a right-angle prism, or other optical element including a reflective surface as described herein.

In some embodiments, optical module 2020 may further comprise a balancing element 310 coupled to optical element 220. In some embodiments, balancing element 310 may have a weight that is less than a weight of optical element 220. Optical element 220 may refract a light beam by surface 224, and reflect the light beam by a first side 2001 of reflective surface 226 as described in the present disclosure.

In some embodiments, balancing element 310 comprises a surface 312 to attach to a surface, e.g., reflective surface 226, of optical element 220 from a second side 2002 of reflective surface 226. For example, balancing element 310 may be attached, e.g., glued, to reflective surface 226 of optical element 220 using adhesive glue.

In some embodiments, one or more objects (e.g., balancing glue) for adjusting the weight of balancing element 310 may be attached to balancing element 310 for balancing the weight between optical element 220 and balancing element 310, and for balancing optical module 2020 during rotation about the axis. In some embodiments, weight adjusting objects, such as balancing glue, may be attached to one or more surfaces, such as a surface 314, a surface 318, and/or a surface 319 (on the back of balancing element 310 and parallel to surface 318), of balancing element 310. In some embodiments, the balancing glue may include epoxy resin ab glue. The balancing glue may have high density, and have a black or red color. The balancing glue may be attached to the one or more surfaces of balancing element 310 by a heat curing process. In some embodiments, the balancing glue may be adhered to an upper portion 322 (e.g., about top ⅕) and/or a lower portion 324 (about bottom ⅕) of surface 314 as shown in FIG. 21 to improve the dynamic balance during rotation of scanning module 2000. The balancing glue may be applied in stripes or in spots.

In some embodiments, balancing element 310 further comprises a surface 316 connectable to motor module 2010 and configured to rotate optical module 2020 about the axis. For example, rotor 2040 of motor module 2010 may be coupled to surface 316 of balancing element 310, e.g., by gluing or other types of physical connection or insertion, as shown in FIG. 20. In some embodiments, surface 316 of balancing element 310 connectable to motor module 2010 may be different from surface 312 for attaching to optical element 220 or surfaces 318, 314, or 319 to be coupled to the balancing glue.

In some embodiments, as shown in FIG. 20, balancing element 310 may include a wedge prism, a triangular prism, or a right-angle prism. For example, wedge prism 310 may be glued to wedge prism 220 from second side 2002 of reflective surface 226 of wedge prism 220. In some embodiments, optical module 2020 maybe formed in a cube, a rectangular cuboid, a truncated pyramid, a cylinder, a cone, a truncated cone, or any other suitable shape. In some embodiments, optical element 220 of optical module 2020 may refract or reflect a laser beam on its surfaces as described herein, and balancing element 310 may balance the weight of optical component 2020. In some embodiments, balancing element 310 may be made of materials such as glass, metal, plastic, and/or polymers, etc. Optical element 220 may be made of materials such as transparent glass, polymer materials, and/or resin, etc. In some embodiments as shown in FIG. 21, surfaces 318, 314, and/or 319 may be curved surface(s), to improve the precision of the connection between balance element 310 (e.g., via surface 316) and the motor bearing, and to reduce the rotation noise. In an example embodiment, optical element 220 may have a different size than balance element 310. In some cases, optical element 220 may be formed from a different material than balance element 310. For example, the index of refraction for optical element 220 may be different than the index of refraction of balance element 310. In some cases, transparency characteristics of optical element 220 may be different from the transparency characteristics of balance element 310. Also, surface properties (e.g., the roughness of the surfaces) of optical element 220 may be different from surface properties of balance element 310. In some cases, a shape of optical element 220 may be different than a shape of balance element 310 (e.g., optical element 220 may be a triangular prism with all angles being acute, while balance element 310 may have at least one angle that is either a right angle or an obtuse angle). In some cases, balance elements 310 and optical 220 may have any suitable size and shape and be made from any suitable material.

Figure 22:
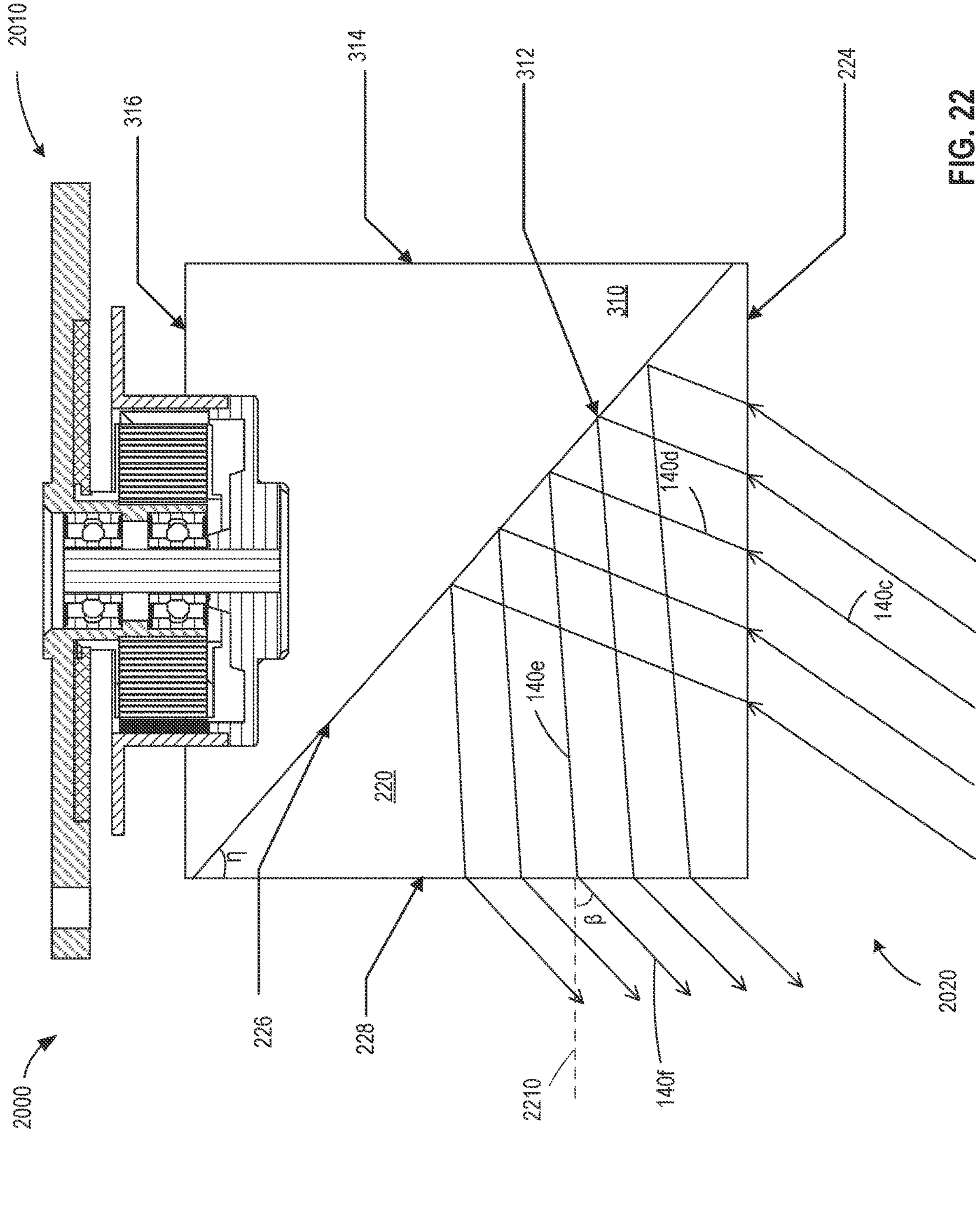

FIG. 22 shows a schematic diagram of using balancing element 310 for balancing scanning module 2000 of a LiDAR system, in accordance with embodiments of the present disclosure. In some embodiments, as shown in FIG. 22, optical module 2020 may comprise optical element 220 attached, e.g., glued, to balancing element 310. In some embodiments, optical element 220 and balancing element 310 may each comprise a prism. Light beam 140*c* (e.g., such as light beam 140*c* received from optical element 216 previously described) may enter via and be refracted by surface 224 toward reflective surface 226. Light beam 140*d* may be reflected by reflective surface 226 toward second surface 228. Light beam 140*e* may be refracted by second surface 228 to exit optical element 220, and light beam 140*f* may scan the environment while optical element 220 is driven by motor module 2010 to rotate about the axis.

In some embodiments, an inclination angle $\eta$ of reflective surface 226 (e.g., relative to a vertical direction, such as an angle between reflective surface 226 and second surface 228 when optical element 220 is a right angle prism) can be adjusted according to different fields of view scannable by the LiDAR system. When inclination angle $\eta$ is larger, the more light beam 140*d* can be bent downward, with the value of angle $\beta$ of the outgoing light beam 140*d* as shown in FIG. 22 becoming larger, and the field of view scannable by the LiDAR system is bent downward to focus on a lower region of the environment. On the other hand, when inclination angle η is smaller, the value of angle β of the outgoing light beam 140*d* is smaller (herein, angle β is positive when measured downwards from line 2210 and negative when measured upwards form line 2210) and the field of view scannable by the LiDAR system is focused on a higher region. In some cases, angle β may be negative (i.e., the outgoing light beam 140*f* may point upward as measured from line 2210 drawn normal to surface 228). For example, when inclination angle η is 45°, angle β may be zero, outgoing light beam 140*d* may point to a horizontal direction. In an example embodiment, a field of view scannable by the optical assembly may be lowered when an inclination angle of the reflective surface of the second optical element is larger, and the field of view may be higher when the inclination angle is smaller. The angle β may be a middle angle of the pitch angle. In an example embodiment, for inclination angle η being 45°, angle β may be zero; for inclination angle η being 50°, angle β may be 10°; and for inclination angle η is 40°, angle β may be −10°. In an example embodiment, inclination angle η may determine an angle range for the pitch angle and the middle angle of the pitch angle.

In some embodiments, balancing element 310 may be made of a material having a different density from a material for optical element 220. For example, the material for balancing element 310 may have a smaller density than the material of optical element 220. In one example, balancing element 310 may be made of a material having a density of about 3.4-3.5 g/cm$^3$, and optical element 220 may be made of a material having a density of about 3.6-3.7 g/cm$^3$. In some embodiments, without adjusting the weight of balancing element 310, optical module 2020 may be unbalanced due to the difference in densities. For example, optical element 220 may be heavier than balancing element 310. As such, during rotation of scanning module 2000, the unbalanced optical module 2020 may cause vibration of rotor 2040, negatively affecting performance of the LiDAR system. Accordingly, to balance optical module 2020, one or more weight adjustment objects, such as balancing glue, may be attached to one or more surfaces of balancing element 310 for adjusting the weight of balancing element 310 to balance optical module 2020 during rotation about the axis. In some embodiments, the one or more surfaces for attaching the one or more weight adjustment objects may include surface 314, 318, and/or 319 as shown in FIGS. 20 and 22. Balancing glue or other weight adjustment objects may be added to these surfaces for balancing the weight and maintaining dynamic balance during rotation of optical module 2020.

Figure 23:
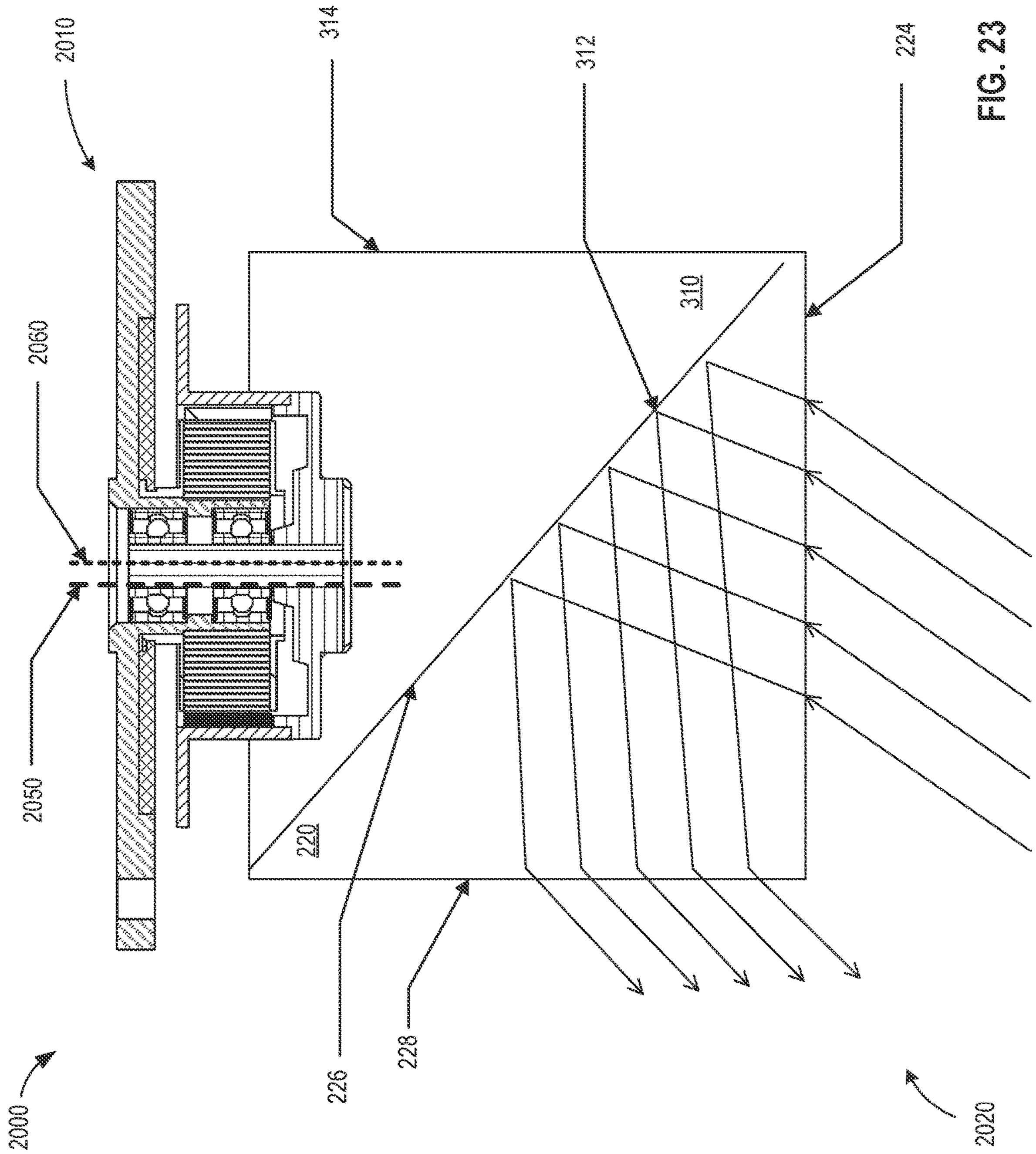

FIG. 23 shows a schematic diagram of using balancing element 310 for balancing scanning module 2000 of a LiDAR system, in accordance with embodiments of the present disclosure. Optical module 2020 may comprise optical element 220 attached, e.g., glued, to balancing element 310. In some embodiments, optical element 220 and balancing element 310 may each include a prism. The light beams may travel in the same light path in second optical element 220 as described with reference FIG. 22.

In some embodiments as shown in FIG. 23, optical module 2020 and motor module 2010 may be mounted non-coaxially. For example, optical module 2020 may be mounted to motor module 2010 such that a central axis 2050 (e.g., a geometric central axis, or a gravitational center) of optical module 2020 does not coincide with a rotation axis 2060 of motor module 2010. For example, optical module 2020 may be shifted to the left or right from the central axis when being mounted to motor module 2010. In some embodiments, respective materials of optical element 220 and balancing element 310 may have identical densities. As such, the geometric central axis may overlap with the gravitational center. In some embodiments, respective materials of optical element 220 and balancing element 310 may have different densities. As such, the geometric central axis may not overlap with the gravitational center.

The non-coaxial mounting scheme may result in scanning module 2000 being unbalanced. For example, as shown in FIG. 23, the portion of optical module 2020 on the left side of rotation axis 2060 may be heavier than the portion of optical module 2020 on the right side of rotation axis 2060. During rotation of scanning module 2000 about axis 2060, the unbalanced optical module 2020 may cause vibration of rotor 2040, thus negatively affecting performance of the LiDAR system. Accordingly, it is desirable to adjust and balance the weight of optical module 2020 to provide balanced rotation. In some embodiments, weight adjustment objects, such as balancing glue, as described above, may be added to balancing element 310. For example, the one or more surfaces for attaching the one or more weight adjustment objects may include surface 314, 318, and/or 319 as shown in FIGS. 21 and 23. Balancing glue or other weight adjustment objects may be added to these surfaces for balancing the weight and maintaining dynamic balance during rotation of optical module 2020.

In some embodiments as described with reference to FIGS. 20-23, the balancing glue or other weight adjustment objects for balancing the weight of scanning module 2020 may be added to one or more surfaces of balancing element 310 that are different from surface 312, e.g., on the opposite side of reflective surface 226 of optical element 220 for reflecting light beams, so as to avoid blocking the light path, wasting light transmission area in optical element 220, and reducing performance of the LiDAR system.

Further, the locations on balancing element 310 for adding the balancing glue or other objects for balancing the weight of scanning module 2020 may be predictable, such as on one or more surfaces of surfaces 314, 318, or 319 of balancing element 310. Accordingly, the light transmission area in optical element 220 affects the performance of the LiDAR system. The predictable locations on balancing element 310 for adding the adjustable weights may optimize the process for manufacturing and assembling balanced scanning module 2020, and improve the operating efficiency for balancing scanning module 2020 in the LiDAR system. It is appreciated that balancing glue is provided as an example of balancing element 310 and not intended to be limiting. Balancing element 310 can include any other suitable weight balancing object that can be coupled to one or more surfaces of balancing element 310 as described herein, including but not limited to being attached to, hooked-up with, snapped-in, hung on, connected to, or attached by magnetic attraction, etc.

Figure 24:
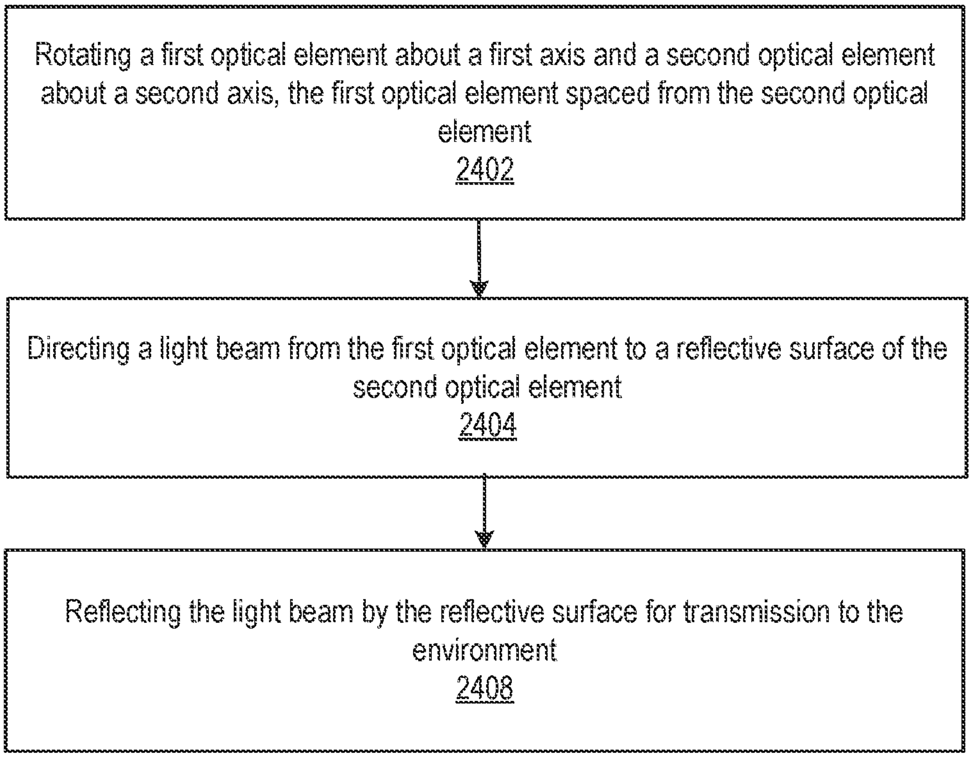
FIG. 24 shows a flow diagram of an exemplary method for directing light beams to scan an environment to detect one or more objects in the environment, in accordance with embodiments of the present disclosure.

FIG. 24 shows a flow diagram of an example method 2400 for directing light beams to scan an environment to detect one or more objects in the environment, in accordance with embodiments of the present disclosure. In some embodiments, method 2400 may be performed by various LiDAR systems, such as LiDAR system 100, 200, 300, 400, 600, 650, 700, and/or 800, or various embodiments of optical assemblies included thereof.

In step 2402, method 2400 includes rotating a first optical element (e.g., optical element 116, 216, a combination of 216 and 410 of FIG. 5B, 550, 560, 760, or 860) about a first axis (e.g., axis 118 or 217) and a second optical element (e.g., optical element 120, 220, or 720) about a second axis (e.g., axis 122, 222, or 2060). In some embodiments, the first optical element is spaced from the second optical element. In some embodiments, the first optical element comprises a wedge prism. In some embodiments, the second optical element comprises a triangular prism. In some embodiments, the first axis may be aligned with the second axis.

In step 2404, method 2400 further includes directing a light beam (e.g., light beam 219) from the first optical element to a reflective surface (e.g., surface 226) of the second optical element.

In step 2408, method 2400 further includes reflecting the light beam (e.g., light beam 140*d* reflected to light beam 140*e*) by the reflective surface (e.g., reflective surface 226) for transmission to the environment.

Figure 25A:
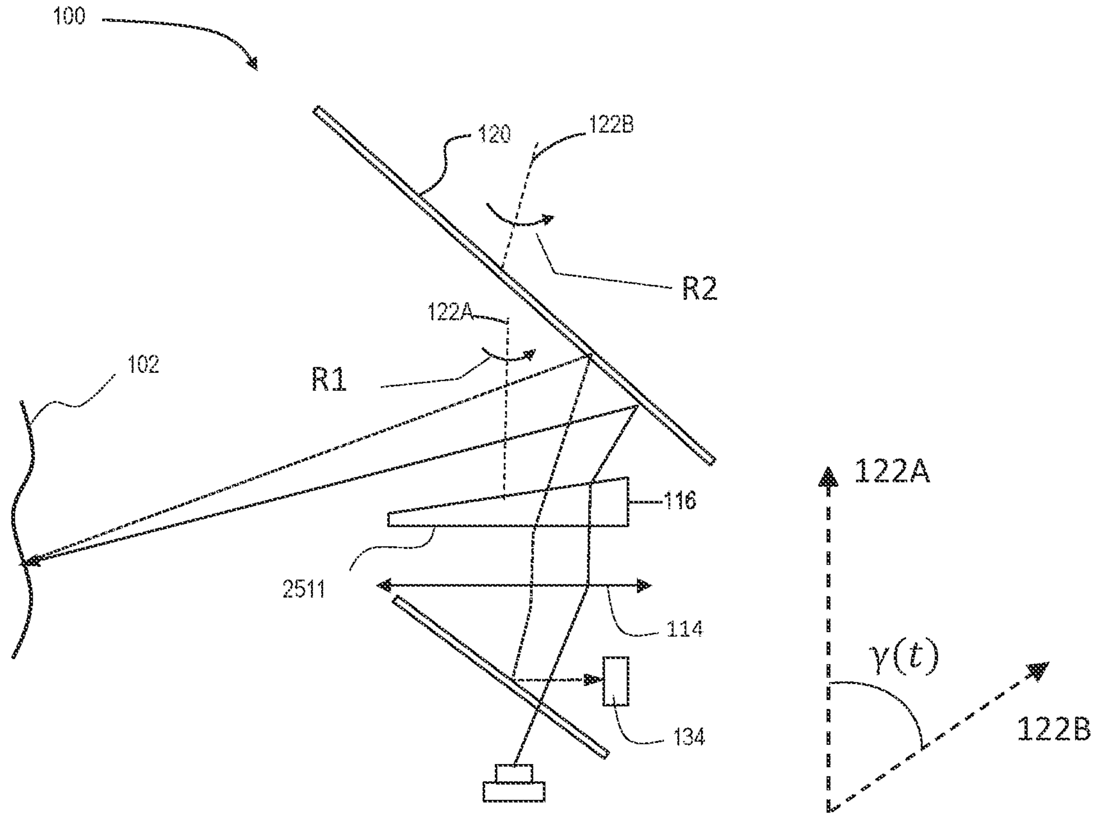
FIG. 25A shows a first and a second optical element having respective rotation axes, in accordance with embodiments of the present disclosure.
Figure 26:
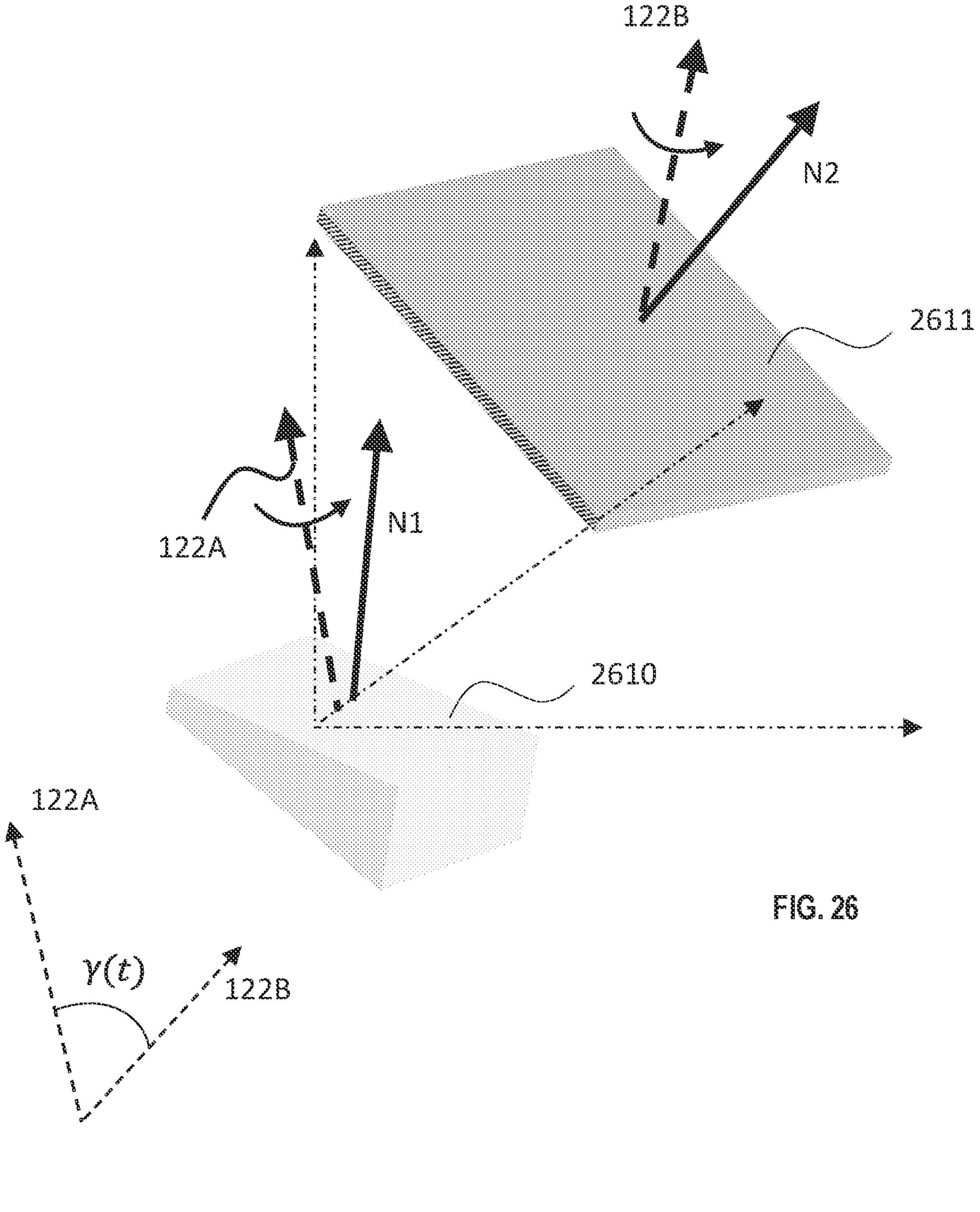
FIG. 26 shows a three-dimensional view of the first and second optical elements having respective rotation axes, in accordance with embodiments of the present disclosure.

FIG. 25A shows a first and a second optical element having respective rotation axes, in accordance with embodiments of the present disclosure. More particularly, FIG. 25A shows system 100 having axis 122A for first optical element 116, and a different axis 122B for second optical element 120. In an example embodiment, axis 122A and axis 122B may not be aligned. For example, axis 122A may be positioned relative to axis 122B at an angle γ, which may be a function of time (i.e., γ=γ(t)) or may be a constant. For example, when angle γ is a function of time, axis 122B moves relative to axis 122A with time. As shown in FIG. 25A, optical element 116 can rotate around axis 122A at a rate of R1, and optical element 120 can rotate around axis 122B at a rate R2. In some cases, R1 and R2 have the same value, and in other cases, R1 is different (e.g., smaller or larger) than R2. In some cases, either one of R1 or R2 (or both) may be time dependent. In some cases, a time rate of change of R1 or/and R2 may be correlated (or inversely correlated) with a time rate of change in γ(t). FIG. 26 shows a three-dimensional view of optical elements 116 and 120. As seen in FIG. 26, elements 116 and 120 may be positioned at any suitable angle γ to each other, and at any suitable position from each other (e.g., the position may be characterized by a displacement vector from a center of element 116 to a center of element 120).

FIG. 26 shows a three-dimensional view of the first and second optical elements having respective rotation axes, in accordance with embodiments of the present disclosure.

As shown in FIG. 26, axis 122A may not be parallel with a normal vector N1 drawn to a corresponding surface 2610 of element 116. Similarly, axis 122B may not be parallel with a normal vector N2 drawn to a corresponding surface 2611 of element 120. In some cases, however, axis 122A or/and axis 122B may be parallel to respective normal vectors N1 and N2. Optionally, axis 122A may be oriented in any suitable direction relative to either normal vector N1 or N2. Similarly, axis 122B may be oriented in any suitable direction relative to either normal vector N1 or N2.

Returning to FIG. 25A, in some cases, axis 122A and axis 122B may be configured to point in the same direction (e.g., γ(t)=0). For example, when optical element 116 is configured to receive a light beam at a first surface (e.g., an interface 2511, as shown in FIG. 25A), if the first axis (e.g., axis 122A) is not inclined relative to the second axis (e.g., axis 122B) and the surface (e.g., an interface 2511, as shown in FIG. 25A) of the first optical element (e.g., optical element 116) is parallel to collimating element 114, the light beam may be reflected and received by receiver 134. In various cases, the magnitude of γ(t) may be selected to ensure that the incident light path deviate from the reflected light path, so that the reflected light beam may be not received by receiver 134.

Figure 25B:
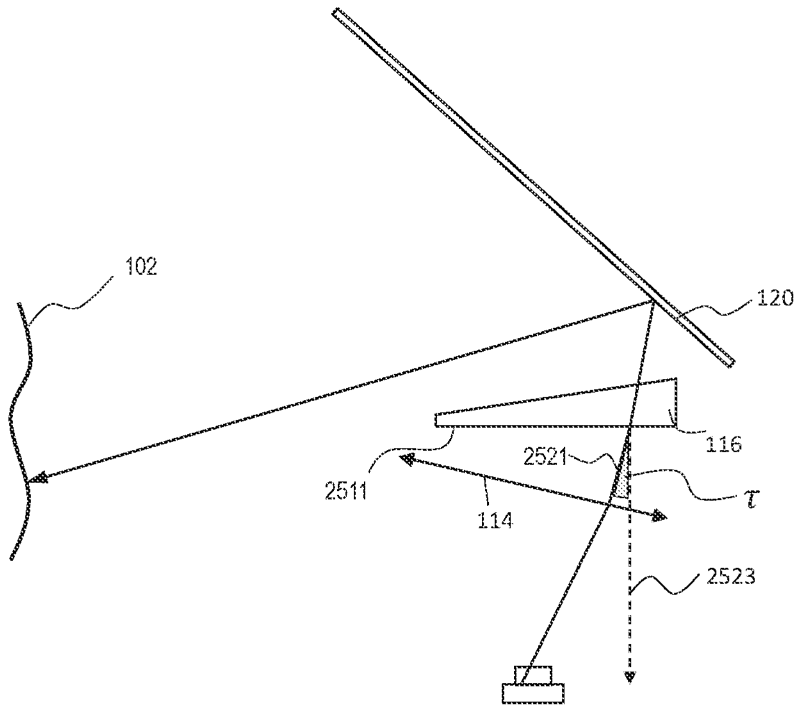
FIG. 25B shows an incident angle between a light beam and a normal to a surface of a first optical element, in accordance with embodiments of the present disclosure.

FIG. 25B shows an incident angle between a light beam and a normal to a surface of a first optical element, in accordance with embodiments of the present disclosure. While FIG. 25B shows collimating element 114 directing an example light beam 2521 towards a surface 2511 of element 116. In some cases, collimating element 114 may be positioned such that there is an incident angle τ greater than zero when measured relative to a normal direction 2523 to surface 2511. Depending on incident angle τ, the position and orientation of optical element 116 and reflective element 120 is selected to allow reflected light from an object (e.g., object 102 in FIG. 25B) to be not received by receiver 134, as further explained below.

Figure 27A:
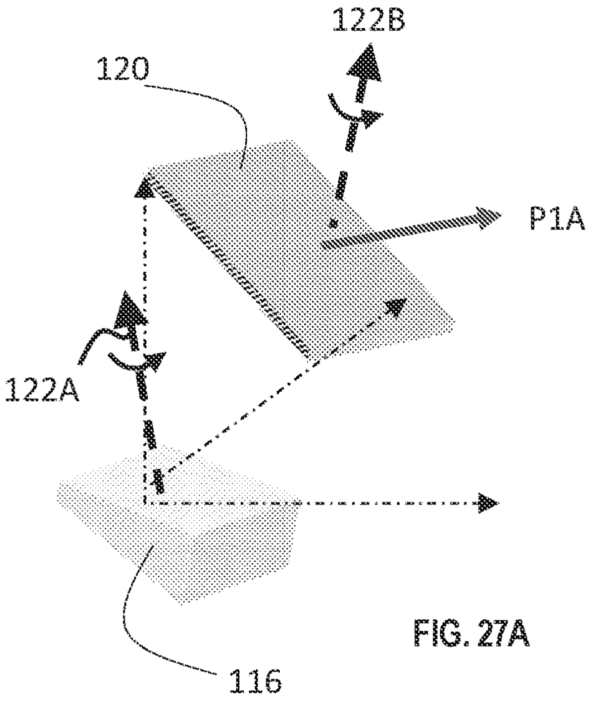
FIGS. 27A-27C show possible orientations of the second optical element, in accordance with embodiments of the present disclosure.
Figure 27B:
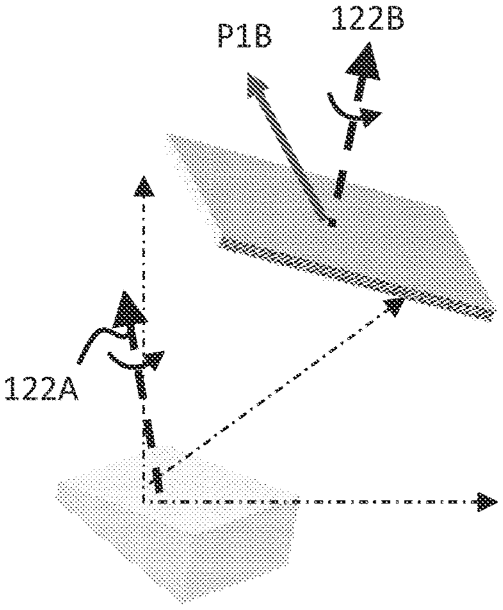
Figure 27C:
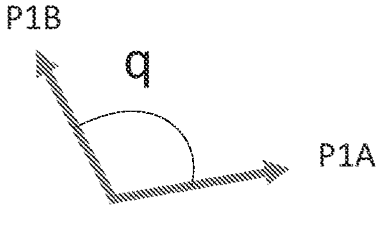

FIGS. 27A-27C illustrate the orientation of second optical element 120 relative to the orientation of first optical element 116. For example, second optical element 120, as shown in FIG. 27B is rotated about axis 122B relative to second optical element 120, as shown in FIG. 27A. For example, a vector P1A drawn in a plane of the surface of optical element 120 is rotated to point in the direction of a vector P1B, when optical element 120 is rotated to be in a position, as shown in FIG. 27B. FIG. 27C shows an example of rotation characterized by angle q measured between vector P1A and rotated counterpart vector P1B. The angle q is referred to herein as a phase angle between the rotation of first optical element 116 and second optical element 120.

In an example embodiment, when optical elements 116 and element 120 rotate in the same direction and when their respective rotation speeds are the same (e.g., when a relative speed of R1 and R2 is not a function of time), a scanning point cloud may be tilted in different directions by controlling angles of axes 122A or 122B, angle γ(t) between axis 122A and axis 122B, as well as phase angle q as described above in relation to FIGS. 27A-27C. In some cases, when optical elements 116 and 120 are rotated in the same direction (e.g., when optical elements 116 and 120 are rotated in the same direction with the same speed or different speed), by controlling the relative phase (e.g., vector q in FIG. 27C), the scanning pattern can be controlled. In some embodiments, the relative phase between optical elements 116 and 120 may be adjusted by controlling, for example, rotation speed R1 or R2. For instance, when rotation speeds R1 and R2 are the same, and after some time duration, one of the rotation speed of R1 (or R2) is increased (or decreased), the scanning pattern is changed. In some cases, rotation speed R1 (or/and R2) may first increase and then decrease (or first decrease and then increase), resulting in changes in the scanning pattern after (and during) the changes in rotation speed R1 (or/and R2).

Figure 28:
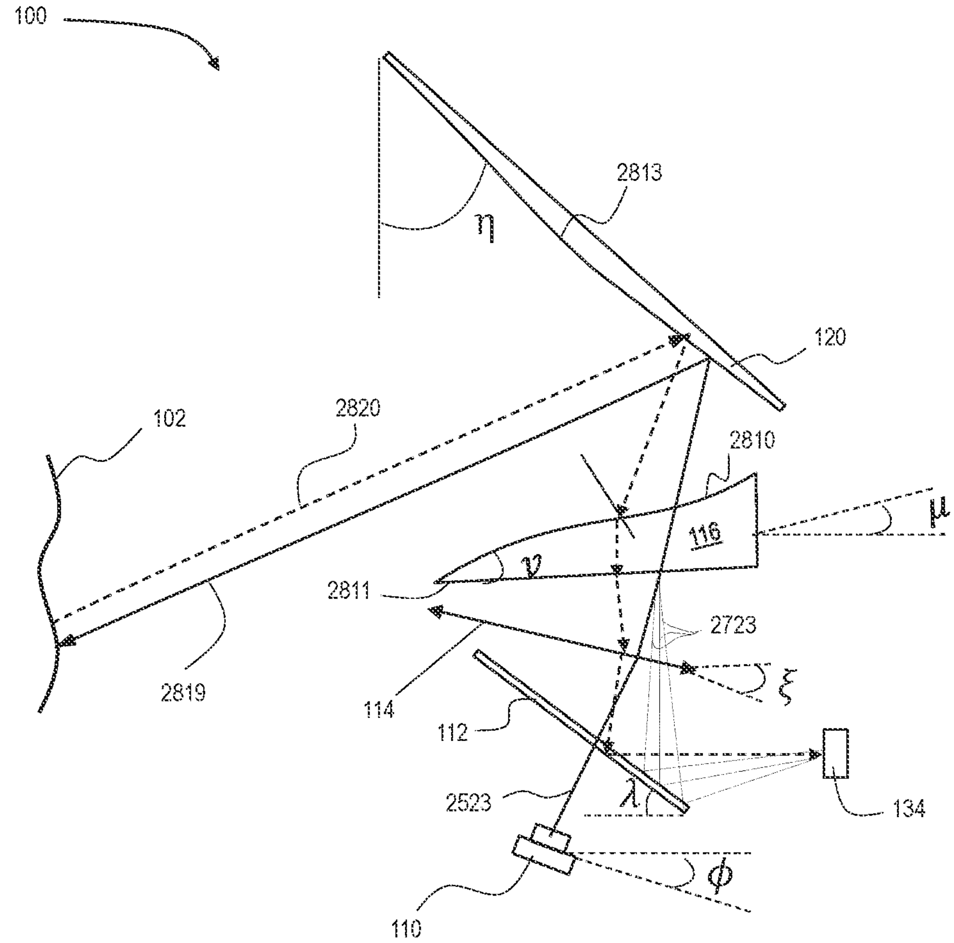
FIG. 28 shows parameters that may be used to control optical elements and a light source, in accordance with embodiments of the present disclosure.

Additionally, a scanning point cloud may also be controlled by the position and orientation of optical elements 116 and 120. FIG. 28 shows parameters that may be used to control optical elements and a light source, in accordance with embodiments of the present disclosure. For example, FIG. 28 shows optical elements 116, 120, and 114 that may be positioned and aligned (i.e., oriented) to allow reflected beam 2820 to be received by receiver 134. In an example embodiment, tilt angles η, μ, ξ, as shown in FIG. 28, may be adjusted to allow beam 2820 to be received by receiver 134. Additionally, or alternatively, tilt angle ϕ of source 110 may also be adjusted to allow reflected beam 2820 to be received by receiver 134. Furthermore, the position and alignment of optical elements 116, 120, and 114, as well as the direction of source 110, may be selected to reduce exposing receiver 134 to stray light. For example, the stray light may be any light internal to system 100 (e.g., the light reflected from various surfaces, such as surface 2811, as indicated by dashed lines 2723). In various embodiments, the exposure of receiver 134 to the stray light may be minimized to allow for accurate resolution of object 102. In addition to controlling angles η, μ, ξ, and φ, a shape of optical element 116 may be controlled. For example, as shown in FIG. 28, a surface 2810 may be configured to allow for better "collection" of light (i.e., for allowing reflected beams from object 102 to reach receiver 134). In some cases, surface 2810 (or surface 2811) may be curved. Additionally, or alternatively, wedge angle ν of element 116 may also be selected to allow for an optimal collection of light. In some cases, reflector 120 may include a curved surface 2813.

Figure 29A:
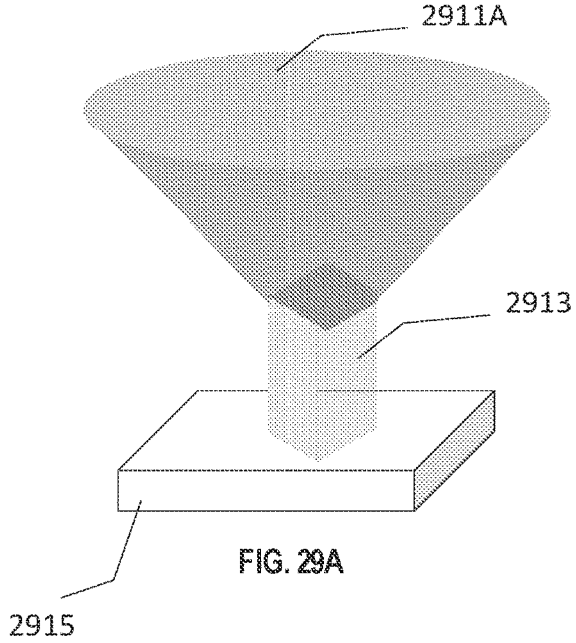
FIGS. 29A-29D shows possible scanning patterns, in accordance with embodiments of the present disclosure.
Figure 29B:
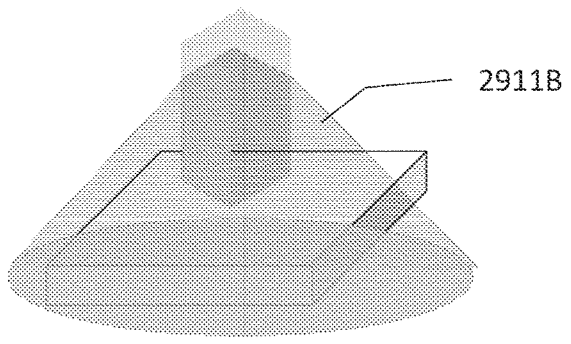
Figure 29C:
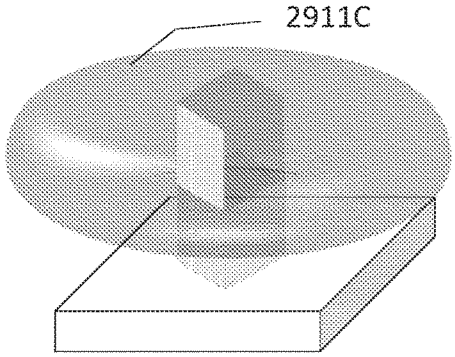
Figure 29D:
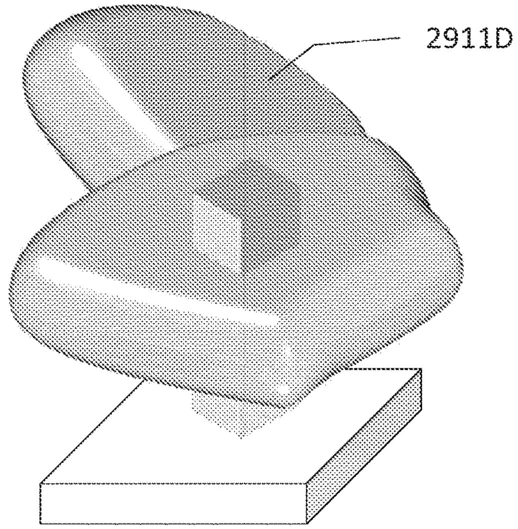

FIGS. 29A-29D shows different scanning patterns that may be achieved by controlling angles η, μ, ξ, φ, and λ, as shown in FIG. 28. In an example embodiment, element 116 and element 120 may be rotated at the same angular speed, and an example scanning pattern may be a single line pattern. For example, FIG. 29A shows a scanning pattern 2911A located above an example scanning LiDAR system 2913 positioned on a platform 2915. FIG. 29B shows a scanning pattern 2911B directed downwards and sideways from system 2913. FIG. 29C shows a scanning pattern 2911C directed sideways from system 2913, and FIG. 29D shows a scanning pattern 2911D that may be a combination of patterns 2911A-2911C.

Figure 30A:
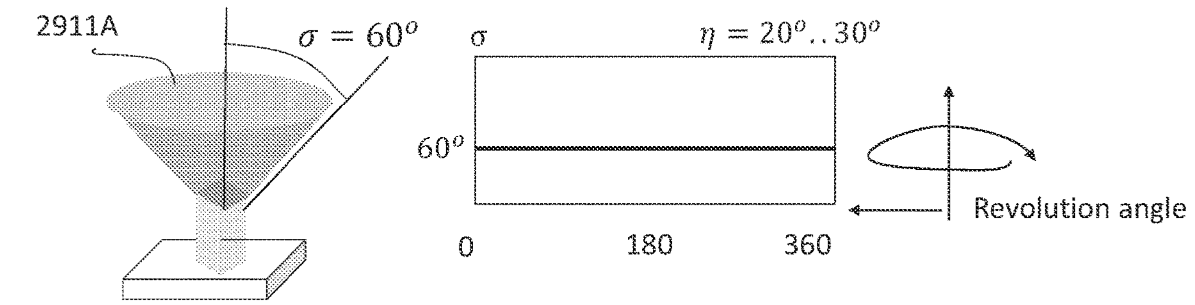
FIGS. 30A-30C shows how a scanning pattern may be affected by a tilt angle of a reflective element, in accordance with embodiments of the present disclosure.
Figure 30B:
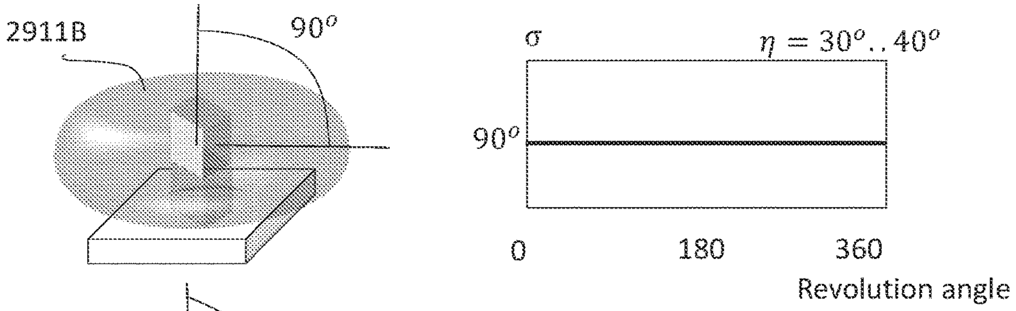
Figure 30C:
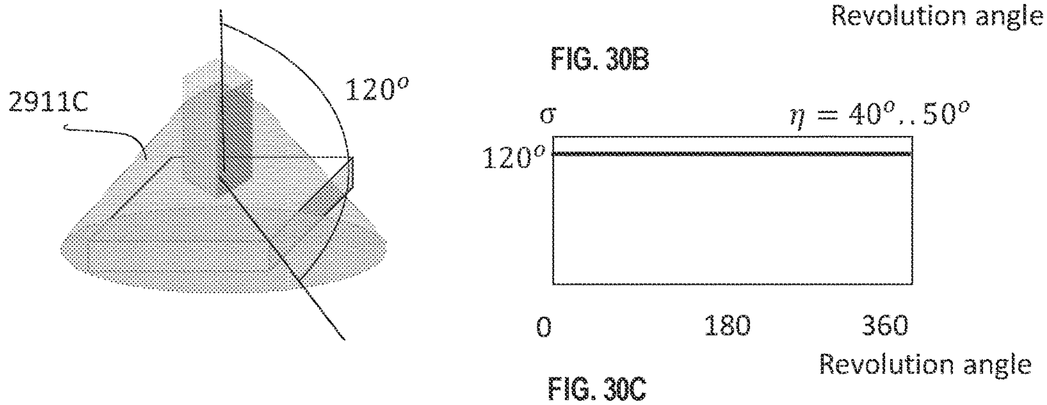

FIGS. 30A-30C show, for example, how a tilt angle η may control the scanning pattern. For example, FIG. 30A shows a scanning pattern 2911A with an angle σ=60, as shown in FIG. 30A. Scanning pattern 2911A may be achieved when tilt angle η is in a suitable range (the range for tilt angle η may depend on other angles μ, ξ, φ, as described above, and may depend on a variety of other parameters, such as the shape of elements 116 and 120, distances between optical elements 114, 116, and 120, presence of waveguides, and the like). In an example embodiment, when angle η is in a range of 20 to 30 degrees, angle σ may be about 60 degrees (in some cases, angle σ may vary in a range of ±20 degrees). FIG. 30B shows scanning pattern 2911B with angle σ~90°. In an example embodiment, to obtain such a scanning distribution (i.e., scanning pattern 2911B), angle η may be in a range of 30 to 40 degrees. FIG. 30C shows scanning pattern 2911C with angle σ~120°. In an example embodiment, scanning pattern 2911C may be obtained when angle η is in a range of 40 to 50 degrees.

Figure 31:
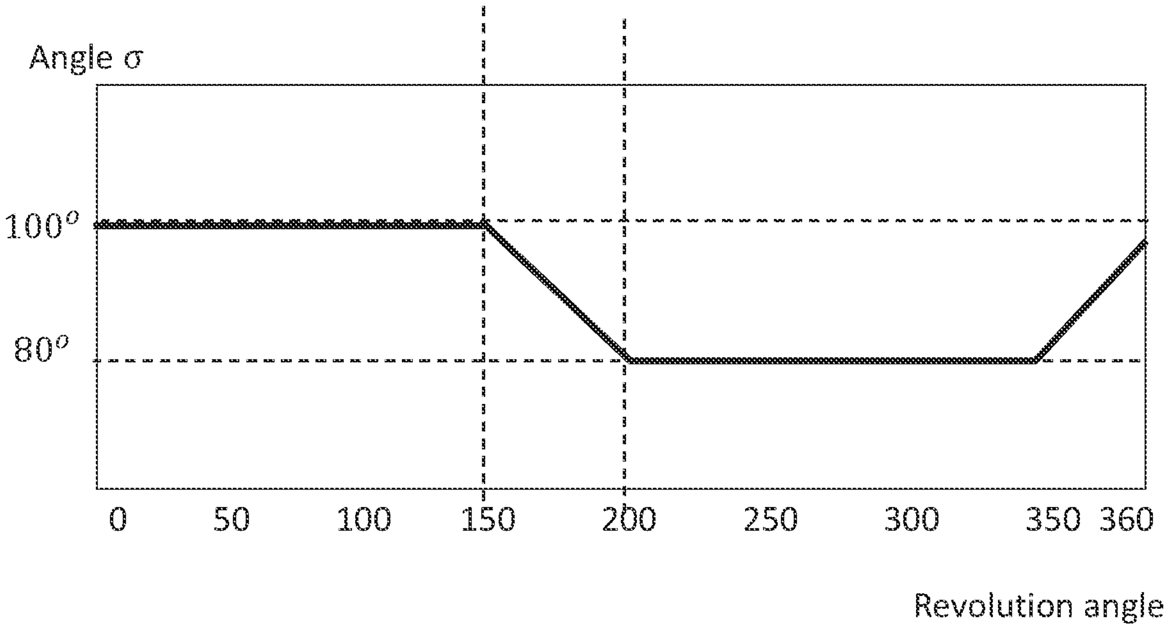
FIG. 31 shows how a scanning pattern may be affected by a relative rate of revolution of optical elements, in accordance with embodiments of the present disclosure.

FIG. 31 shows a graph of variable angle σ as a function of angle of revolution of optical element 116 and reflective element 120. For example, when optical element 116 revolves with angular rate R1 (also referred to as a rotational speed), and reflective element 120 revolves with the same angular rate R1, angle σ~100°. At a revolution angle of 150 degrees, reflective element 120 may quickly speed up (e.g., speed up within a range of few tens of revolution angles) and then slow down back to the rotational speed of R1, resulting in an acquired phase shift between optical element 116 and reflective element 120. Such a phase shift may lead to a change in angle σ, as shown in FIG. 31. For example, angle σ may change from about 100 degrees to about 80 degrees due to the phase shift. In an example embodiment, the acquired phase shift can also be eliminated by reflective element 120 slowing down and then speeding up back to rotational speed R1, as shown, for example, by a change in σ from about 80 to 100 degrees between the revolution angle of 350 and 360 degrees.

In addition to controlling tilt angles η, ξ, μ, a source angle φ (FIG. 28), as well as rotational rates R1 and R2, the orientation of axes 122A and 122B may also influence scanning patterns 2911A-2911D. In an example embodiment, axis 122A may be aligned with axis 122B, and in other cases, axes 122A and 122B may be at angle γ(t) with each other. Such alignment (misalignment) of these axes may be combined with controlling any other parameters used for controlling scanning patterns 2911A-2911D. For example, axes 122A and 122B may be aligned, while optical element 114 may be non-parallel to optical element 116 (i.e., angle μ may be different than angle ξ, that is, surface 2810 of optical element 116 may not be parallel to collimating element 114). In an example embodiment, a tilt angle of optical element 116 relative to collimating element 114 may be defined as μ-ξ (an angle between a normal direction drawn to collimating element 114, and a normal direction to surface 2810), where angles μ and ξ may be positive or negative. For example, in FIG. 28, angle μ has a positive value and angle ξ has a negative value. Similarly, a tilt angle of reflective element 120 may be defined relative to collimating element 114. In an example embodiment, such relative tilt angle may be given as η-ξ, which is related to the angle between a normal direction to element 114 and a normal direction to element 120 (that angle is given by 90-η-ξ). It should be appreciated that any other combination of orientations of optical elements 114, 116, and 120 may be combined with particular orientations of axes 122A and 122B, as well as particular rotational speeds R1(t) and R2(t) (e.g., such speeds may be a function of time) to achieve an improved collection of light from object 102. In an example embodiment, rotational velocities $\vec{V_1}(t)$ and $\vec{V_2}(t)$ may be used to indicate a time dependent orientation of axes 122A and 122B as well as time dependent rotational speeds R1 and R2, and such time dependent rotational velocities may be combined with any suitable orientations of optical elements 114, 116, and 120, which may also be time dependent. For example, tilt angles η(t), μ(t), ξ(t), and angle φ(t) may be all (or at least some) time dependent.

In some embodiments, the second optical element comprises a prism, and method 2400 further comprises refracting the light beam by a first surface (e.g., surface 224) of the second optical element to a central area of reflective surface 226 of the second optical element (e.g., light beam 140*c* refracted to light beam 140*d*), reflecting the light beam by reflective surface 226 to a second surface (e.g., surface 228) (e.g., light beam 140*d* reflected to light beam 140*e*), and refracting the light beam (e.g., light beam 140*e* refracted to light beam 140*f*) may be refracted by the second surface to the environment as the prism rotates about the second axis.

In some embodiments, the first and second optical elements may rotate in the same direction to direct the light beam to scan the environment. In some embodiments, the first and second optical elements may rotate in opposite directions to direct the light beam to scan the environment. In some embodiments, the first and second optical elements may rotate at the same speed to direct the light beam to scan the environment. In some embodiments, the first and second optical elements may rotate at different speeds to direct the light beam to scan the environment.

In some embodiments, the first and second optical elements may be included in a monostatic scanning LiDAR system. In some embodiments as described in FIG. 1C, an optical assembly including the first and second optical elements may be onboard a movable platform or movable object (e.g., movable platform 101) moving in the environment.

In some embodiments as shown in FIG. 1C, movable platform 101 includes a propulsion system (e.g., a propulsion system 171) configured to propel movable platform 101 to move in an environment. The propulsion system may include one or more engines, motors, wheels, axles, magnets, rotors, propellers, blades, nozzles, or any suitable combination thereof.

In some embodiments, movable platform 101 includes a LiDAR system including an optical assembly onboard movable platform 101. The LiDAR system can be any of the various LiDAR systems, such as LiDAR system 100, 200, 300, 400, 600, 650, 700, and/or 800, or various embodiments of optical assemblies included thereof. In some embodiments, the optical assembly of the LiDAR system is configured to direct light beams to scan an environment to detect one or more objects in the environment. The optical assembly may include a first optical element (e.g., optical element 116, 216, a combination of 216 and 410 of FIG. 5B, 550, 560, 760, or 860) rotatable about a first axis (e.g., axis 118 or 217) and configured to receive a light beam at a first surface (e.g., surface 116-1, 214, 552, 562, 762, or 862) of the first optical element and refract the light beam by a second surface (e.g., surface 116-2, 218, 554, 564, 764, or 866) of the first optical element at which the light beam exits the first optical element. The optical assembly may further include a second optical element (e.g., optical element 120, 220, or 720) spaced from the first optical element and rotatable about a second axis (e.g., axis 122, 222, or 2060). The second optical element may be positioned to reflect the light beam by a reflective surface (e.g., surface 120, 226, or 724) of the second optical element to the environment to detect the one or more objects.

The one or more objects can be detected for remote sensing, obstacle avoidance, mapping, modeling, navigation, or any other suitable purposes. The data collected by the LiDAR system can be processed, and instructions can be generated accordingly for the corresponding purpose. The instructions may be generated by processor(s) onboard movable platform 101. The instructions can also be generated by a computing device, e.g., a mobile device, a remote controller, a server system, etc., remote from and in communication with movable platform 101. The instructions can be transmitted to movable platform 101 via various suitable network communication method(s). In some embodiments, movable platform 101 includes a controller (e.g., a controller 173 in FIG. 1C) configured to control propulsion system 171 to propel movable platform 101 in accordance with the instructions generated based on the detected one or more objects.

The phrase "one embodiment," "some embodiments," or "other embodiments" in the specification means that the particular features, structures, or characteristics related to the embodiments are included in at least one embodiment of the present disclosure. Thus, they are not intended to be the same embodiment. In addition, these particular features, structures, or characteristics may be combined in any suitable manner in one or more embodiments.

In various embodiments of the present disclosure, sequence numbers of the processes have nothing to do with the order of execution sequence. Instead, the order of executing the processes should be determined by functions and intrinsic logic. The sequence numbers should not limit the implementation of the embodiments of the present disclosure.

In various embodiments of the present disclosure, the phrase "B corresponding to A" can mean that B is associated with A and/or B can be determined according to A. However, determining B from A does not mean that B is determined only based on A, but B can be determined based on A and/or other information. The term "and/or" herein is merely an association relationship describing associated objects, representing three relationships. For example, A and/or B may represent an existence of A only, an existence of B only, and a co-existence of both A and B. In addition, the character "/" in the specification generally represents that the associated objects have an "or" relationship.

Those skilled in the art may clearly understand that, for convenience and brevity, a detailed structure, device, assembly, system, element, feature, or operation process of systems, devices and sub-systems may refer to a corresponding structure, device, assembly, system, element, feature, or process, respectively, previously described in the embodiments and may not be repeated.

In the embodiments of the present disclosure, the disclosed systems, devices and methods may be implemented in other manners. For example, the device embodiments described above are merely illustrative. Certain features may be omitted or not executed. Further, mutual coupling, direct coupling, or communication connection shown or discussed may be implemented by certain interfaces. Indirect coupling or communication connection of devices or sub-systems may be electrical, mechanical, or in other forms.

It is to be understood that the disclosed embodiments are not necessarily limited in their application to the details of construction and the arrangement of the components set forth in the above description and/or illustrated in the drawings and/or the examples. The disclosed embodiments are capable of variations, or of being practiced or carried out in various ways. For example, additional element(s), device(s), or system(s) not shown in the figures may be further disposed between any element(s), device(s), or system(s) as described herein and still render the LiDAR system operate in substantially similar manners. It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. A LiDAR system comprising:

a light source configured to emit pulsed laser light beams;

a scanning optical assembly configured to direct the pulsed laser light beams to scan an environment for detecting one or more objects in the environment, the scanning optical assembly including:

a first optical element rotatable about a first axis and configured to receive a light beam at a first surface of the first optical element and refract the light beam by a second surface of the first optical element at which the light beam exits the first optical element; and a second optical element spaced from the first optical element and rotatable about a second axis, the second optical element including:

a reflective surface configured to reflect the light beam to the environment; and a refractive surface configured to refract the light beam to the reflective surface; and a receiver configured to receive, via the scanning optical assembly, return light beams reflected by the one or more objects in the environment;

wherein the first optical element includes an irregular prism configured to translate the light beam toward a central area of the reflective surface of the second optical element.

2. The LiDAR system of claim 1, wherein:

the refractive surface is a first refractive surface of the second optical element; and the second optical element further includes a second refractive surface configured to refract the light beam reflected by the reflective surface to the environment, the light beam exiting the second optical element from the second refractive surface.

3. The LiDAR system of claim 2, wherein at least one of the first refractive surface, the reflective surface, or the second refractive surface of the second optical element is a curved surface.

4. The LiDAR system of claim 2, wherein the second optical element includes a triangular prism.

5. The LiDAR system of claim 4, wherein the triangular prism is a right-angle prism.

6. The LiDAR system of claim 1, further comprising:

a collimating element configured to direct the light beam towards the first surface of the first optical element;

wherein:

the collimating element is located between the light source and the first optical element.

7. The LiDAR system of claim 6, wherein the first optical element is positioned to be tilted relative to the collimating element to collimate the light beam for receipt by the first optical element.

8. The LiDAR system of claim 6, wherein at least one of the first surface and the second surface of the first optical element is tilted relative to the collimating element to collimate the light beam for receipt by the first optical element.

9. The LiDAR system of claim 8, wherein the first surface of the first optical element has a first inclination angle in a range from 5° to 9°, and/or the second surface of the first optical element has a second inclination angle in a range from 12° to 16°.

10. The LiDAR system of claim 1, further comprising:

a third optical element spaced from the light source and including:

a transmissive area disposed substantially in a center of the third optical element and configured to transmit the light beam generated by the light source; and a reflective area is disposed substantially on a peripheral area of the third optical element and configured to reflect a return beam towards a receiver spaced from the third optical element.

11. The LiDAR system of claim 1, further comprising:

a balancing element attached to the second optical element and configured to balance the second optical element during rotation about the second axis.

12. The LiDAR system of claim 11, wherein the balancing element has a weight less than a weight of the second optical element, and/or the balancing element has a density less than a density of the second optical element.

13. The LiDAR system of claim 12, wherein:

a first surface of the balancing element is attached to the reflective surface of the second optical element; and a second surface of the balancing element is configured to be coupled to an object configured to adjust the weight of the balancing element to balance the optical assembly during rotation about the second axis.

14. The LiDAR system of claim 13, wherein a third surface of the balancing element is connectable to a motor unit configured to rotate the second optical element about the second axis.

15. The LiDAR system of claim 14, wherein the second surface of the balancing element is distinct from the first surface or the third surface of the balancing element and substantially parallel to the second axis.

16. The LiDAR system of claim 13, wherein the object coupled to the second surface of the balancing element includes a glue attached to the second surface of the balancing element.

17. The LiDAR system of claim 11, wherein a central axis of the balancing element and the second optical element deviates from the second axis, and/or the balancing element includes metal, plastic, glass, or polymer.

18. A movable platform comprising:

an optical assembly onboard the movable platform and configured to direct light beams to scan an environment to detect one or more objects in the environment, the optical assembly including:

a first optical element rotatable about a first axis and configured to receive a light beam at a first surface of the first optical element and refract the light beam by a second surface of the first optical element at which the light beam exits the first optical element; and a second optical element spaced from the first optical element and rotatable about a second axis, the second optical element including:

a reflective surface configured to reflect the light beam to the environment; and a refractive surface configured to refract the light beam to the reflective surface; and a propulsion system configured to propel the movable platform in the environment;

wherein the first optical element includes an irregular prism configured to translate the light beam toward a central area of the reflective surface of the second optical element.

19. The LiDAR system of claim 1, further comprising:

a balancing element attached to the second optical element and configured to balance the second optical element during rotation about the second axis, wherein a central axis of the balancing element and the second optical element deviates from the second axis.

20. A LiDAR system comprising:

a light source configured to emit pulsed laser light beams;

a scanning optical assembly configured to direct the pulsed laser light beams to scan an environment for detecting one or more objects in the environment, the scanning optical assembly including:

a first optical element rotatable about a first axis and configured to receive a light beam at a first surface of the first optical element and refract the light beam by a second surface of the first optical element at which the light beam exits the first optical element; and a second optical element spaced from the first optical element and rotatable about a second axis, the second optical element including:

a reflective surface configured to reflect the light beam to the environment;

a first refractive surface configured to refract the light beam to the reflective surface; and a second refractive surface configured to refract the light beam reflected by the reflective surface to the environment, the light beam exiting the second optical element from the second refractive surface, wherein at least one of the first refractive surface, the reflective surface, or the second refractive surface of the second optical element is a curved surface; and a receiver configured to receive, via the scanning optical assembly, return light beams reflected by the one or more objects in the environment.

* * * * *